United States Patent
Chao et al.

(10) Patent No.: US 10,277,849 B2
(45) Date of Patent: Apr. 30, 2019

(54) SYSTEM AND METHOD FOR HIGH-SPEED DOWN-SAMPLED CMOS IMAGE SENSOR READOUT

(71) Applicant: Taiwan Semiconductor Manufacturing Co., Ltd., Hsin-Chu (TW)

(72) Inventors: Calvin Yi-Ping Chao, Zhubei (TW); Chin-Hao Chang, Hsinchu (TW); Kuo-Yu Chou, Hsinchu (TW); Shang-Fu Yeh, Hsin Chu (TW); Chih-Lin Lee, Toufen (TW); Chiao-Yi Huang, Zhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 15/941,431

(22) Filed: Mar. 30, 2018

(65) Prior Publication Data
US 2018/0227531 A1 Aug. 9, 2018

Related U.S. Application Data

(63) Continuation of application No. 15/076,983, filed on Mar. 22, 2016, now Pat. No. 9,955,096.

(51) Int. Cl.
H04N 5/345 (2011.01)
H04N 5/378 (2011.01)
H04N 5/3745 (2011.01)

(52) U.S. Cl.
CPC ....... *H04N 5/37455* (2013.01); *H04N 5/3456* (2013.01); *H04N 5/378* (2013.01)

(58) Field of Classification Search
CPC .... H04N 3/1512; H04N 5/374; H04N 5/3741; H04N 5/3745; H04N 5/37457; H04N 5/37455; H04N 5/378; H01L 27/14643
See application file for complete search history.

(56) References Cited

U.S. PATENT DOCUMENTS

| | | |
|---|---|---|
| 5,923,369 A | 7/1999 | Merrill |
| 8,223,047 B2 | 7/2012 | Lai et al. |
| 8,279,102 B2 | 10/2012 | Lai et al. |
| 8,325,074 B2 | 12/2012 | Kinyua |
| 8,476,971 B2 | 7/2013 | Peng et al. |
| 8,493,259 B2 | 7/2013 | Lai et al. |
| 8,547,259 B1 | 10/2013 | Huang et al. |

(Continued)

*Primary Examiner* — Chia Wei A Chen
(74) *Attorney, Agent, or Firm* — Duane Morris LLP

(57) ABSTRACT

A system and method of routing multiple pixels from a single column in a CMOS (complementary metal-oxide semiconductor) image sensors (CIS) to a plurality of column analog-to-digital converters (ADCs) is disclosed. The CIS includes an array of pixel elements having a plurality of rows and a plurality of columns. A plurality of column-out signal paths is coupled to each of the plurality of columns of the array of pixel elements. A column routing matrix is coupled to each plurality of column-out signal paths for each of the plurality of columns. A plurality of analog-to-digital converters (ADCs) are coupled to the column routing matrix. The column routing matrix is configured to route at least one column-out signal path to each of the plurality of ADCs during a down-sampling read operation.

20 Claims, 57 Drawing Sheets

(56) References Cited

U.S. PATENT DOCUMENTS

| | | |
|---|---|---|
| 8,599,057 B2 | 12/2013 | Lai et al. |
| 8,629,795 B2 | 1/2014 | Peng et al. |
| 8,872,686 B2 | 10/2014 | Chou et al. |
| 9,013,341 B2 | 4/2015 | Soenen et al. |
| 9,197,240 B1 | 11/2015 | Kinyua et al. |
| 9,628,733 B2 * | 4/2017 | Shimada ................ H04N 5/347 |
| 2003/0058196 A1 | 3/2003 | Hansen |
| 2005/0195304 A1 * | 9/2005 | Nitta ................... H03M 1/1023 348/308 |
| 2006/0013485 A1 | 1/2006 | Nitta |
| 2006/0220939 A1 | 10/2006 | Kirsch |
| 2008/0258042 A1 | 10/2008 | Krymski |
| 2009/0262229 A1 | 10/2009 | Lim |
| 2010/0231768 A1 | 9/2010 | Utsunomiya |
| 2011/0080492 A1 | 4/2011 | Matsuda |
| 2011/0128426 A1 | 6/2011 | Taruki |
| 2012/0001615 A1 | 1/2012 | Levine |
| 2012/0033121 A1 | 2/2012 | Kawata |
| 2012/0062772 A1 | 3/2012 | Osawa |
| 2012/0307120 A1 | 12/2012 | Ito |
| 2012/0312963 A1 | 12/2012 | Storm |
| 2013/0027594 A1 | 1/2013 | Krymski |
| 2013/0089175 A1 | 4/2013 | Mo |
| 2013/0099099 A1 | 4/2013 | Anaxagoras |
| 2014/0159932 A1 | 6/2014 | Chang et al. |
| 2014/0247382 A1 | 9/2014 | Moldovan |
| 2015/0062394 A1 | 3/2015 | Ikeda |
| 2015/0062396 A1 | 3/2015 | Yamaoka |
| 2015/0124137 A1 | 5/2015 | Sato |
| 2015/0163430 A1 | 6/2015 | Kanemitsu |
| 2015/0222825 A1 | 8/2015 | Iwata |
| 2015/0237247 A1 | 8/2015 | Hara |
| 2016/0006969 A1 * | 1/2016 | Matsumoto ............ H04N 5/357 348/308 |
| 2016/0014365 A1 | 1/2016 | Mizuguchi |
| 2016/0118424 A1 | 4/2016 | Guidash |
| 2016/0205332 A1 | 7/2016 | Lee |
| 2016/0323524 A1 | 11/2016 | Smith |
| 2017/0006238 A1 | 1/2017 | Kenzaburo |
| 2017/0099447 A1 | 4/2017 | Smith |
| 2017/0302873 A1 * | 10/2017 | Hagihara ............... H04N 5/378 |
| 2017/0310910 A1 * | 10/2017 | Smith ............... H01L 27/14641 |
| 2018/0115726 A1 * | 4/2018 | Yoshimura ............ H04N 5/374 |

* cited by examiner

SYSTEM AND METHOD FOR HIGH-SPEED DOWN-SAMPLED CMOS IMAGE SENSOR READOUT

CROSS-REFERENCE TO RELATED APPLICATIONS

This application is a continuation of U.S. patent application Ser. No. 15/076,983, filed Mar. 22, 2016, entitled "SYSTEM AND METHOD FOR HIGH-SPEED DOWN-SAMPLED CMOS IMAGE SENSOR READOUT," which is incorporated by reference herein in its entirety.

BACKGROUND

CMOS (complementary metal-oxide semiconductor) image sensors (CIS) used in smartphones and other multi-purpose devices typically support various formats of videos and high-resolution videos such as 4k/2160p (3840×2160 resolution), 1080p (1920×1080 resolution), and 720p (1280×720 resolution) at 30 frames per second (fps), 60 fps, 120 fps, 240 fps, and/or other frame rates and resolutions. Due to the limitations of a CIS readout circuit speed, data transmission speed, and storage requirements, higher frame-rate videos are typically down-sampled from a full frame or a selected sub-frame of the CIS. Common down-sampling ratios include one-half vertical, one-half horizontal (V:½, H:½) and one-third vertical, one-third horizontal (V:⅓, H:⅓), although other down-sampling ratios are possible.

Current CMOS image sensor (CIS) designs use column parallel ADC architectures. In a down-sampling readout, the speed (e.g., frame rate) is in general inversely proportional to the number of rows to be read, but not proportional to the number of columns to read, as current CIS include column ADCs for the array of pixels (or pixel elements) and therefore read times are limited by the row (or line) times and analog-to-digital conversion time and not affected by the number of columns. Current CIS utilize only a portion of the column parallel ADC architectures during a down-sampling read operation.

During a down-sampling readout operation, a portion of the columns and the rows are not read. For example, in a (V:½, H:½) down-sampling, only half of the rows and half of the columns in the CIS are sampled. In current CIS designs, when a column is skipped during a down-sampling operation, the column ADCs coupled to the skipped columns are not used. For a (V:½, H:½) down-sampling, only half of the column ADCs are currently utilized. For a (V:⅓, H:⅓) down-sampling, only a third of the column ADCs are currently utilized.

BRIEF DESCRIPTION OF THE DRAWINGS

Aspects of the present disclosure are best understood from the following detailed description when read with the accompanying figures. It is noted that, in accordance with the standard practice in the industry, various features are not necessarily drawn to scale. In fact, the dimensions of the various features may be arbitrarily increased or reduced for clarity of discussion.

DETAILED DESCRIPTION

Figure 1:
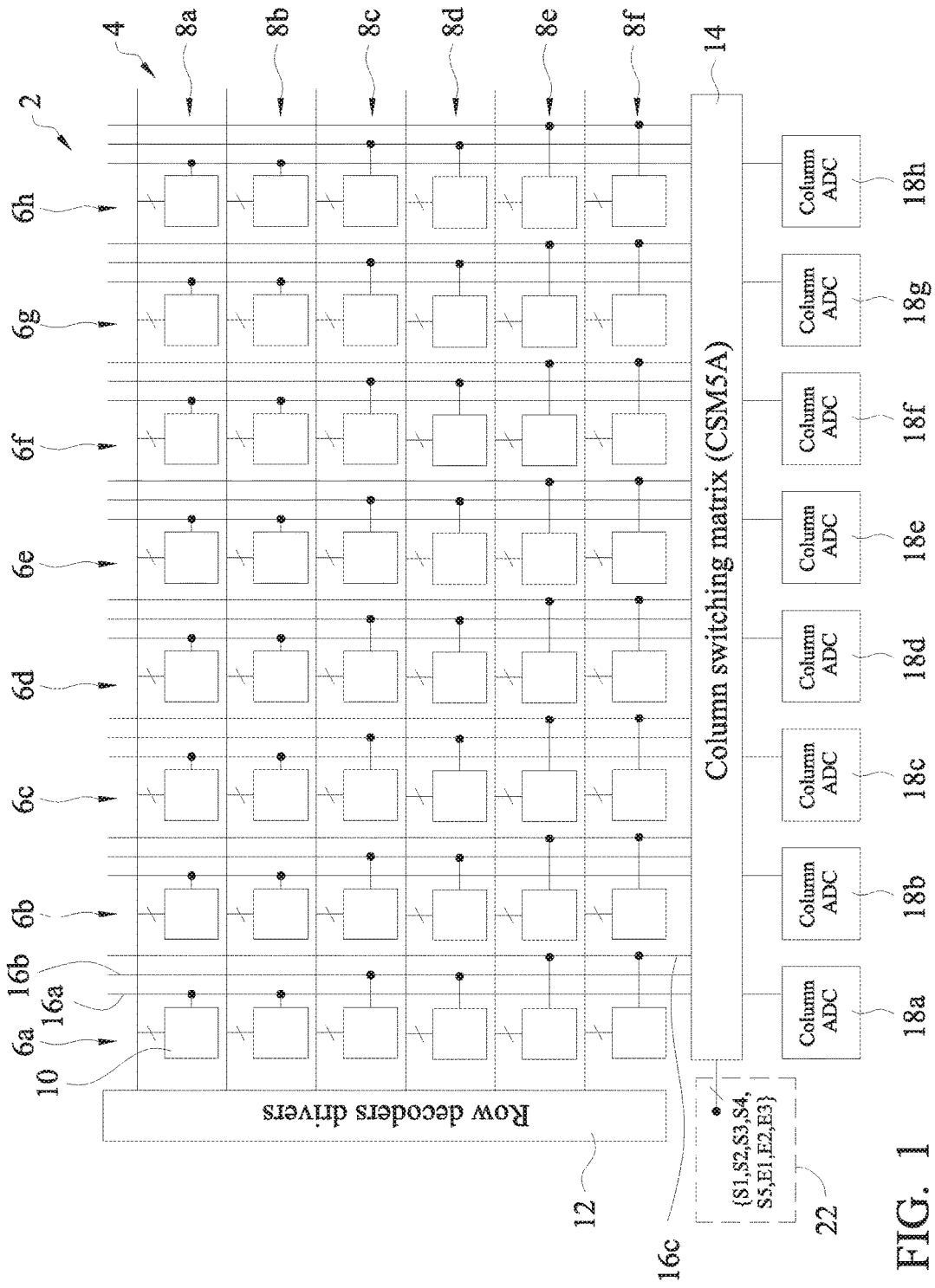
FIG. 1 illustrates CIS including an array of pixels having a plurality of column-out signal paths and a column routing matrix for the columns in the array, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In various embodiments, a CMOS (complementary metal-oxide semiconductor) imaging sensor (CIS) having an array of pixels including a plurality of column-out signal paths for each column in the array is disclosed. In some embodiments, the plurality of column-out signal paths includes at least three signal paths. Each of the column-out signal paths are coupled to a column routing matrix that routes signals received at one or more of the column-out routing paths to a plurality of column analog-to-digital converters (ADCs). The column routing matrix is configured to receive a plurality of control signals based on a type of read operation performed, such as, for example, an all-pixel read operation, a (V:½, H:½) down-sampling read operation, a (V:⅓, H:⅓) down-sampling read operation, and/or any other suitable read operation. The column routing matrix allows the column-out signals to be routed such that all of the column ADCs are utilized during any of read operation, including, but not limited to, a (V:½, H:½) or (V:⅓, H:⅓) down-sampling read operation.

FIG. 1 illustrates one embodiment of a CIS 2 including an array 4 of pixels 10. The array of pixels 4 includes a plurality of columns 6a-6h and a plurality of rows 8a-8f. Each of the rows 8a-8f is coupled a row driver circuit 12 configured to drive the rows 8a-8f during a read operation. Each column 6a-6h includes a plurality of column-out signal paths 16a-16c coupled to at least one of the pixels 10 in the respective column 8a-8h. When a read operation is performed, at least a portion of the pixels 10 in the array 4 are activated by the row decoders and drivers 12 to generate an output on one of the column-out signal paths 16a-16c. The output of each pixel 10 is routed by the column routing matrix 14 to one of the column ADCs 18a-18h. The column ADCs 18a-18f convert the image data detected by each of the pixels 10 to a digital signal, which is provided to one or more additional circuit elements, such as, for example, a storage element (not shown), an image signal process (ISP) (not shown), or outputs off chip.

During an all-pixel read operation, each of the pixels 10 in a column 6a are routed to the column ADC 18a corresponding to that column 6a by the column routing matrix 14. Each of the pixels 10 are activated by the row driver circuit 12 and sequentially read by the column ADC 18a, for example, beginning with the first row 8a and proceeding sequentially through each subsequent row 8b-8f in the column 6a. In the illustrated embodiments, each column 6a-6h has a corresponding ADC 18a-18h, the read time for an all-pixel read operation is dependent on the number of rows 8a-8f in the CIS 2, although it will be appreciated that embodiments having more or fewer ADCs than columns are within the scope of this disclosure. The all-pixel read operation takes a predetermined amount of time, X, based on the response time of the row decoders and drivers 12, the pixels 10, and A/D conversion time of the column ADCs 18a-18h. In some embodiments, only some of the pixels 10 are read to provide a higher frame rate, for example, for high-speed video capture. In some embodiments, a plurality of control signals 22 are provided to the column routing matrix 14 to configure the column routing matrix 14 based on the read operation being performed, such as, for example, an all-pixel read operation, a (V:½, H:½) down-sampling read operation, a (V:⅓, H:⅓) down-sampling read operation, and/or any other suitable read operation.

Figure 2A:
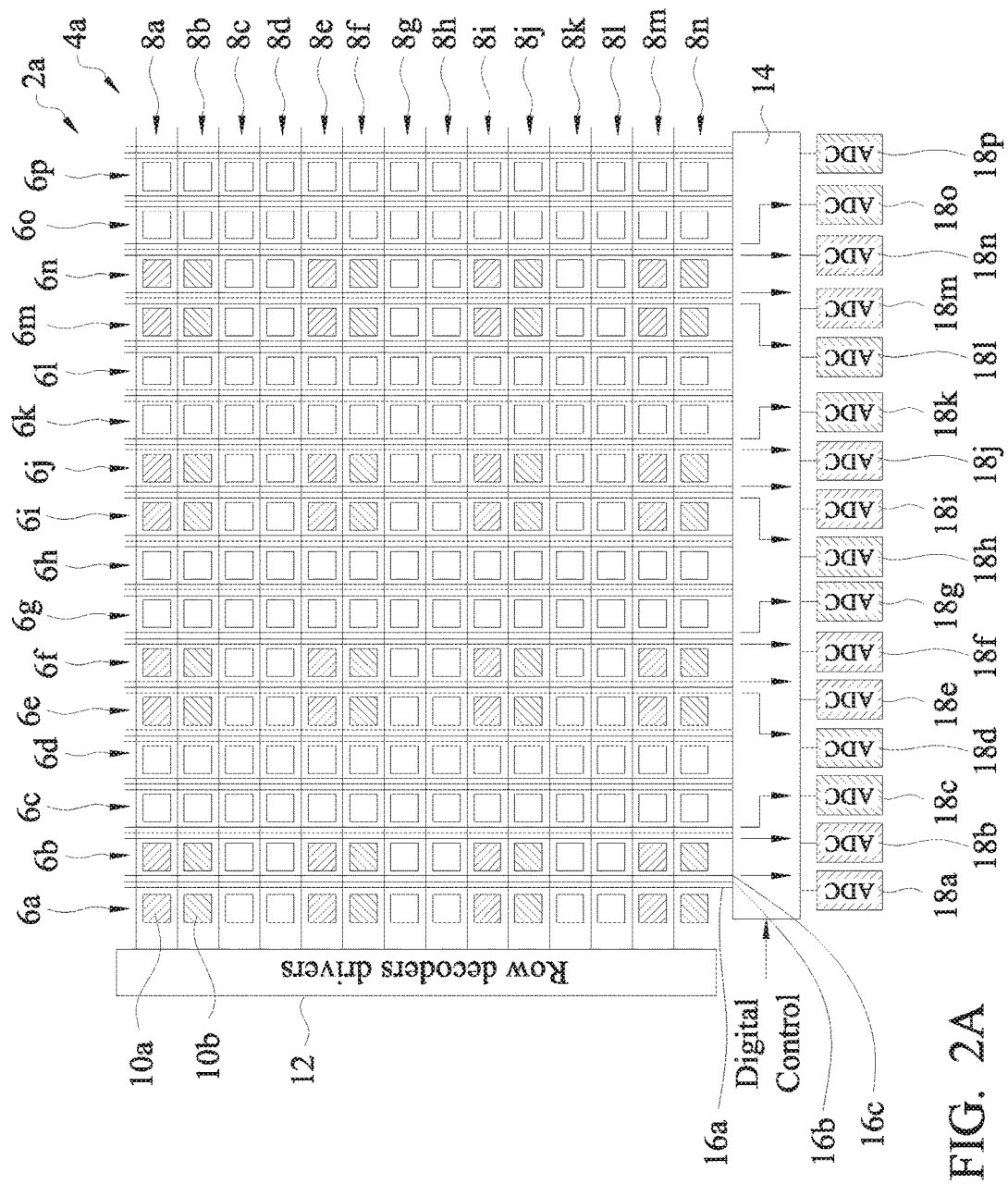
FIG. 2A illustrates the CIS of FIG. 1 configured for a (V:½, H:½) down-sampling read operation, in accordance with some embodiments.

FIG. 2A illustrates one embodiment of a CIS 2a having an array 4a of pixels 10. The CIS 2a is similar to the CIS 2 discussed with respect to FIG. 1, and similar description is not repeated herein. The CIS 2a is configured for a (V:½, H:½) down-sampling read operation. During a down-sampling read operation, only a sub-set of the pixels 10 in the pixel array 4 are read. For example, during a (V:½, H:½) down-sampling read operation, only half of the rows 8a-8f and half of the columns 6a-6h are read by the CIS 2 resulting in only ¼ of the total pixels 10 in the array 4 being read by the CIS 2. In the illustrated embodiment, the first row 8a and the second row 8b of the first and second column 6a, 6b are read and the third and fourth rows 8c, 8d are skipped. Similarly, the fifth row 8e and the sixth row 8f are read and the seventh row 8g and the eighth row 8h are skipped. This pattern is repeated for each row 8a-8m and column 6a-6p of the array 4a. Signals from the activated pixels 10a-10d are routed by the column-out signal paths 16a-16c to a column routing matrix 14, which routes each of the signals to one of the column ADCs 18a-18p. The column routing matrix 14 routes the signals on each of the column-out signal paths 16a-16b such that all of the column ADCS 18a-18p are utilized during a (V:½, H:½) down-sampling read operation, as discussed in more detail below.

In a conventional CIS, a (V:½, H:½) down-sampling read operation would utilize only the column ADCs for each of the columns being read, resulting in only half of the total column ADCs in the CIS 2a being used. In the illustrated CIS 2a embodiment, the plurality of column-out signal paths 16a-16c and the column routing matrix 14 allow all of the column ADCs 18a-18h in the CIS 2a to be used during a (V:½, H:½) down-sampling read operation. For example, in the illustrated embodiment, the first pixel 10a in the first column 6a is coupled to a first column-out signal path 16a and the second pixel 10b is coupled to a second column-out signal path 16b. During a (V:½, H:½) down-sampling read operation, the first column-out signal path 16a is routed by the column routing matrix 14 to a first column ADC 18a (e.g., an associated column ADC) and the second column-out signal path 16b is routed by the column routing matrix 14 to a second column ADC 18b (e.g., an adjacent and/or non-adjacent column ADC). Because the third and fourth columns 6c, 6d are skipped during a (V:½, H:½) down-sampling read operation, the third column ADC 18c and the fourth column ADC 18d can be used to read additional pixels from the first column 6a, increasing read speed and eliminating wasted ADC capacity.

Figure 2B:
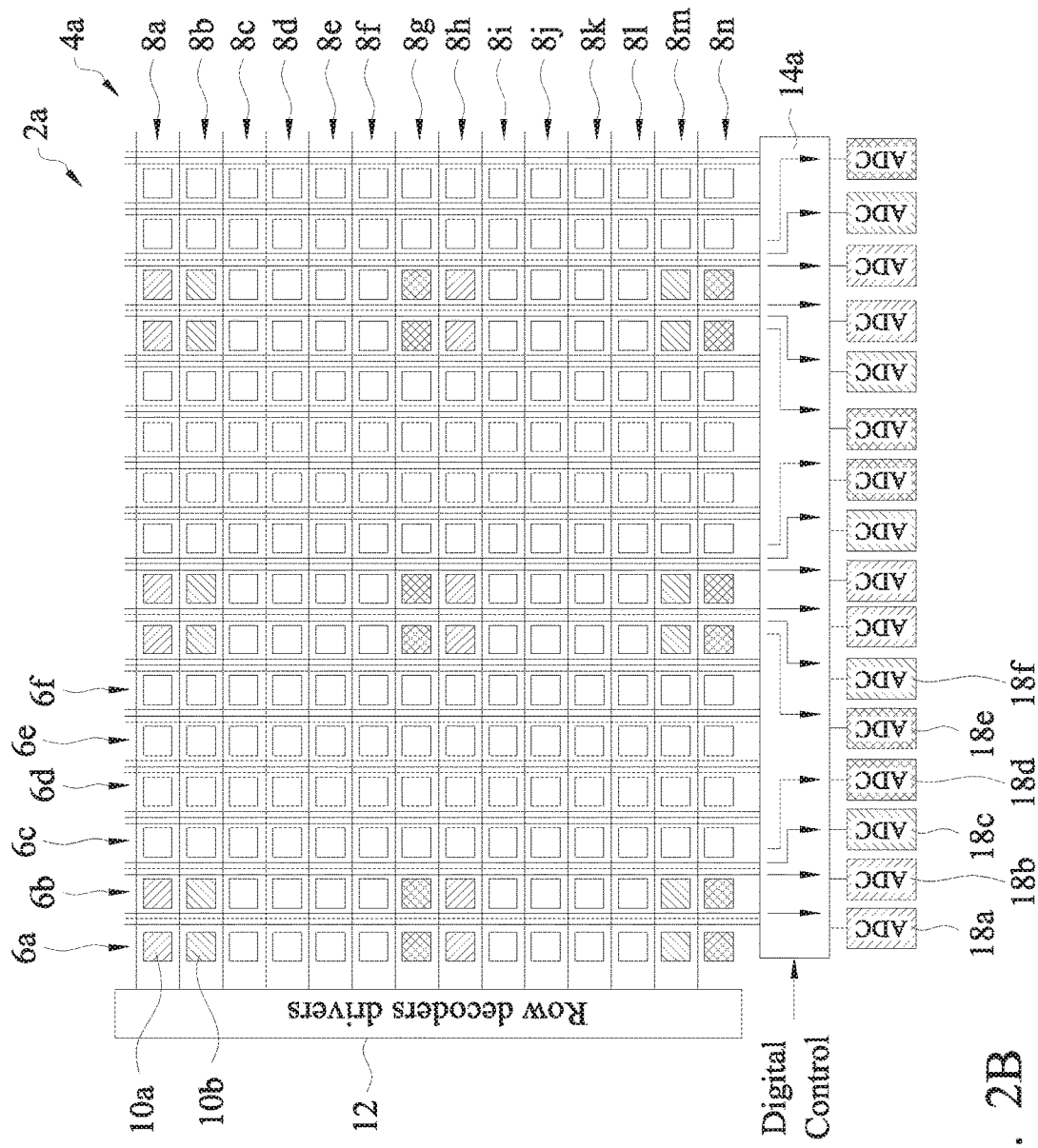
FIG. 2B illustrates the CIS of FIG. 1 configured for a (V:⅓, H:⅓) down-sampling read operation, in accordance with some embodiments.

FIG. 2B illustrates one embodiment of the CIS 2a configured for a (V:⅓, H:⅓) down-sampling read operation. For example, in the illustrated embodiment, the first row 8a and the second row 8b of the first and second column 6a, 6b are read and the third, fourth, fifth, and sixth rows 8c-8f are skipped. Similarly, the seventh row 8g and the eighth row 8h are read and the ninth, tenth, eleventh, and twelfth rows 8i-8m are skipped. This pattern is repeated for each row 8a-8m and column 6a-6p of the array 4a. Signals from the activated pixels 10a-10d are routed by the column-out signal paths 16a-16c to a column routing matrix 14, which routes each of the signals to one of the column ADCs 18a-18p. The column routing matrix 14 routes the signals on each of the column-out signal paths 16a-16c such that all of the column ADCS 18a-18p are utilized during a (V:⅓, H:⅓) down-sampling read operation, as discussed in more detail below.

Figure 3A:
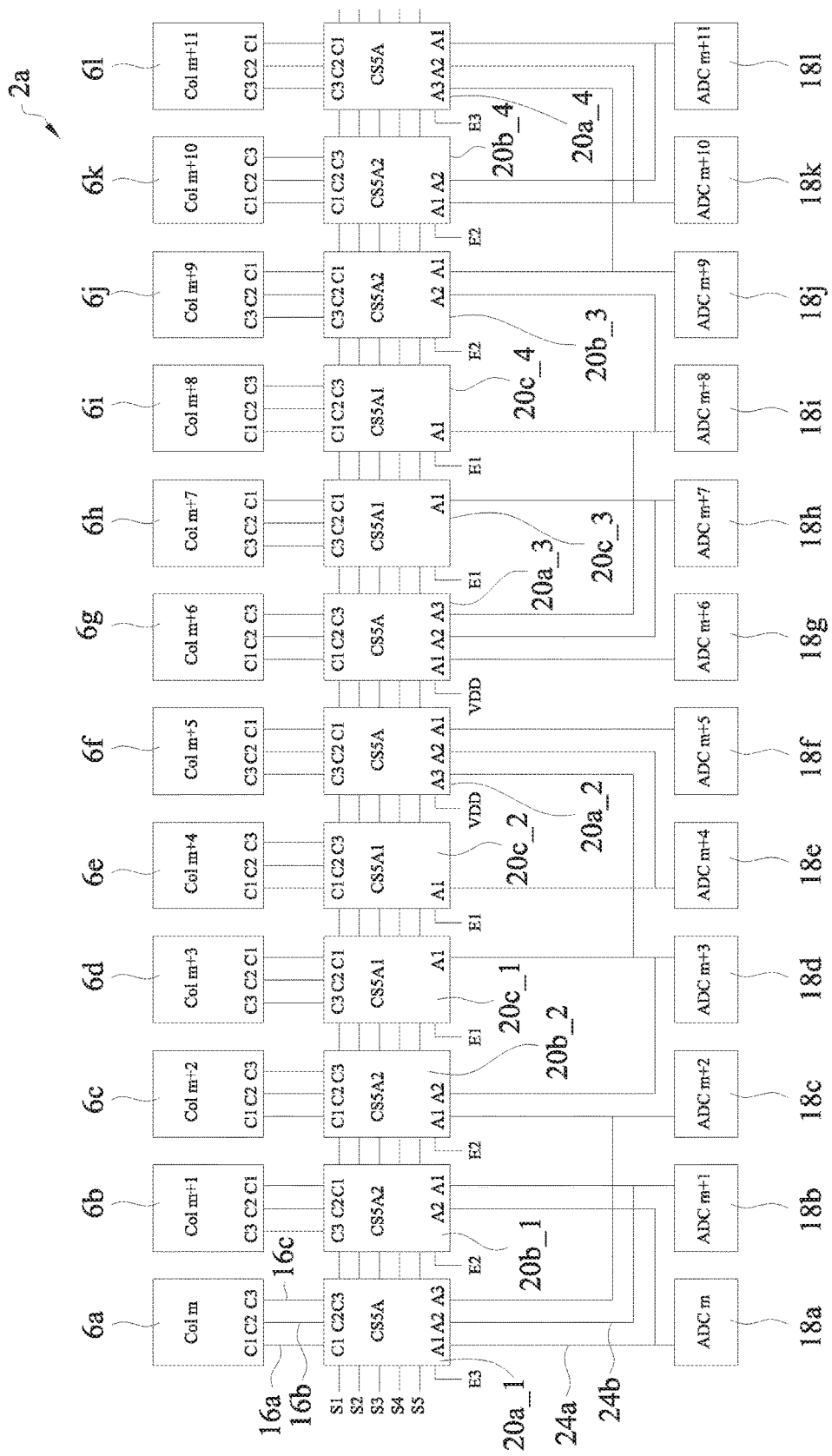
FIG. 3A illustrates a column routing matrix illustrated in FIG. 2A, in accordance with some embodiments.

FIG. 3A illustrates one embodiment of a column routing matrix 14a of the CIS 2 illustrated in FIG. 1. The column routing matrix 14a includes a plurality of routing circuits 20a-20c. Each of the plurality of routing circuits 20a-20c is coupled to a set of column-out signal paths 16a-16c of one of the plurality of columns 6a-6l. The routing circuits 20a-20c receive a plurality of control signals S[1:5]. The plurality of control signals S[1:5] control the routing circuits 20a-20c to route the column-out signals 16a-16c from each of the columns 6a-6l to one or more of the column ADCs 18a-18l based on the read operation being performed, such as an all-pixel read, a (V:½, H:½) down-sampling read operation, a (V:⅓, H:⅓) down-sampling read operation, and/or any other suitable read operation, as discussed in more detail below. In some embodiments, each of the routing circuits 20a-20c are configured to receive an enable signal E1-E3 such that the routing circuits 20a-20c can be individually, or collectively as part of a set, enabled and/or disabled.

The plurality of routing circuits 20a-20c can include one or more types of column routing circuits, such as, for example, a first column routing circuit 20a_1-20a_4, a second column routing circuit 20b_1-20b_4, and a third column routing circuit 20c_1-20c_4. Each of the column routing circuits 20a-20c are configured to generate a different routing based on the plurality of control signals S[1:5]. In some embodiments, the number of column routing circuits 20a-20c corresponds to the number of read operations performed by the column routing matrix 14a. For example, in the illustrated embodiment, the column routing circuit 12a includes three types of column routing circuits 20a-20c corresponding to three types of read operation: an all-pixel read, a (V:½, H:½) down-sampling read operation, a (V:⅓, H:⅓) down-sampling read operation. Each of the types of read operation utilizes a sub-set of the column routing circuits 20a-20c, as discussed in more detail below.

Figure 3B:
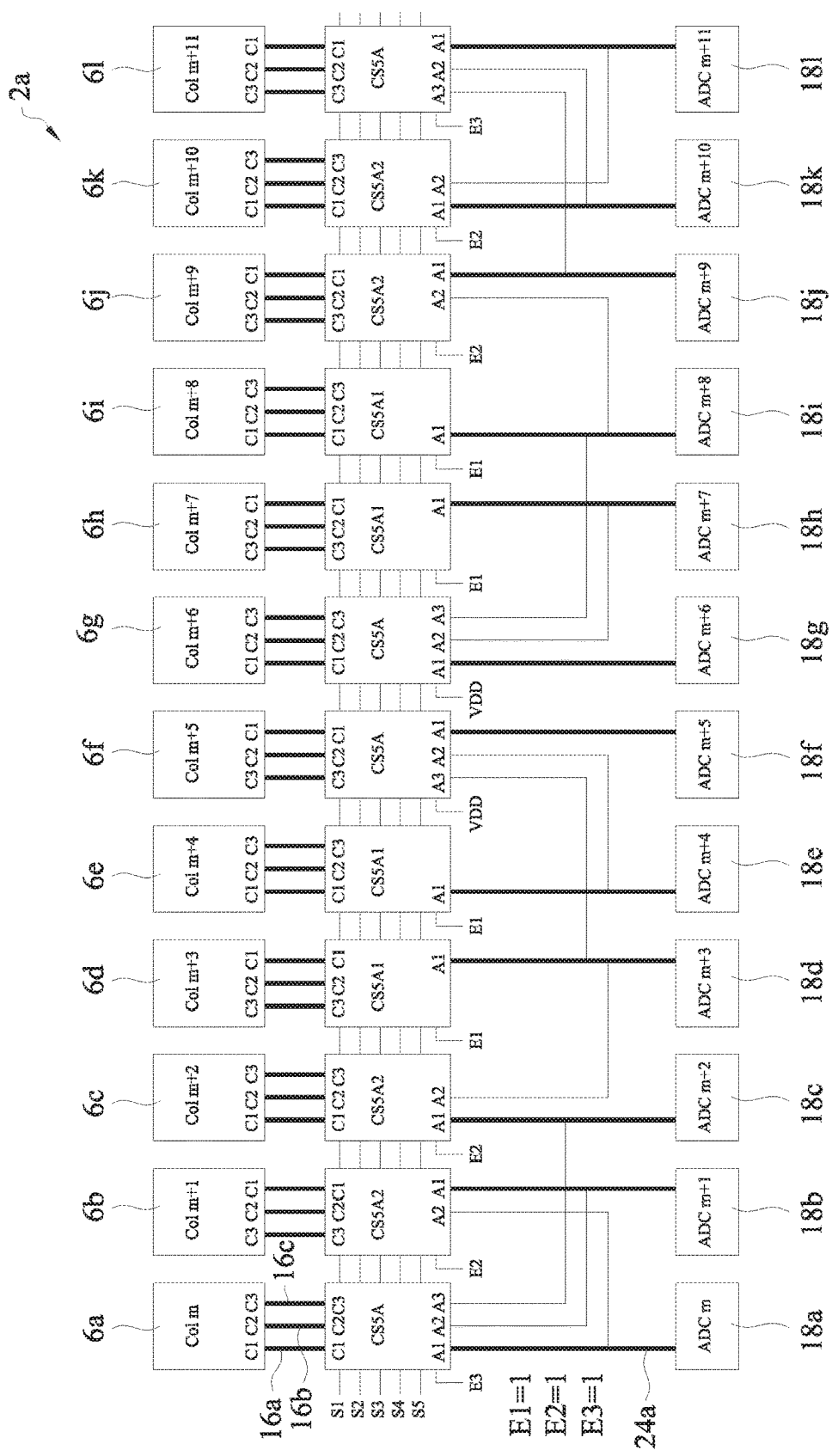
FIG. 3B illustrates the column routing matrix of FIG. 3A configured for an all-pixel read operation, in accordance with some embodiments.

FIG. 3B illustrates the column routing matrix 14a of FIG. 3A configured for an all-pixel read operation, in accordance with some embodiments. During an all-pixel read operation, every pixel in the array 4a of the CIS 2a is read by the corresponding column ADC 18a-18l. For example, in the illustrated embodiment, each of the pixels 10 in the first column 6a are sequentially read by the first column ADC 18a. Similarly, the pixels 10 of each of the other columns 6b-6l are sequentially read by the corresponding column ADCs 18b-18l. The column routing circuits 20a-20c are configured to route each of the column-out signals 16a-16c for the corresponding column 6a-6l to a first output 24a of a column routing circuit 20a-20c coupled to the corresponding column ADC 18a-18l. For example, in the illustrated embodiment, the first column routing circuit 20a_1 is configured to route each of the column-out signal paths 16a-16c of the first column 6a to a first column ADC 18a. In some embodiments, the time for execution of an all-pixel read operation is determined by the number of rows in each column and is denoted herein as X. Table 1 below illustrates one embodiment of a control table for an all-pixel read operation of the CIS 2a.

TABLE 1

| Row # | C1 | C2 | C3 | S[5:1] | ADC # |
|---|---|---|---|---|---|
| 36n | ● | | | 0, 0, 0, 0, 1 | m |
| 36n + 1 | | ● | | 0, 1, 0, 0, 0 | m |
| 36n + 2 | ● | | | 0, 0, 0, 0, 1 | m |
| 36n + 3 | | ● | | 0, 1, 0, 0, 0 | m |
| 36n + 4 | ● | | | 0, 0, 0, 0, 1 | m |
| 36n + 5 | | ● | | 0, 1, 0, 0, 0 | m |
| 36n + 6 | | | ● | 1, 0, 0, 0, 0 | m |
| 36n + 7 | | | ● | 1, 0, 0, 0, 0 | m |
| 36n + 8 | ● | | | 0, 0, 0, 0, 1 | m |
| 36n + 9 | | ● | | 0, 1, 0, 0, 0 | m |
| 36n + 10 | | | ● | 1, 0, 0, 0, 0 | m |
| 36n + 11 | | | ● | 1, 0, 0, 0, 0 | m |
| 36n + 12 | ● | | | 0, 0, 0, 0, 1 | m |
| 36n + 13 | | ● | | 0, 1, 0, 0, 0 | m |
| 36n + 14 | | | ● | 1, 0, 0, 0, 0 | m |
| 36n + 15 | | | ● | 1, 0, 0, 0, 0 | m |
| 36n + 16 | ● | | | 0, 0, 0, 0, 1 | m |
| 36n + 17 | | ● | | 0, 1, 0, 0, 0 | m |
| 36n + 18 | | | ● | 1, 0, 0, 0, 0 | m |
| 36n + 19 | | ● | | 0, 1, 0, 0, 0 | m |
| 36n + 20 | ● | | | 0, 0, 0, 0, 1 | m |
| 36n + 21 | | ● | | 0, 1, 0, 0, 0 | m |
| 36n + 22 | ● | | | 0, 0, 0, 0, 1 | m |
| 36n + 23 | | ● | | 0, 1, 0, 0, 0 | m |
| 36n + 24 | ● | | | 0, 0, 0, 0, 1 | m |
| 36n + 25 | | ● | | 0, 1, 0, 0, 0 | m |
| 36n + 26 | | | ● | 1, 0, 0, 0, 0 | m |
| 36n + 27 | | | ● | 1, 0, 0, 0, 0 | m |
| 36n + 28 | ● | | | 0, 0, 0, 0, 1 | m |
| 36n + 29 | | ● | | 0, 1, 0, 0, 0 | m |
| 36n + 30 | ● | | | 0, 0, 0, 0, 1 | m |
| 36n + 31 | | | ● | 1, 0, 0, 0, 0 | m |
| 36n + 32 | ● | | | 0, 0, 0, 0, 1 | m |
| 36n + 33 | | ● | | 0, 1, 0, 0, 0 | m |
| 36n + 34 | | | ● | 1, 0, 0, 0, 0 | m |
| 36n + 35 | | | ● | 1, 0, 0, 0, 0 | m |

Figure 3C:
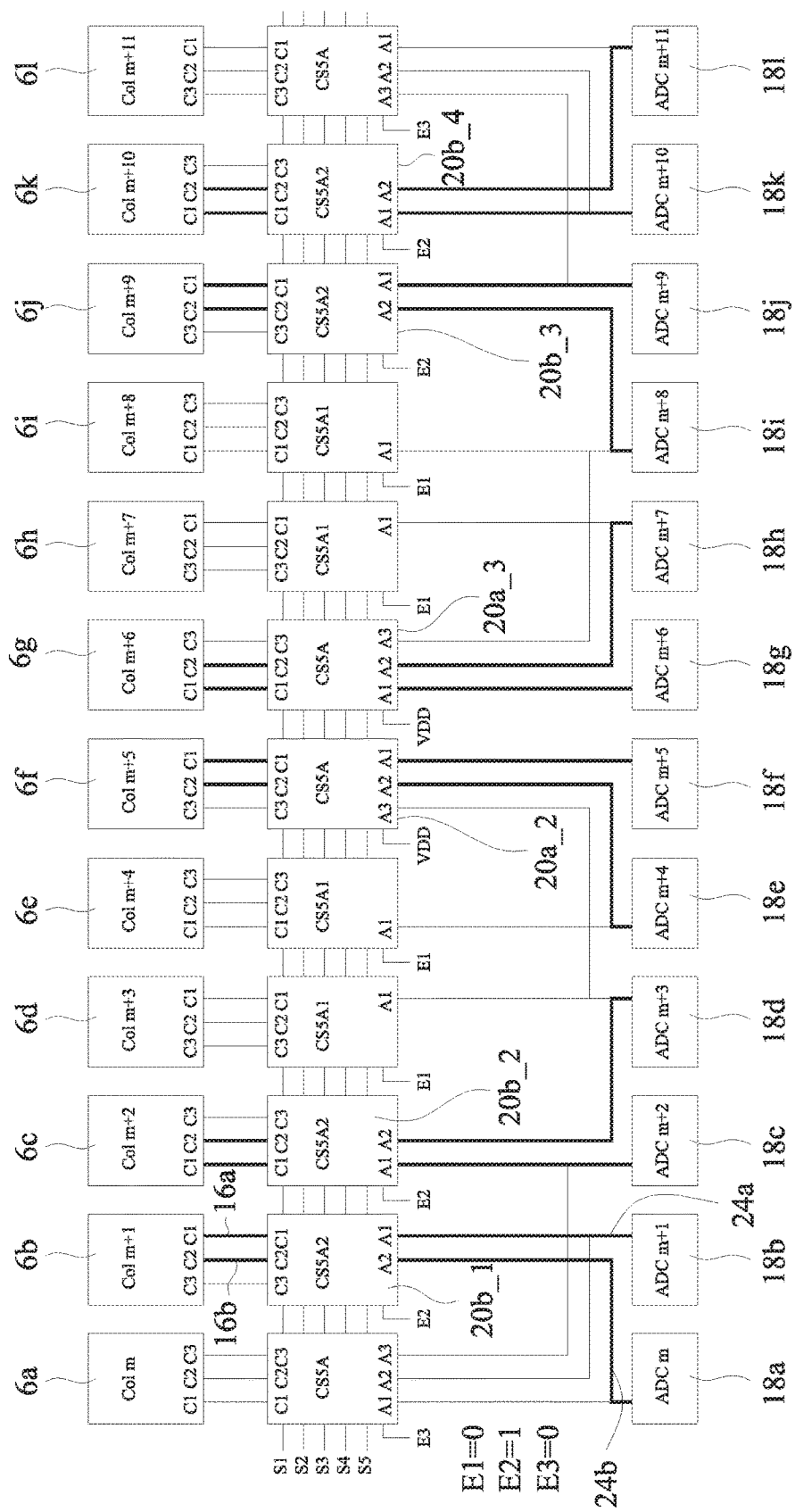
FIG. 3C illustrates the column routing matrix of FIG. 3A configured for a (V:½, H:½) down-sampling read operation, in accordance with some embodiments.

FIG. 3C illustrates the column routing matrix 14a of FIG. 3A configured for a (V:½, H:½) down-sampling read operation, in accordance with some embodiments. The column routing circuits 20a-20b for half of the columns are configured to route two of the column-out signals 16a-16b of the corresponding columns to a corresponding column ADC and an adjacent column ADC of a non-active column. For example, in the illustrated embodiment, the first column 6a is not active and the second column 6b is active during a (V:½, H:½) down-sampling read operation. The column routing circuit 20b_1 of the second column 6b routes the first and second column out signals 16a, 16b of the second column 6b to the first and second column ADCs 18a, 18b. In some embodiments, the column routing circuit 20b_1 routes the first column-out signal 16a of the second column 6b to an associated column ADC 18b and the second column-out signal 16b to an adjacent column ADC 18a. Similarly, in some embodiments, the first column-out signal 16a can be routed to the adjacent column ADC 18a and the second column-out signal 16b can be routed to the associated column ADC 18b. The third column-out signal 16c corresponds to unread rows and is not routed by the column routing circuits 20a-20b during a (V:½, H:½) down-sampling read operation. Although embodiments including adjacent ADCs are disclosed herein, it will be appreciated that the column-out signals 16a-16c can be routed to any column ADC 18a-18l in the CIS 2a.

By routing a first column-out signals 16a to the associated column ADC 18b and a second column-out signal 16b to an adjacent column ADC 18a, the column routing matrix 14a utilizes all of the column ADCs 18a-18l during a (V:½, H:½) down-sampling read operation. Conventional CIS circuits (which utilize only half of the column ADCs during a (V:½, H:½) down-sampling read operation) provide a time saving of only X/2. The column routing matrix 14a allows two rows to be read from the same column 6b simultaneously during a (V:½, H:½) down-sampling read operation. By reading two rows simultaneously, the CIS 2a can complete a (V:½, H:½) down-sampling read operation in a time equal to X/4 (e.g., the (V:½, H:½) down-sampling read operation is four times faster than an all-pixel read operation and twice as fast as a (V:½, H:½) down-sampling read operation in a convention CIS).

In some embodiments, the column routing circuits 20a-20c are coupled to a plurality of enable signals E1-E3 that control activation of the column routing circuits 20a-20c during a (V:½, H:½) down-sampling read operation. For example, in the illustrated embodiment, a first set of column routing circuits 20c_1-20c_4 are coupled to a first enable signal E1, a second set of column routing circuits 20b_1-20b_4 are coupled to a second enable signal E2, and a third set of column routing circuits 20a_1, 20a_4 are coupled to a third enable signal E3. In some embodiments, a fourth set of column routing circuits 20a_2, 20a_3 are always active during any read operation and are coupled directly to a power source VDD. During a (V:½, H:½) down-sampling read operation, the first enable signal E1 and the third enable signal E3 are low and the second enable signal E2 is high. The second enable signal E2 activates the second set of column routing circuits 20b_1-20b_4. The fourth set of column routing circuits 20a_2, 20a_3 coupled directly to power are also activate during a (V:½, H:½) down-sampling read operation. Table 2 below illustrates one embodiment of a control table for a (V:½, H:½) read operation of the CIS 2a.

TABLE 2

| Row # | C1 | C2 | C3 | S[5:1] | ADC # |
|---|---|---|---|---|---|
| 36n | ● | | | 0, 0, 0, 0, 1 | m |
| 36n + 1 | | ● | | 0, 1, 0, 0, 0 | m |
| 36n + 2 | ● | | | 0, 0, 0, 0, 1 | m |
| 36n + 3 | | ● | | 0, 1, 0, 0, 0 | m |
| 36n + 4 | ● | | | 0, 0, 0, 0, 1 | m |
| 36n + 5 | | ● | | 0, 1, 0, 0, 0 | m |
| 36n + 6 | | | ● | 1, 0, 0, 0, 0 | m |
| 36n + 7 | | | ● | 1, 0, 0, 0, 0 | m |
| 36n + 8 | ● | | | 0, 0, 0, 0, 1 | m |
| 36n + 9 | | ● | | 0, 1, 0, 0, 0 | m |
| 36n + 10 | | | ● | 1, 0, 0, 0, 0 | m |
| 36n + 11 | | | ● | 1, 0, 0, 0, 0 | m |
| 36n + 12 | ● | | | 0, 0, 0, 0, 1 | m |
| 36n + 13 | | ● | | 0, 1, 0, 0, 0 | m |
| 36n + 14 | | | ● | 1, 0, 0, 0, 0 | m |
| 36n + 15 | | | ● | 1, 0, 0, 0, 0 | m |
| 36n + 16 | ● | | | 0, 0, 0, 0, 1 | m |
| 36n + 17 | | ● | | 0, 1, 0, 0, 0 | m |
| 36n + 18 | | | ● | 1, 0, 0, 0, 0 | m |
| 36n + 19 | | ● | | 0, 1, 0, 0, 0 | m |
| 36n + 20 | ● | | | 0, 0, 0, 0, 1 | m |
| 36n + 21 | | ● | | 0, 1, 0, 0, 0 | m |
| 36n + 22 | ● | | | 0, 0, 0, 0, 1 | m |
| 36n + 23 | | ● | | 0, 1, 0, 0, 0 | m |
| 36n + 24 | ● | | | 0, 0, 0, 0, 1 | m |
| 36n + 25 | | ● | | 0, 1, 0, 0, 0 | m |
| 36n + 26 | | | ● | 1, 0, 0, 0, 0 | m |
| 36n + 27 | | | ● | 1, 0, 0, 0, 0 | m |
| 36n + 28 | ● | | | 0, 0, 0, 0, 1 | m |
| 36n + 29 | | ● | | 0, 1, 0, 0, 0 | m |
| 36n + 30 | ● | | | 0, 0, 0, 0, 1 | m |
| 36n + 31 | | | ● | 1, 0, 0, 0, 0 | m |
| 36n + 32 | ● | | | 0, 0, 0, 0, 1 | m |
| 36n + 33 | | ● | | 0, 1, 0, 0, 0 | m |
| 36n + 34 | | | ● | 1, 0, 0, 0, 0 | m |
| 36n + 35 | | | ● | 1, 0, 0, 0, 0 | m |

Figure 3D:
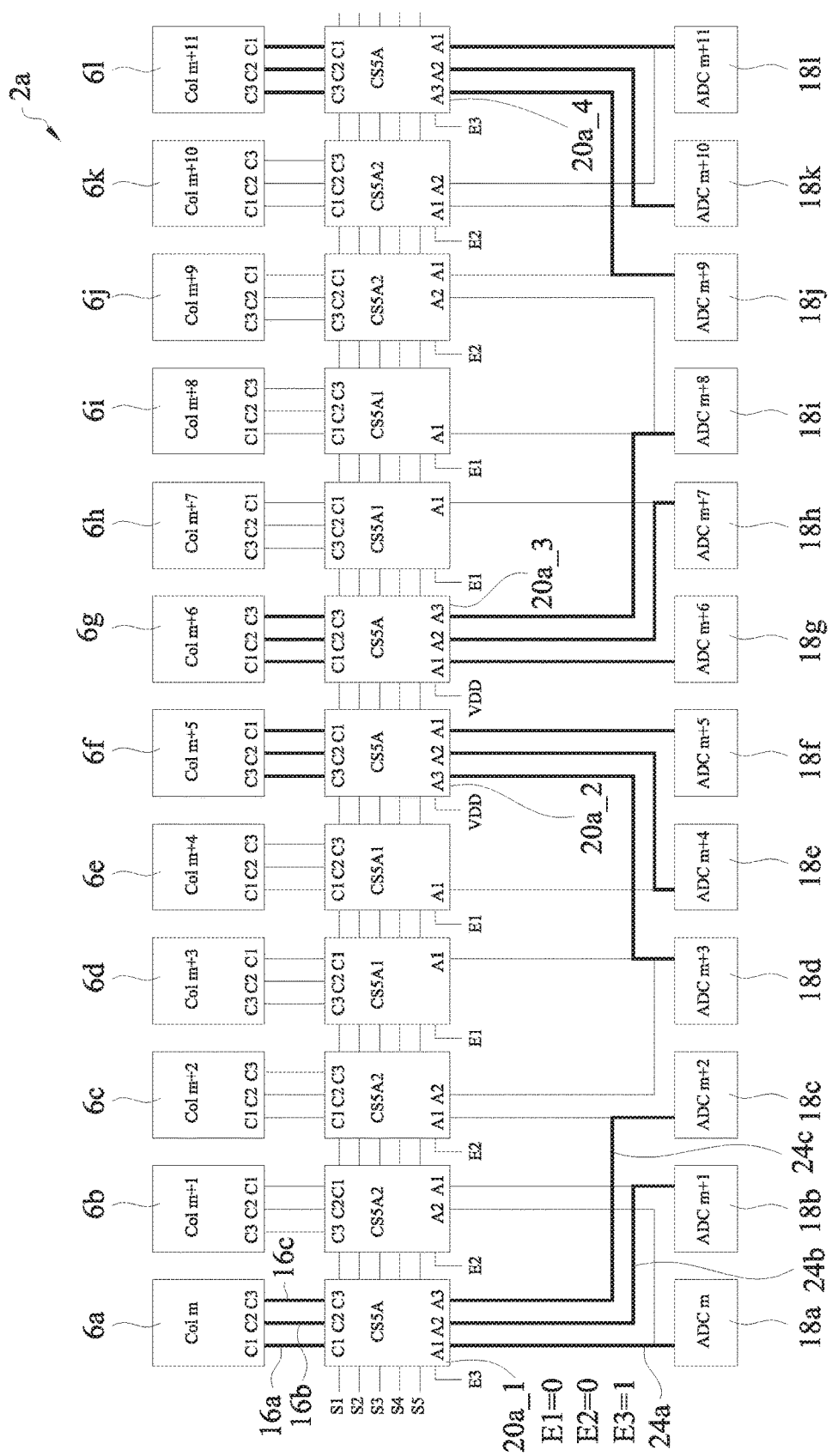
FIG. 3D illustrates the column routing matrix of FIG. 3A configured for a (V:⅓; H:⅓) down-sampling read operation, in accordance with some embodiments.

FIG. 3D illustrates the column routing matrix 14a of FIG. 3A configured for a (V:⅓, H:⅓) down-sampling read operation, in accordance with some embodiments. A set of the column routing circuits 20a_1-20a_4, for example one-third of the column routing circuits 20a-20c, are configured to route the column-out signals 16a-16c for a column to a corresponding column ADC, an adjacent column ADC, and a non-adjacent ADC. For example, in the illustrated embodiment, during a (V:⅓, H:⅓) down-sampling read operation, every 3n−2 row and column (where n is an integer selected from the set of integers (1:(total number of rows)/3)) and every 3n and 3n−1 row and column are skipped. In some embodiments, the column routing circuit 20a_1 of a first column 6a routes the column-out signal paths 16a-16c of the first column 6a to an associated column ADC 18a, an adjacent column ADC 18b, and a non-adjacent column ADC 18c. For example, in some embodiments, the column routing circuit 20a_1 of the first column 6a can route a first column-out signal 16a to a first column ADC 18a, a second column-out signal 16b to a second column ADC 18b, and a third column out signal 16c to a third column ADC 18c. Similarly, the column routing circuit 20a_1 can route the first column-out signal 16a to one of the second or third column ADCs 18b, 18c, the second column-out signal 16b to one of the first or third column ADCs 18a, 18c, and the third column-out signal 16c to one of the first or second column ADCs 18a, 18b. Although embodiments are discussed herein including adjacent and non-adjacent ADCs, it will be appreciated that the column routing matrix 14a can route the column-out signal paths 16a-16c of any of the columns 6a-6l to any of the column ADCs 18a-18l in the CIS 2a.

By routing two of the column out signal paths, for example the second and third column out signal paths 16b, 16c, to adjacent column ADCs 18b, 18c, the column routing matrix 14a utilizes all of the column ADCs 18a-18l during a (V:⅓, H:⅓) down-sampling read operation. Conventional CIS circuits (which utilize only a third of the column ADCs during a (V:⅓, H:⅓) down-sampling read operation) provide a time saving of only X/3. The column routing matrix 14a allows three rows to be read from the same column 6a simultaneously during a (V:⅓, H:⅓) down-sampling read operation. By reading three rows simultaneously, the CIS 2a can complete a (V:⅓, H:⅓) down-sampling read operation in a time equal to X/9 (e.g., the (V:⅓, H:⅓) down-sampling read operation is nine times faster than an all-pixel read operation and three times as fast as a (V:⅓, H:⅓) down-sampling read operation in a convention CIS).

During the illustrated (V:⅓, H:⅓) down-sampling read operation, the enable signals E1-E3 are configured to activate only those column routing circuits 20a_1-20a_4 used during the (V:⅓, H:⅓) down-sampling read operation. During the (V:⅓, H:⅓) down-sampling read operation, the first enable signal E1 and the second enable signal E2 are low and the third enable signal E3 is high. The third enable signal E3 enables the third set of column routing circuits 20a_1, 20a_4. The fourth set of column routing circuits 20a_3, 20a_4 coupled directly to VDD is also enabled during a (V:⅓, H:⅓) down-sampling read operation. Table 3 below illustrates one embodiment of a control table for a (V:⅓, H:⅓) read operation of the CIS 2a.

TABLE 3

| Row # | C1 | C2 | C3 | S[5:1] | ADC # |
|---|---|---|---|---|---|
| 36n | ● | | | 0, 0, 0, 0, 1 | m |
| 36n + 1 | | ● | | 0, 0, 0, 1, 0 | m ± 1 |
| 36n + 2 | ● | | | | |
| 36n + 3 | | ● | | | |
| 36n + 4 | ● | | | | |
| 36n + 5 | | ● | | | |
| 36n + 6 | | | ● | 0, 0, 1, 0, 0 | m ± 2 |
| 36n + 7 | | | ● | 0, 0, 1, 0, 0 | m ± 2 |
| 36n + 8 | ● | | | | |
| 36n + 9 | | ● | | | |
| 36n + 10 | | | ● | | |
| 36n + 11 | | | ● | | |
| 36n + 12 | ● | | | 0, 0, 0, 0, 1 | m |
| 36n + 13 | | ● | | 0, 0, 0, 1, 0 | m ± 1 |
| 36n + 14 | | | ● | | |
| 36n + 15 | | | ● | | |
| 36n + 16 | ● | | | | |
| 36n + 17 | | ● | | | |
| 36n + 18 | | | ● | 0, 0, 1, 0, 0 | m ± 2 |
| 36n + 19 | | ● | | 0, 0, 0, 1, 0 | m ± 1 |
| 36n + 20 | ● | | | | |
| 36n + 21 | | ● | | | |
| 36n + 22 | ● | | | | |
| 36n + 23 | | ● | | | |
| 36n + 24 | ● | | | 0, 0, 0, 0, 1 | m |
| 36n + 25 | | ● | | 0, 0, 0, 1, 0 | m ± 1 |
| 36n + 26 | | | ● | | |
| 36n + 27 | | | ● | | |
| 36n + 28 | ● | | | | |
| 36n + 29 | | ● | | | |
| 36n + 30 | ● | | | 0, 0, 0, 0, 1 | m |
| 36n + 31 | | | ● | 0, 0, 1, 0, 0 | m ± 2 |
| 36n + 32 | ● | | | | |
| 36n + 33 | | ● | | | |
| 36n + 34 | | | ● | | |
| 36n + 35 | | | ● | | |

As shown in FIGS. 3A-3D, a plurality of column-out signal paths 16a-16c of each column 6a-6f and the column routing matrix 14a allow the CIS 2a to utilize all of the column ADCs 18a-18f during any available read operation, such as, an all-pixel read operation, a (V:½, H:½) down-sampling read operation, and/or a (V:⅓, H:⅓) down-sampling read operation. In some embodiments including a (V:⅓, H:⅓) down-sampling read operation, a minimum of three column-out signal paths 16a-16c per column is included, although it will be appreciated that each column can comprise a greater or lesser number of column-out signal paths 16a-16c.

In some embodiments, the array 4a includes a minimum row routing pattern. For example, for a (V:½, H:½) down-sampling read, two rows of each column are read simultaneously to utilize all of the column ADCs 18a-18l during the read operation, which requires a minimum four row routing pattern: for example, first and second rows coupled to a first column-out signal 16a and third and fourth rows coupled to a second column-out signal 16b. For a (V:⅓, H:⅓) down-sampling read operation, three rows of each column are read simultaneously to utilize all of the column ADCs 18a-18l during the read operation, which requires a minimum nine row routing pattern: for example, first, second and third rows coupled to a first column-out signal 16a, fourth, fifth, and sixth rows coupled to a second column-out signal 16b, and seventh, eighth, and ninth rows coupled to a third column-out signal 16c.

In embodiments configured for both a (V:½, H:½) down-sampling read operation and a (V:⅓, H:⅓) down-sampling read operation, the minimum routing pattern is the least common multiple (LCM) of the minimum row routing pattern for each of a (V:½, H:½) down-sampling read operation and a (V:⅓, H:⅓) down-sampling read operation. For example, for the array 4a illustrated in FIG. 2A, the minimum number of rows in a routing pattern configured for both a (V:½, H:½) down-sampling read operation and a (V:⅓, H:⅓) down-sampling read operation is thirty-six (the least common multiple of the minimum (V:½, H:½) routing pattern (4) and the minimum (V:⅓, H:⅓) routing pattern (9)). For embodiments including 2×2 or 2×4 shared pixel elements (as discussed in more detail below), the minimum routing pattern is 72 rows (the least common multiple of an 8 row (V:½, H:½) routing pattern and an 18 row (V:⅓, H:⅓) routing pattern).

Although specific routing patterns are discussed herein, it will be appreciated that any suitable routing pattern connecting the row pixels to a plurality of column-out signal paths 16a-16c which satisfies the down-sampling read operations can be used. In some embodiments, routing patterns are selected so that the pixels in a column that are read at the same time during a down-sampling read operation are connected to different column-out routing paths 16a-16c and that an equal number of pixels 10 are connected to each of the column-out signal paths 16a-16c. In other embodiments, the routing pattern can be selected to satisfy one or more alternative and/or additional requirements.

Figure 4A:
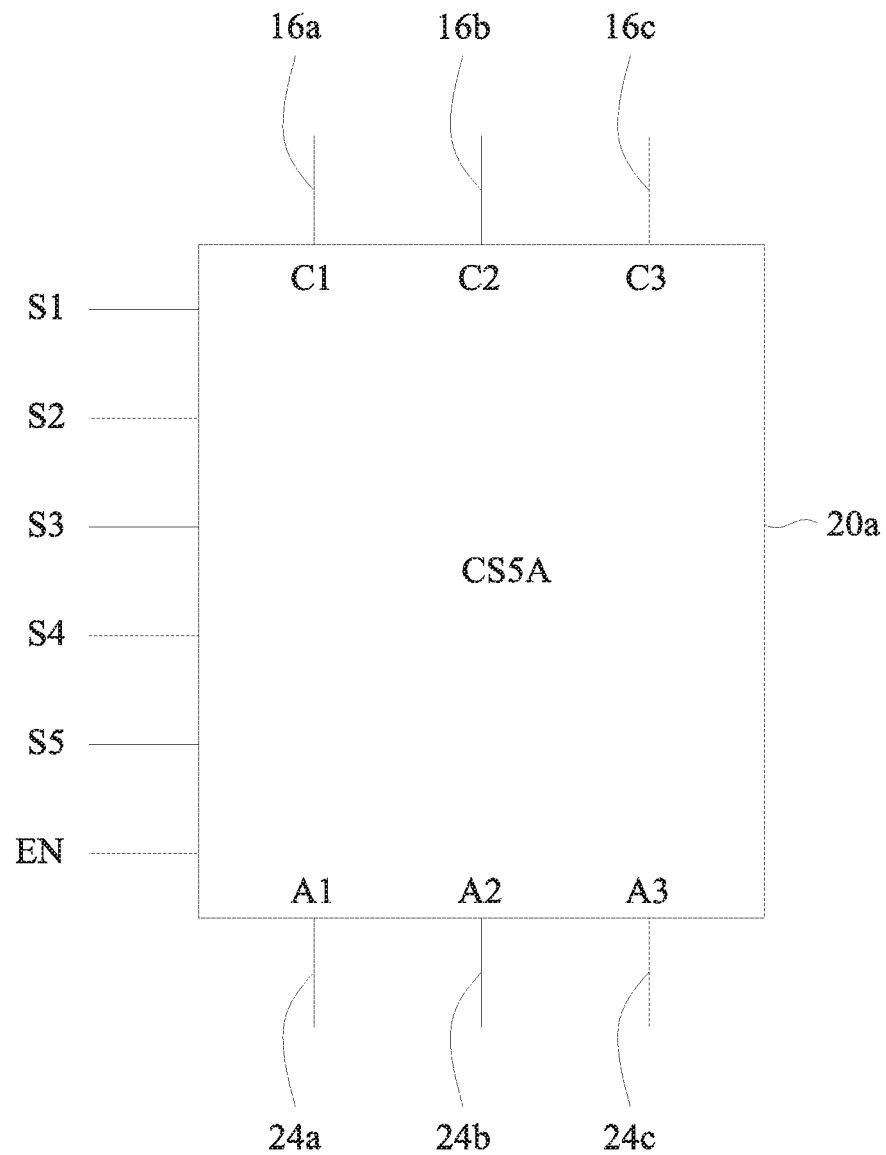
FIG. 4A illustrates a first column routing circuit of the column routing matrix of FIG. 3A, in accordance with some embodiments.

FIGS. 4A-6B illustrate column routing circuits 20a-20c, in accordance with some embodiments. One embodiment of the first column routing circuit 20a is illustrated in FIG. 4A. The first column routing circuit 20a is configured to receive a plurality of control signals S[1:5], an enable signal EN, and a plurality of column-out signals 16a-16c. The first column routing circuit 20a is configured to generate an output on one or more output lines 24a-24c. The output lines 24a-24c are each coupled to a different column ADC 18a-18f. For example, in some embodiments, the first output 24a is coupled to a column ADC 18a associated with the same column 6a as the first column routing circuit 20a, the second output 24b is coupled to an adjacent column ADC 18b, and the third output is coupled to a non-adjacent column ADC 18c. In some embodiments, the non-adjacent column ADC 18c is adjacent to the adjacent column ADC 18b. Although specific routing arrangements are discussed herein, it will be appreciated that the outputs 24a-24c of the column routing circuit 20a can be coupled to any of the column ADCs 18a-18f in the CIS 2a. The first column routing circuit 20a routes one or more of the column-out signals 16a-16c to one or more of the outputs 24a-24c based on the read operation being performed by the CIS 2a. In some embodiments, an enable signal EN is configured to control activation of the first column routing circuit 20a.

Figure 4B:
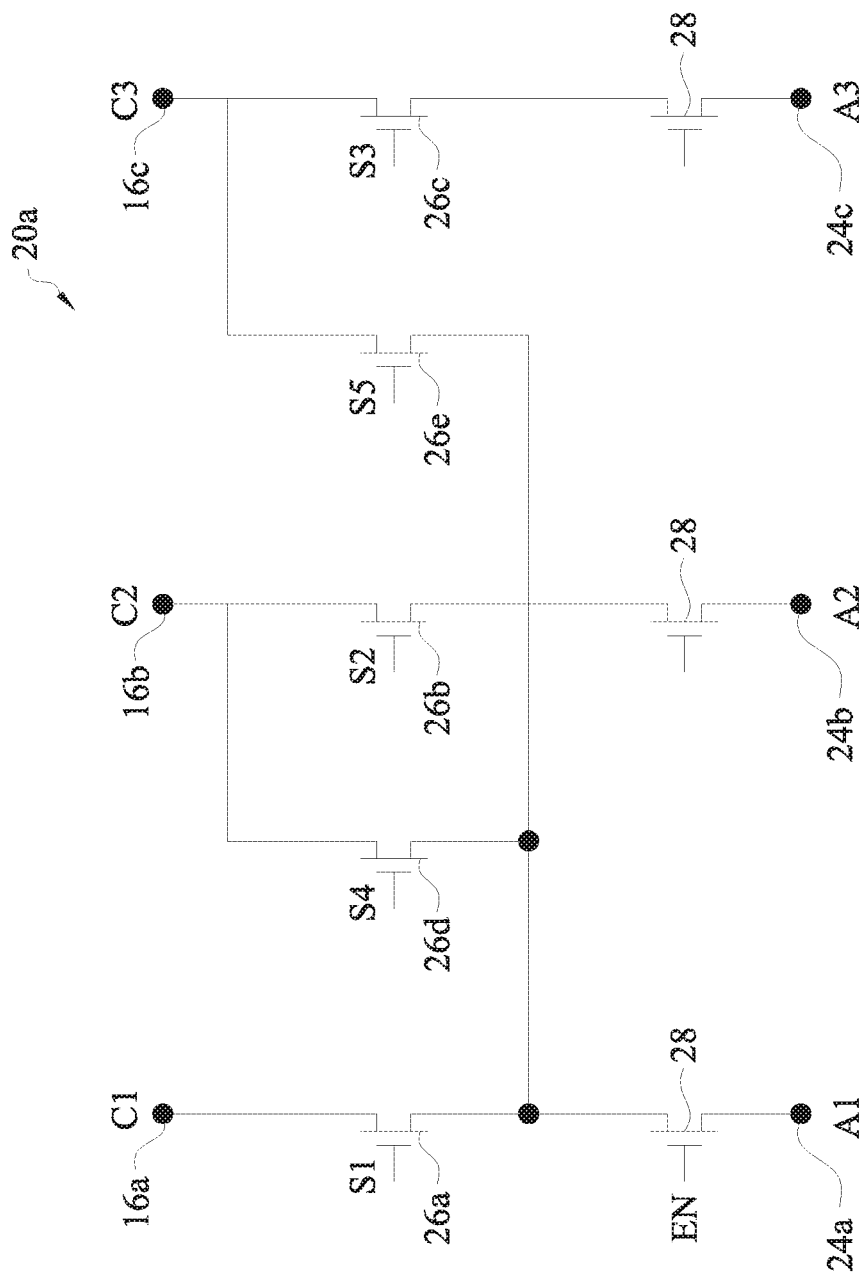
FIG. 4B illustrates a schematic of the first column routing circuit of FIG. 4A, in accordance with some embodiments.

FIG. 4B illustrates a circuit schematic of one embodiment of the first column routing circuit 20a. In some embodiments, the first column routing circuit 20a includes a plurality of routing transistors 26a-26e coupled to the plurality of column-out signals 16a-16c and the plurality of outputs 24a-24c. Each of the plurality of routing transistors 26a-26e includes a gate coupled to a corresponding control signal S[1:5]. For example, a first routing transistor 26a can be coupled to the first column-out signal 16a at a drain and the first output 24a at a source (for NMOS gates). When the first control signal S1 is high, the first routing transistor 26a routes the pixel information on the first column-out signal path 16a to the first output 24a. Similarly, a second routing transistor 26b can be coupled to the second column-out signal path 16b at a drain and the second output 24b at a source, and a third routing transistor 26c can be coupled to the third column-out signal path 16c at a drain and the third output 24c at a source. When the second or the third control signals S[2:3] are high, the respective column routing transistor 26b, 26c are turned on to pass signals on the respective column-out signal path 16b, 16c to the associated outputs 24b, 24c.

A fourth routing transistor 26d can be further coupled between the second column-out path 16b (at a drain) and the first output 24a of the column routing circuit 20a (at a source). The gate of the fourth routing transistor 26d is coupled to a fourth control signal S[4]. When the fourth control signal S[4] is high, the fourth routing transistor 26d routes the signal on the second column-out signal path 16b to the first output 24a. Similarly, a fifth routing transistor 26e is further coupled between the third column-out path 16c (at a drain) and the first output 24a (at a source) of the column routing circuit 20a. The gate of the fifth routing transistor 26e is coupled to a fifth control signal S[5]. When the fifth control signal S[5] is high, the fifth routing transistor 26e routes the pixel information on the third column-out signal path 16c to the first output 24a. Although embodiments including enable-high transistors are discussed herein, it will be appreciated that any of the column routing circuits 20a-20c discussed herein can including enable-low transistors.

In some embodiments, an enable transistor 28 is coupled between each of the routing transistors 26a-26e and the respective outputs 24a-24c. The enable transistors 28 each have a gate coupled to the enable signal EN. During a read operation that includes the first column routing circuit 20a, the enable signal EN is set high, enabling one or more of the column-out signals 16a-16c to be output at one or more of the outputs 24a-24c. During a read operation that does not include the first column routing circuit 20a, the enable signal is set low, preventing the pixels 10 of the unused columns from being transmitted to the column ADCs 18a-18l. In some embodiments, the enable signal EN is a constant signal VDD that maintains the column routing circuit 20a in an enabled state.

The control signals S[1:5] define the read operation performed on the array 4a of the CIS 2a. For example, during an all-pixel read operation, each of the column-out signal paths 16a-16c are coupled to the first output 24a of the column routing circuit 20a to sequentially output all of the pixels 10 in a column 6a to a single column ADC 18a. The first control signal S[1], fourth control signal S[4], and fifth control signal S[5] are simultaneously set high to connect each of the column-out signal paths 16a-16c to the first output 24a. Each of the pixels 10 in the column 6a associated with the first column routing circuit 20a are sequentially activated by the row driver circuit 12 and provided to the first column ADC 18a, which is coupled to the first output 24a. In other embodiments, the first, fourth, and fifth control signals S[1], S[4], S[5] may be sequentially cycled to couple only a single column-out signal path 16a-16c to the output 24a at any time.

In some embodiments, during a (V:½, H:½) down-sampling read operation, the first control signal S[1] and the second control signal S[2] are set high, coupling the first column-out signal path 16a to the first output 24a and the second signal path 16b to the second output 24b. The third, fourth, and fifth control signals S[3:5] are set low and the third column-out signal path 16c is not used (e.g., the third and fifth routing transistors 26c, 26e are off). A first pixel 10a coupled to the first column-out signal path 16a in the associated column 6a is activated by the row driver circuit 12. Simultaneously, a second pixel 10b coupled to the second column-out signal path 16b in the associated column 6a is activated by the row driver circuit 12. The first column-out signal path 16a is routed to a column ADC 18a by the first output 24a and the second column-out signal path 16b is routed to an adjacent ADC 18b by the second output 24b. The row driver circuit 12 sequentially activates pairs of pixels to read two rows simultaneously from the column 6a during a (V:½, H:½) down-sampling read operation. In other embodiments, the first column routing circuit 20a is not used during a (V:½, H:½) down-sampling read operation and the enable signal EN is set low.

In some embodiments, during a (V:⅓, H:⅓) down-sampling read operation, the first control signal S[1], the second control signal S[2], and the third control signal S[3] are set high, coupling the first column-out signal path 16a to the first output 24a, the second column-out signal path 16b to the second output 24b, and the third column-out signal path 16c to the third output 24c. The fourth and fifth control signals S[4:5] are set low. A first pixel 10a coupled to the first column-out signal path 16a in the associated column 6a is activated by the row driver circuit 12. Simultaneously, a second pixel 10b coupled to the second column-out signal path 16b and a third pixel 10c coupled to the third column-out signal path 16c in the associated column 6a are activated by the row driver circuit 12. The signal of the first column-out signal path 16a is routed to a column ADC 18a coupled to the first output 24a. The signal of the second column-out signal path 16b is routed to an adjacent ADC 18b coupled to the second output 24b. The signal of the third column-out signal path 16c is routed to a non-adjacent ADC 18c coupled to the third output 24c. The row driver circuit 12 sequentially activates triplets of pixels to read three rows simultaneously from the column 6a during a (V:⅓, H:⅓) down-sampling read operation. In other embodiments, the first column routing circuit 20a is not used during a (V:⅓, H:⅓) down-sampling read operation and the enable signal EN is set low.

Figure 5A:
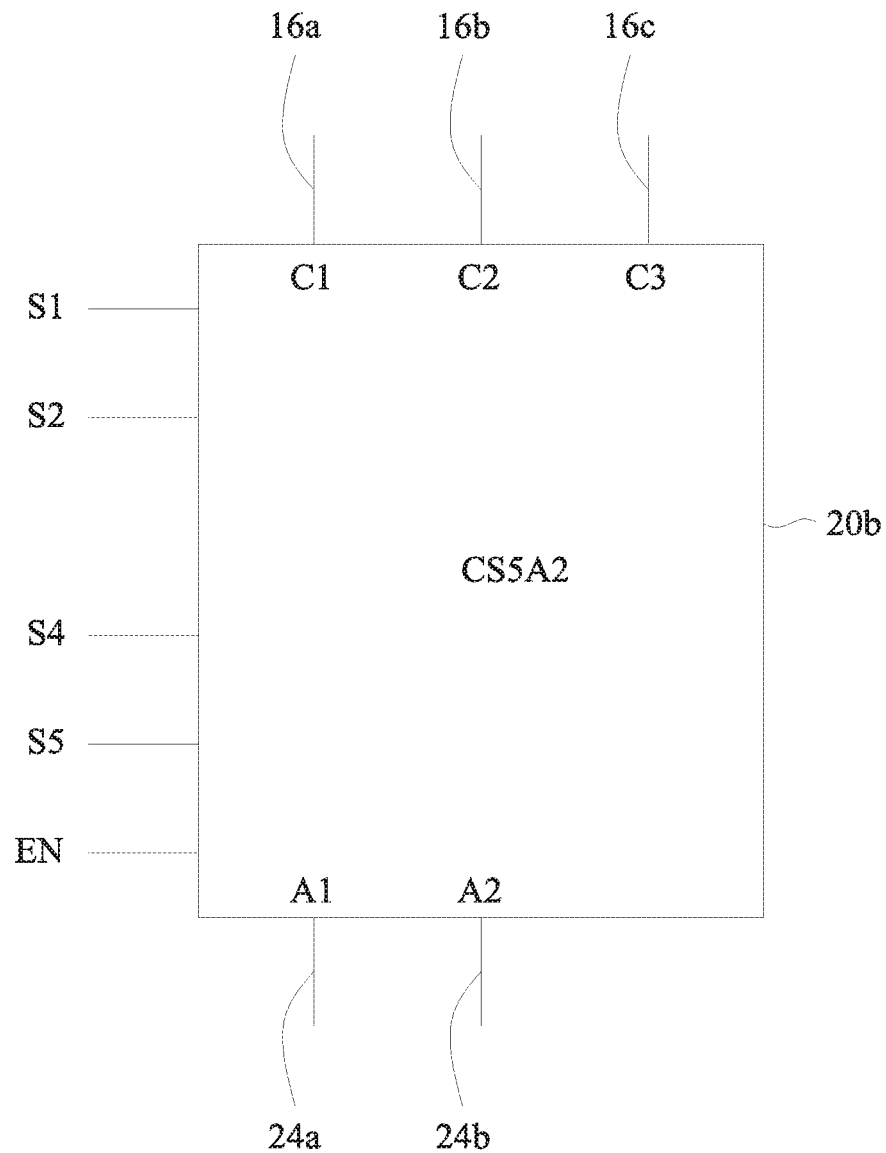
FIG. 5A illustrates a second column routing circuit of the column routing matrix of FIG. 3A, in accordance with some embodiments.

FIG. 5A illustrates one embodiment of a second column routing circuit 20b. The second column routing circuit 20b receives a sub-set of the plurality of control signals S[1:5], an enable signal EN, and a plurality of column-out signals 16a-16c. In the illustrated embodiment, the second column routing circuit 20b receives only the first S1, second S2, fourth S4, and fifth S5 control signals. The second column routing circuits 20b is configured to route one or more of the column-out signal paths 16a-16c to one or more output lines 24a-24b. The output lines 24a-24b are each coupled to a different column ADC 18a-18l. For example, in some embodiments, the first output 24a is coupled to a column ADC 18b associated with the corresponding column 6b of the second column routing circuit 20b and the second output 24b is coupled to an adjacent column ADC 18a. Although specific routing arrangements are discussed herein, it will be appreciated that the outputs 24a-24b of the second column routing circuit 20b can be coupled to any of the column ADCs 18a-18l in the CIS 2a. The second column routing circuit 20a routes each of the column-out signal 16a-16c inputs to one or more of the outputs 24a-24b based on the read operation being performed by the CIS 2a. In some embodiments, an enable signal EN is configured to control activation of the second column routing circuit 20b.

Figure 5B:
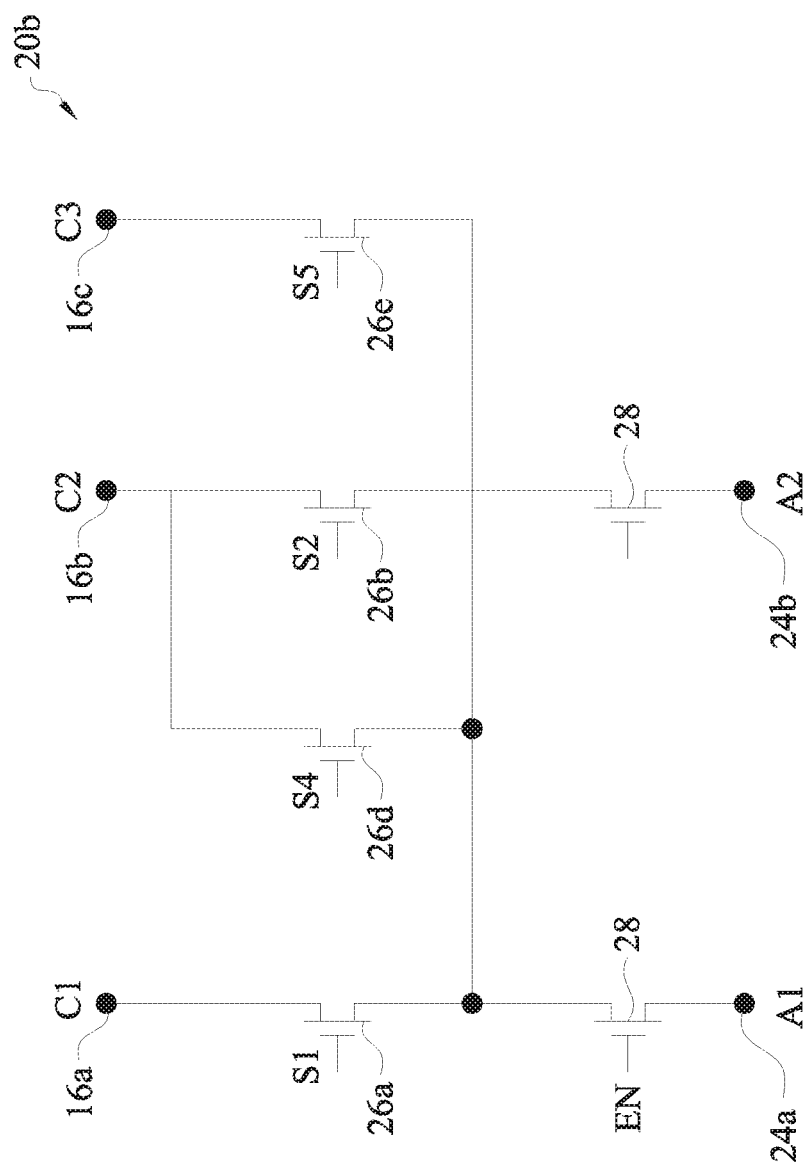
FIG. 5B illustrates a schematic of the second column routing circuit of FIG. 5A, in accordance with some embodiments.

FIG. 5B illustrates a circuit schematic of one embodiment of the second column routing circuit 20b. The second column routing circuit 20b is similar to the first column routing circuit 20a but omits the third routing transistor 26c. In some embodiments, during an all-pixel read operation, each of the column-out signal paths 16a-16b are coupled to the first output 24a of the second column routing circuit 20b to sequentially output all of the pixels 10 in a column 6b to a single column ADC 18b. In some embodiments, the first control signal S[1], fourth control signal S[4], and fifth control signal S[5] are simultaneously set high to connect each of the column-out signal paths 16a-16c to the first output 24a. Each of the pixels 10 in the column 6a associated with the second column routing circuit 20b are sequentially activated by the row driver circuit 12 and provided to the second column ADC 18b, which is coupled to the first output 24a. In other embodiments, the control signals S[1], S[4], and S[5] may be sequentially cycled to couple only a single column-out signal path 16a-16c to the output 24a at any time.

In some embodiments, during a (V:½, H:½) down-sampling read operation, the first control signal S[1] and the second control signal S[2] are set high, coupling the first column-out signal path 16a to the first output 24a and the second signal path to the second output 24b. The fourth and fifth control signals S[4:5] are set low and the third column-out signal path 16c is not used. A first pixel 10a coupled to the first column-out signal path 16a in the associated column 6b is activated by the row driver circuit 12. Simultaneously, a second pixel 10b coupled to the second column-out signal path 16b in the associated column 6b is activated by the row driver circuit 12. The first column-out signal path 16a is routed to a column ADC 18a coupled to the first output 24a and the second column-out signal path 16b is routed to an adjacent ADC 18b coupled to the second output 24b. The row driver circuit 12 sequentially activates two rows simultaneously from the column 6b during a (V:½, H:½) down-sampling read operation. In other embodiments, the second column routing circuit 20b is not used during a (V:½, H:½) down-sampling read operation and the enable signal EN is set low.

Figure 6A:
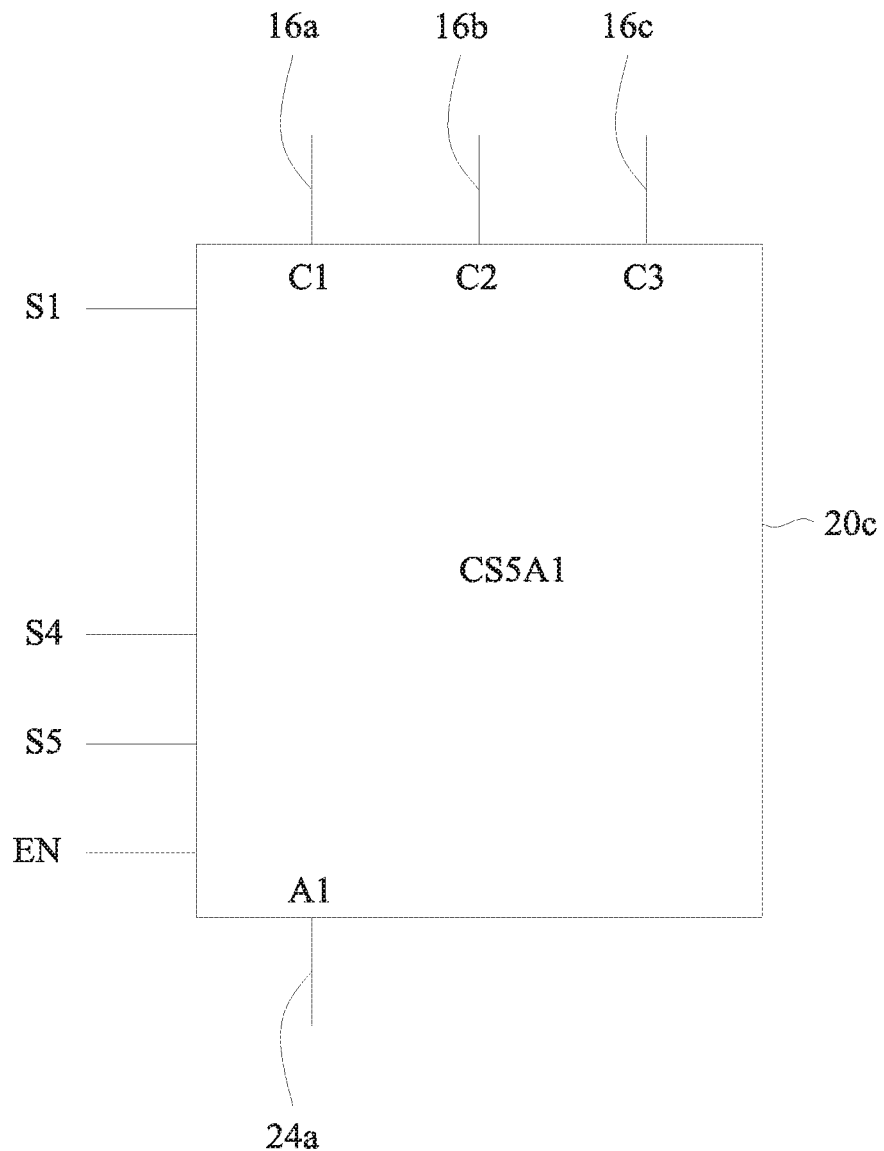
FIG. 6A illustrates a third column routing circuit of the column routing matrix of FIG. 3A, in accordance with some embodiments.

FIG. 6A illustrates one embodiment of a third column routing circuit 20c. The third column routing circuit 20c receives a sub-set of the plurality of control signals S[1:5], an enable signal EN, and a plurality of column-out signals 16a-16c. In the illustrated embodiment, the third column routing circuit 20c receives only the first S[1], fourth S[4], and fifth S[5] control signals. The third column routing circuit 20c is configured to route the column-out signal paths 16a-16c to an output at an output 24a. The output 24a is coupled to a column ADC 18d associated with the column 6d of the third column routing circuit 20c. The third column routing circuit 20c routes each of the column-out signal paths 16a-16c to a column ADC 18d coupled to the output 24a during an all-pixel read operation. In some embodiments, an enable signal EN is configured to control activation of the third column routing circuit 20c.

Figure 6B:
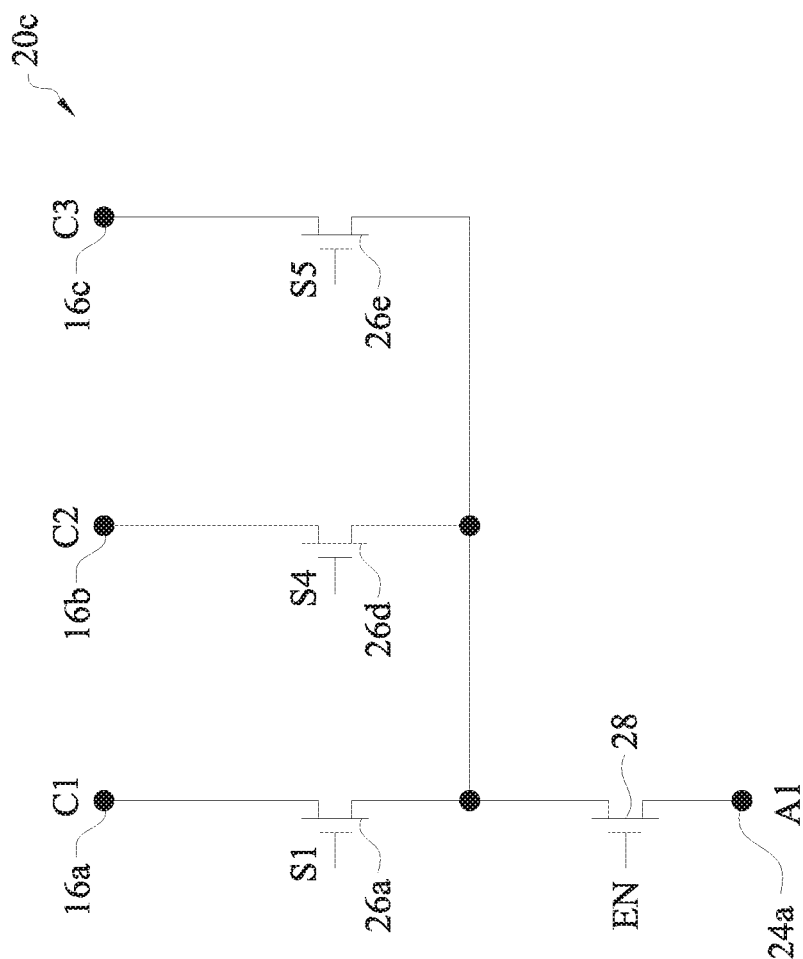
FIG. 6B illustrates a schematic of the third column routing circuit of FIG. 6A, in accordance with some embodiments.

FIG. 6B illustrates a circuit schematic of one embodiment of the third column routing circuit 20c. The third column routing circuit 20c is similar to the first column routing circuit 20a but omits the second and third routing transistors 26b, 26c. In some embodiments, during an all-pixel read operation, the first control signal S[1], fourth control signal S[4], and fifth control signal S[5] are simultaneously set high to connect each of the column-out signal paths 16a-16c to the first output 24a. Each of the pixels 10 in the column 6d associated with the third column routing circuit 20c are sequentially activated by the row driver circuit 12 and provided to the column ADC 18d. In other embodiments, the control signals S[1], S[4], and S[5] may be sequentially cycled to couple only a single column-out signal path 16a-16c to the output 24a at any time.

The third column routing circuit 20c is not used during either a (V:½, H:½) down-sampling read operation or a (V:⅓, H:⅓) down-sampling read operation. The third column routing circuit 20c is coupled to columns that are skipped in both down-sampling read operations. In some embodiments, the third column routing circuit 20c is coupled to an enable signal EN. The enable signal EN is high during an all-pixel read operation and low during any down-sampling read operation.

The column routing circuits 20a-20c are combined in a column routing matrix 14a to route the pixels 10 of the array 4a as discussed above. Although specific embodiments of column routing circuits 20a-20c and column routing matrix 14a are presented herein, it will be appreciated that any set of column routing circuits and/or column routing matrix configured to properly route the column-out signals 16a-16c of each column 6a-6l during each of an all-pixel read operation, a (V:½, H:½) down-sampling read operation, or a (V:⅓, H:⅓) down-sampling read operation can be used and are within the scope of this disclosure.

Figure 7A:
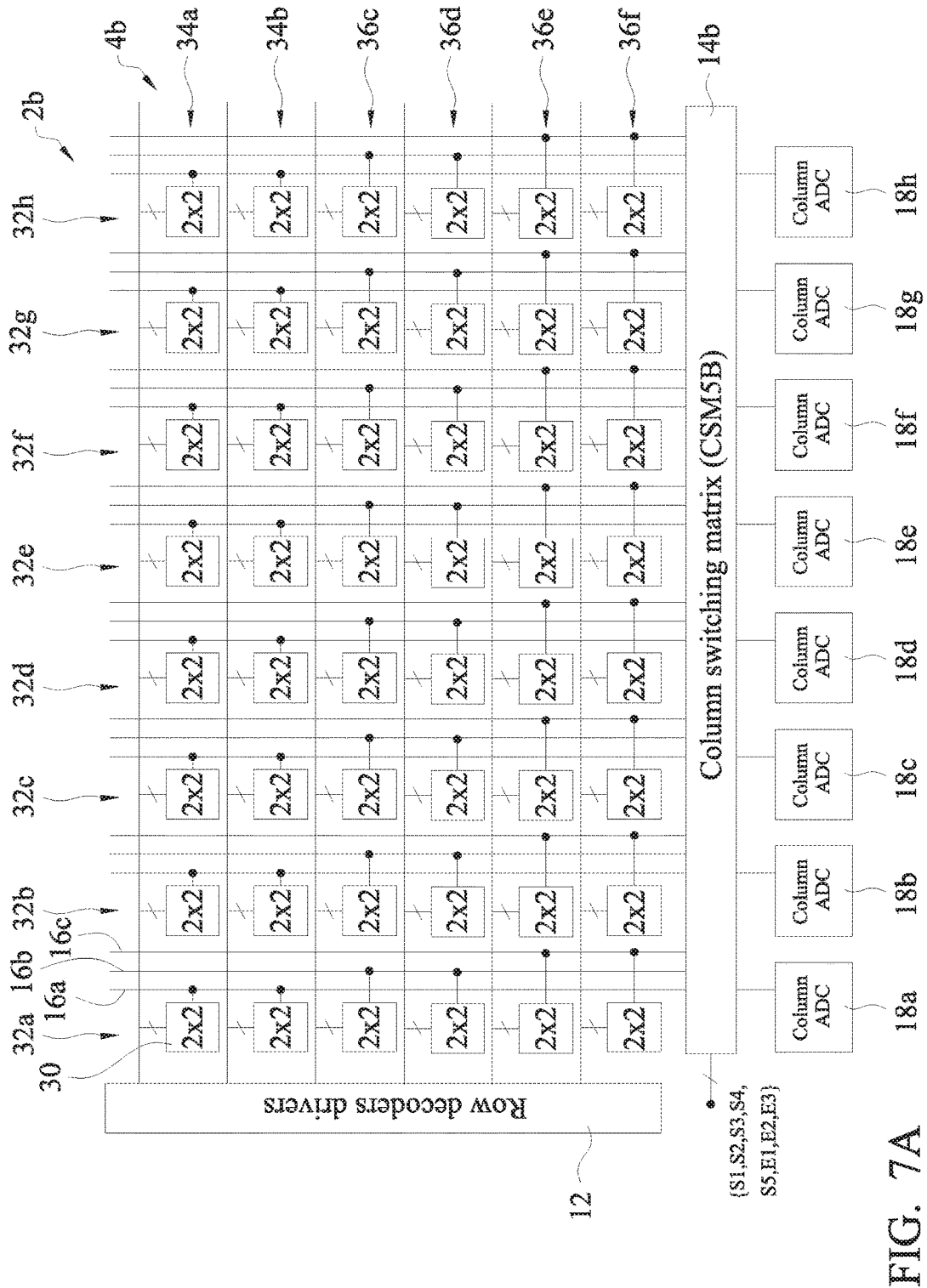
FIG. 7A illustrates a CIS including an array of 2×2 pixel elements having a plurality of column-out signal paths and a column routing matrix, in accordance with some embodiments.

FIG. 7A illustrates one embodiment of a CIS 2b including an array 4b of 2×2 shared pixel elements 30. The CIS 2b is similar to the CIS 2a described above and similar description is not repeated herein. The CIS 2b includes 2×2 shared pixel elements 30 which group multiple pixels as a single element within the array 4b. The pixel elements 30 include four pixels (two rows by two columns) that share one or more common structures, such as, for example, a reset transistor, a source follower transistor, a row select transistor, a floating diffusion node, and/or a column-out signal node. In some embodiments, the pixel elements 30 include pixels having color filters arranged in a predetermined pattern, such as, for example, a red-green-green-blue (RGGB) pattern.

In the illustrated embodiment, each column 32a-32h of 2×2 pixels contains two columns of individual pixels. For example, the first column 32a of 2×2 pixel elements 30 contains a first pixel column m and a second pixel column m+1, the second column 32b of pixel elements 30 contains a third pixel column m+2 and a fourth pixel column m+3, etc. Each of the 2×2 pixel elements 30 are coupled to one of a plurality of column-out signal paths 16a-16c such that each column of pixels (e.g., m, m+1) in a column 32a of pixel elements 30 shares one of the column-out signal path 16a-16c. Each column 32a-32h of pixel elements 30 has an associated column ADC 18a-18h, as the pixels sharing the same floating diffusion node (e.g., shared pixels within a 2×2 pixel element 30) cannot be read at the same time. The column-out signal paths 16a-16c are coupled to a column routing matrix 14c configured to route signals from one or more of the 2×2 pixel elements 30 to one or more of the column ADCs 18a-18h. In some embodiments, a read operation of a pixel element 30 includes reading all rows in the first pixel column (e.g., m) in the pixel element 30 and subsequently reading all rows in the second pixel column (e.g., m+1).

Figure 7B:
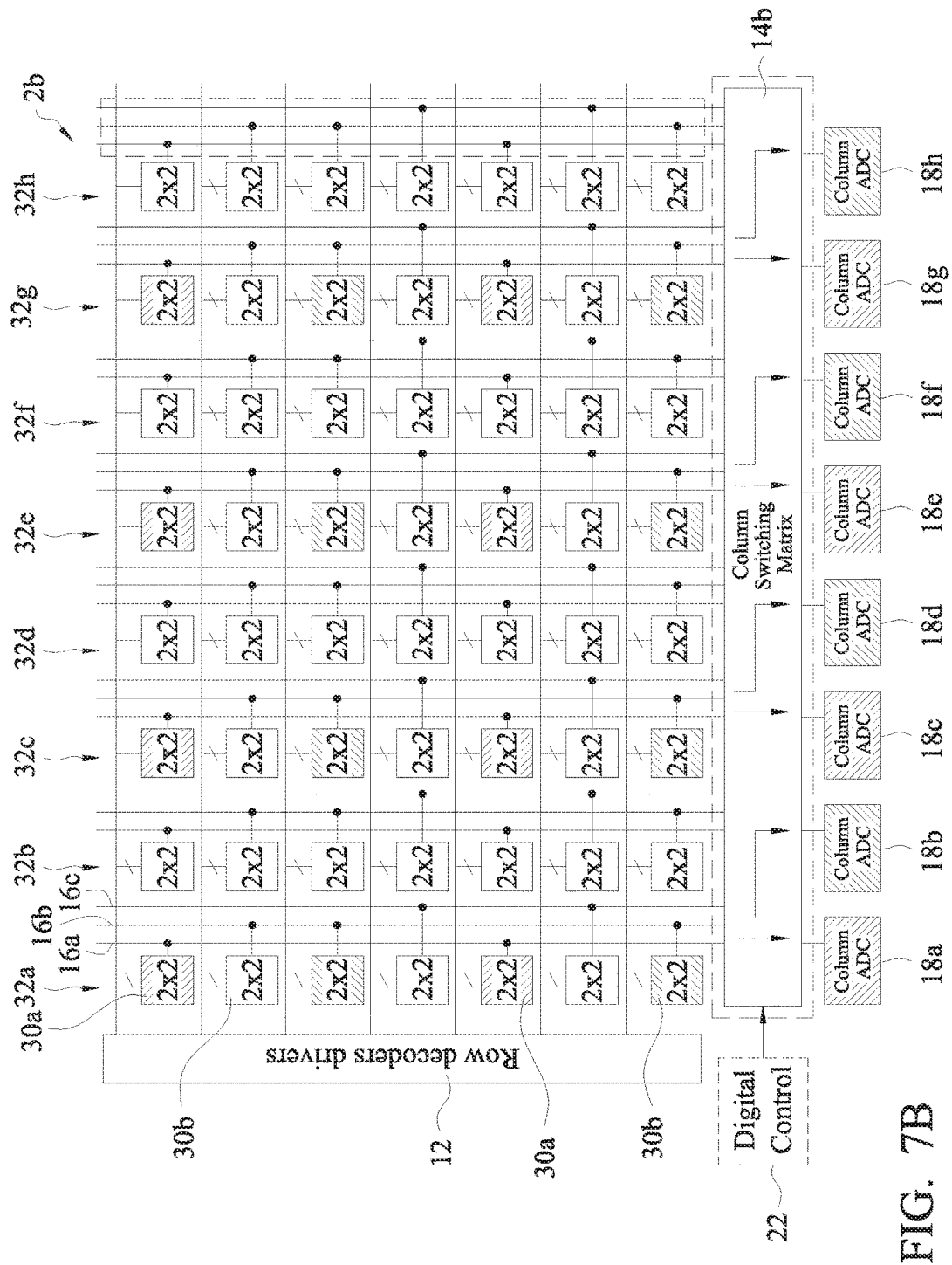
FIG. 7B illustrates the CIS of FIG. 7A configured for a (V:½, H:½) down-sampling read operation, in accordance with some embodiments.

FIG. 7B illustrates the CIS 2b of FIG. 7A configured for a (V:½, H:½) down-sampling read operation, in accordance with some embodiments. During the (V:½, H:½) down-sampling read operation, only half of the columns 32a-32h and half of the rows 34a-34g of 2×2 pixel elements 30 are read. For example, in the illustrated embodiment, every other row and every other column in the array 4b is skipped during a (V:½, H:½) down-sampling read operation. All of the pixels in each active pixel element 30 are read out by a column ADC 18a or an adjacent column ADC 18b. For example, in the illustrated embodiment, the first pixel element 30a in the first column 32a includes four pixels that are read during a (V:½, H:½) down-sampling read operation: a pixel in row n, column m, a pixel in row n, column m+1, a pixel in row n+1, column m, and a pixel in row n+1, column m+1. Each pixel of a pixel element 30 is routed by a column-out signal paths 16a-16c and the column routing matrix 14b to one of the column ADCs 18a-18l. For example, in some embodiments, a first set of pixel elements 30a in a first column 32a are routed to a column ADC 18a associated with the first column 32a and a second set of pixel elements 30b in the first column 32a are routed to an adjacent column ADC 18b associated with the second column 32b. The CIS 2b utilizes all of the column ADCs 18a-18l during a (V:½, H:½) down-sampling read operation.

Figure 7C:
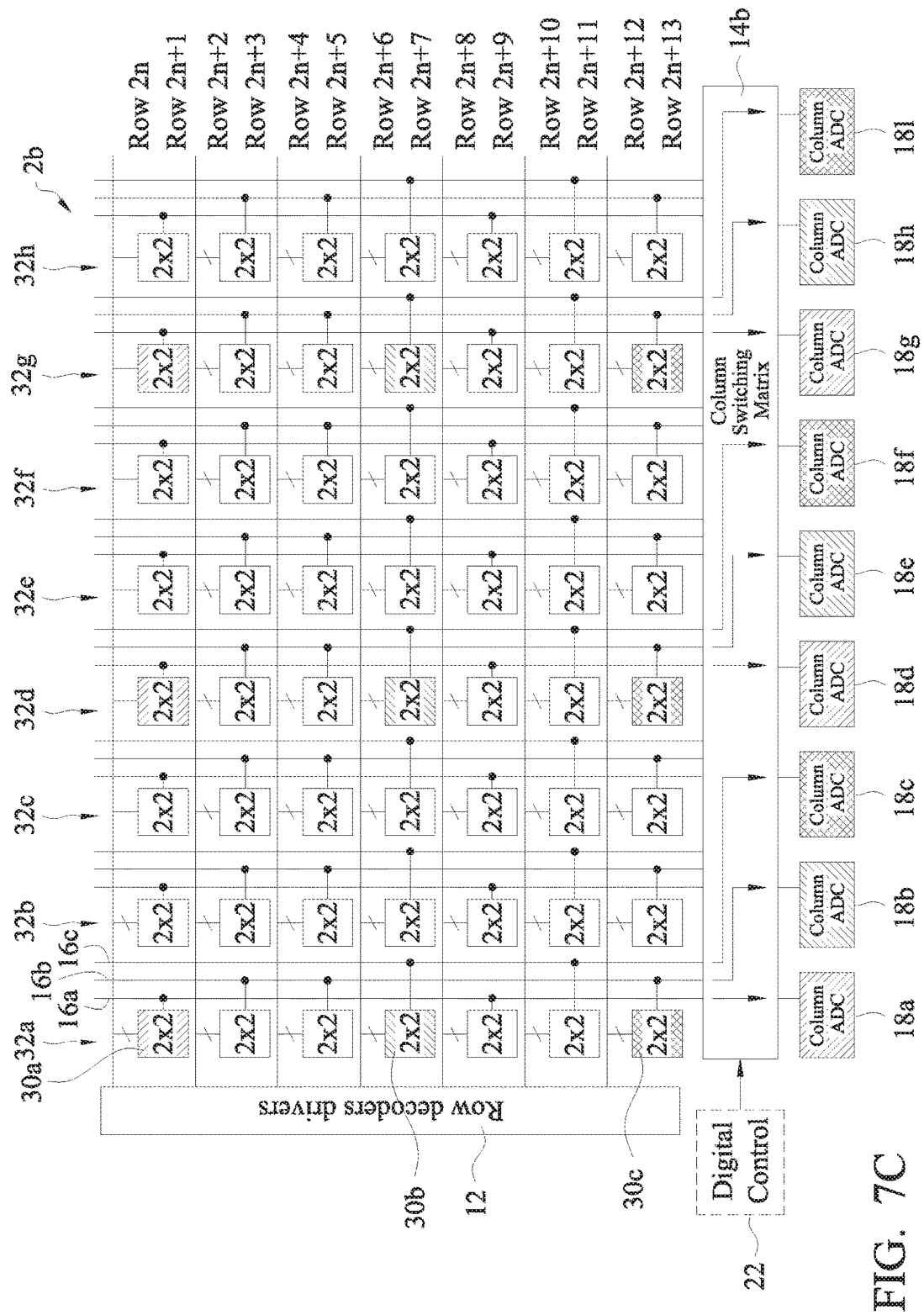
FIG. 7C illustrates the CIS of FIG. 7A configured for a (V:⅓, H:⅓) read operation, in accordance with some embodiments.

FIG. 7C illustrates the CIS 2b of FIG. 7A configured for a (V:⅓, H:⅓) down-sampling read operation, in accordance with some embodiments. During the (V:⅓, H:⅓) down-sampling read operation, only one-third of the columns 32a-32h and one-third of the rows 34a-34g of 2×2 pixel elements 30 are read. For example, in the illustrated embodiment, pixel elements 30 in every third row (e.g., each 3n−2 column is read, where n is an integer selected from the set of [1:(total rows of pixel elements 30)/3]) and every third column (e.g., each 3n−2 column is read) in the array 4b are read during a (V:⅓, H:⅓) down-sampling read operation while every two rows (e.g., each 3n and 3n−1 row) and two columns (e.g., each 3n and 3n−1 column) being skipped. The pixels in each pixel element 30 are read out by one of the column ADCs 18a-18l. For example, in the illustrated embodiment, the first pixel element 30a in the first column 32a includes four pixels that are read during a (V:⅓, H:⅓) down-sampling read operation: a pixel in row n, column m, a pixel in row n, column m+1, a pixel in row n+1, column m, and a pixel in row n+1, column m+1. Each of the active pixel elements 30a-30c are routed by a column-out signal path 16a-16c and the column routing matrix 14b to one of the column ADCs 18a-18l. For example, in some embodiments, a first set of pixel elements 30a in a first column 32a are routed to a column ADC 18a associated with the first column, a second set of pixel elements 30b in the first column 32a are routed to an adjacent column ADC 18b, and a third set of pixel elements 30c in the first column 32a are routed to a non-adjacent ADC 18c. The CIS 2c utilizes all of the column ADCs 18a-18l during a (V:⅓, H:⅓) down-sampling read operation.

Figure 8A:
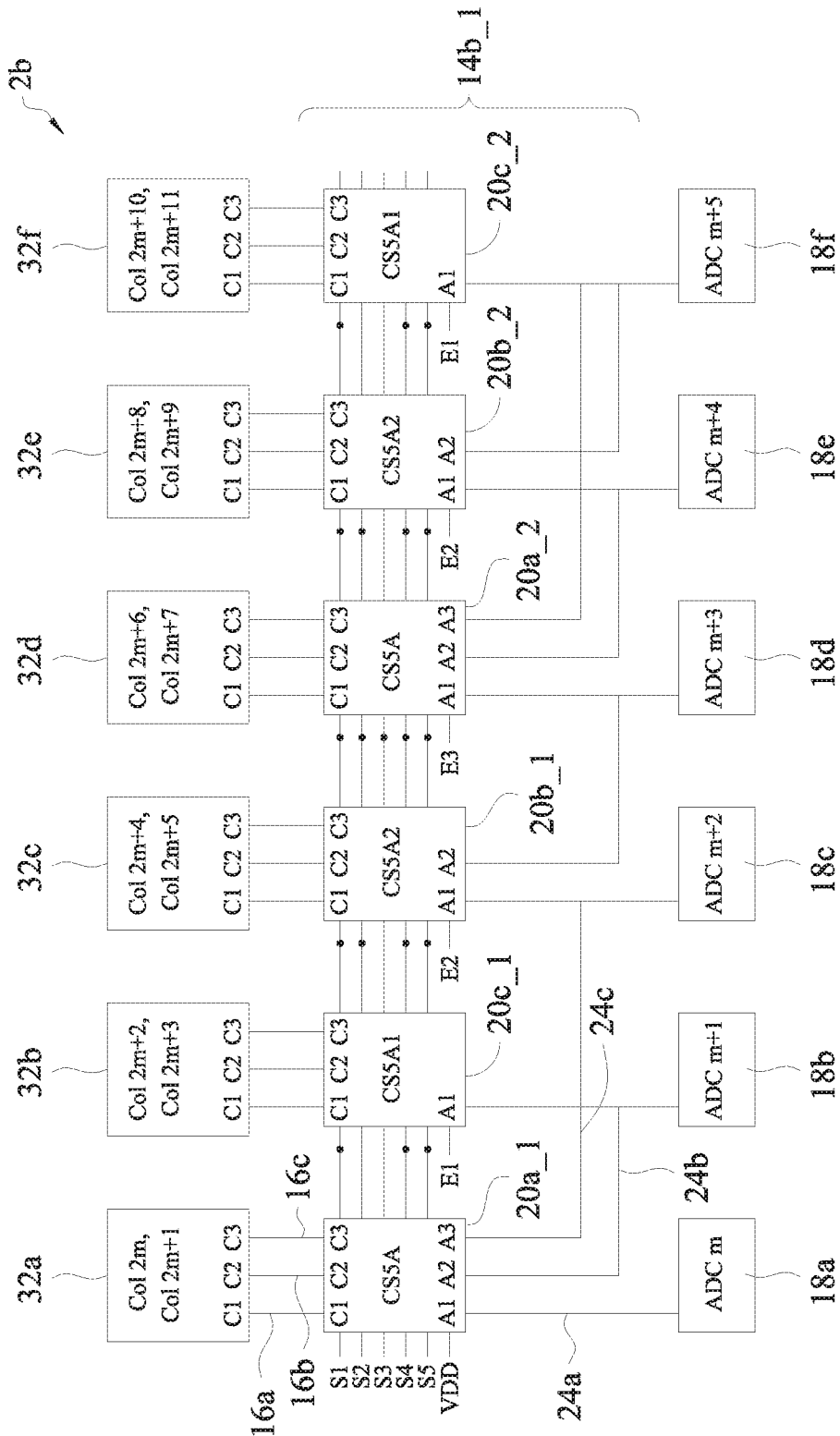
FIG. 8A illustrates the first column routing matrix of the CIS illustrated in FIG. 7A, in accordance with some embodiments.

FIG. 8A illustrates one embodiment of the column routing matrix 14b_1 of the CIS 2b of FIG. 7A. The column routing matrix 14b_1 includes a plurality of column routing circuits 20a-20c. Each of the plurality of routing circuits 20a-20c is coupled to a set of column-out signal paths 16a-16c for each of the respective columns 32a-32f of the CIS 2b. The routing circuits 20a-20c receive a plurality of digital control signals S[1:5]. The plurality of control signals S[1:5] control the configuration of the routing circuits 20a-20c to route one or more of the column-out signal paths 16a-16c to one or more column ADCs 18a-18l based on the read operation being performed, such as, for example, an all-pixel read operation, a (V:½, H:½) down-sampling read operation, a (V:⅓, H:⅓) down-sampling read operation, and/or any other suitable read operations, as discussed in more detail below. In some embodiments, each of the routing circuits 20a-20c can be individually, or collectively as part of a set, enabled/disabled, for example, by one or more enable signals E1-E3.

The plurality of routing circuits 20a-20c can include one or more types of column routing circuits, such as a first column routing circuit 20a_1-20a_2, a second column routing circuit 20b_1-20b_2, and/or a third column routing circuit 20c_1-20c_2. Each of the types of column routing circuits 20a-20c are configured to receive one or more of the control signals S[1:5] and/or to generate a different routing based on the received control signals S[1:5]. In some embodiments, only some types of routing circuits 20a, 20c are used during down-sampling read operations, such as (V:½, H:½) or (V:⅓, H:⅓) down-sampling read operations, as discussed in more detail below.

Figure 8B:
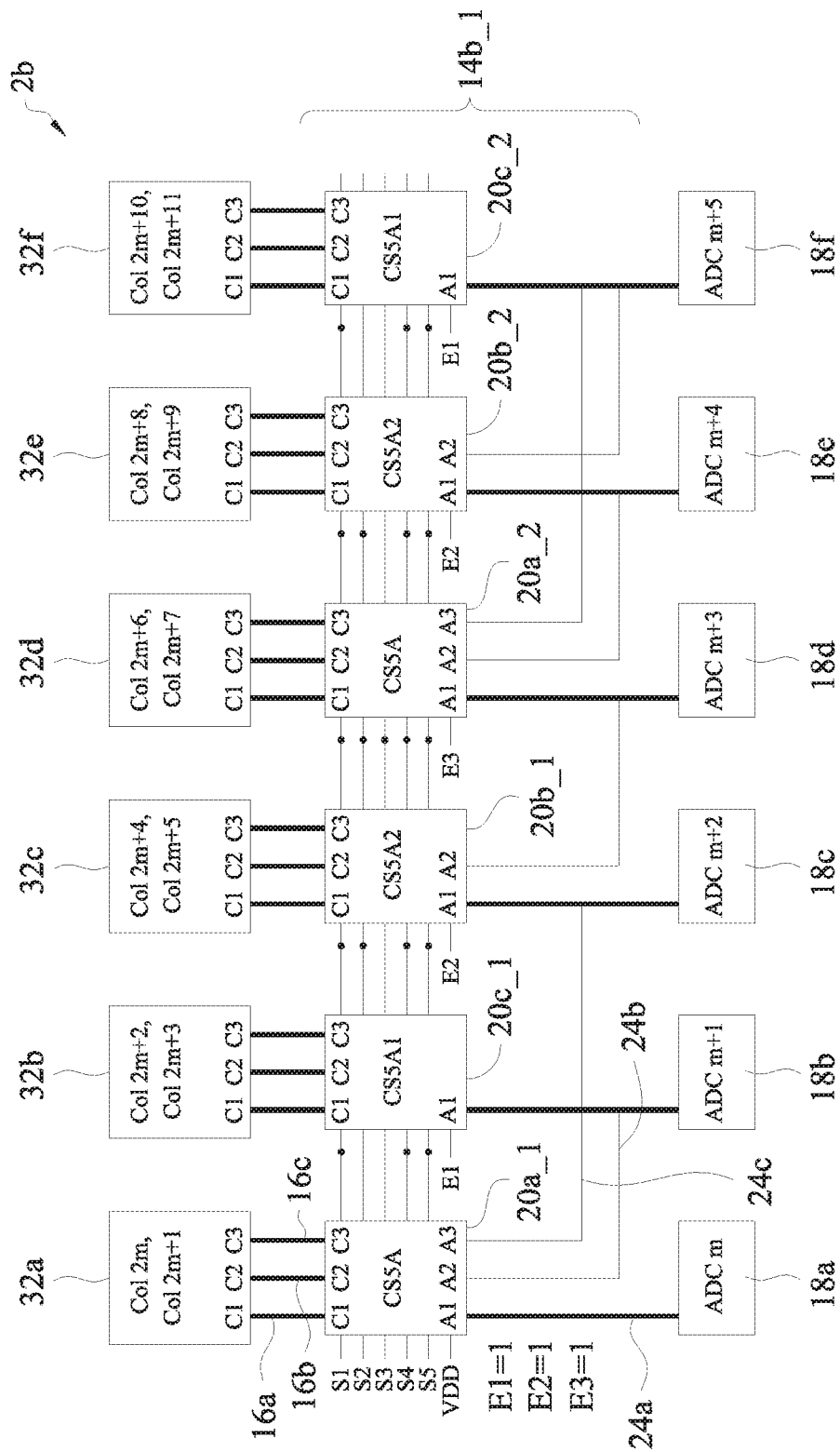
FIG. 8B illustrates the first column routing matrix of FIG. 8A configured for an all-pixel read operation, in accordance with some embodiments.

FIG. 8B illustrates the column routing matrix 14b_1 of FIG. 8A configured for an all-pixel read operation, in accordance with some embodiments. During an all-pixel read operation, every pixel element 30 in the array 4b of the CIS 2b is read by the corresponding column ADC 18a-18f. For example, in the illustrated embodiment, each of the pixel elements 30 in the first column 32a is sequentially activated by the row driver circuit 12. The row driver circuit 12 sequentially activates each of the pixels of each pixel element 30 in each column 32a-32f. The column routing circuits 20a-20c are configured to route each pixel of each of the 2×2 pixel elements 30 to a corresponding column ADC 18a-18f. For example, in the illustrated embodiment, the column routing circuit 20a_1 of the first column 32a routes each of the column-out signals 16a-16c to a first output 24a of the column routing circuit 20a_1 is coupled to the first column ADC 18a. Similarly, the column routing circuit 20c_1 of the second column 32b routes each of the column-out signals 16a-16c of the second column 32b to a first output 24a of the column routing circuit 20c_1 is coupled to the second column ADC 18b. Each of the remaining column routing circuits 20a-20c similarly route the column-out signals 16a-16c of their respective columns 32c-32f to a first output 24a coupled to the column ADC 18c-18f of the respective column 32c-32f. In some embodiments, the time for execution of an all-pixel read operation is determined by the number of rows in each column and is denoted herein as X. Table 4 below illustrates one embodiment of a control table for an all-pixel read operation of the CIS 2b.

TABLE 4

| Row # | C1 | C2 | C3 | S[5:1] | ADC # |
|---|---|---|---|---|---|
| 72n | ● | | | 0, 0, 0, 0, 1 | m |
| 72n + 1 | | | | 0, 0, 0, 0, 1 | m |
| 72n + 2 | | ● | | 0, 1, 0, 0, 0 | m |
| 72n + 3 | | | | 0, 1, 0, 0, 0 | m |
| 72n + 4 | | ● | | 0, 1, 0, 0, 0 | m |
| 72n + 5 | | | | 0, 1, 0, 0, 0 | m |
| 72n + 6 | | | ● | 1, 0, 0, 0, 0 | m |
| 72n + 7 | | | | 1, 0, 0, 0, 0 | m |
| 72n + 8 | ● | | | 0, 0, 0, 0, 1 | m |
| 72n + 9 | | | | 0, 0, 0, 0, 1 | m |
| 72n + 10 | | | ● | 1, 0, 0, 0, 0 | m |
| 72n + 11 | | | | 1, 0, 0, 0, 0 | m |
| 72n + 12 | | ● | | 0, 1, 0, 0, 0 | m |
| 72n + 13 | | | | 0, 1, 0, 0, 0 | m |
| 72n + 14 | | | ● | 1, 0, 0, 0, 0 | m |
| 72n + 15 | | | | 1, 0, 0, 0, 0 | m |
| 72n + 16 | ● | | | 0, 0, 0, 0, 1 | m |
| 72n + 17 | | | | 0, 0, 0, 0, 1 | m |
| 72n + 18 | | ● | | 0, 1, 0, 0, 0 | m |
| 72n + 19 | | | | 0, 1, 0, 0, 0 | m |
| 72n + 20 | | ● | | 0, 1, 0, 0, 0 | m |
| 72n + 21 | | | | 0, 1, 0, 0, 0 | m |
| 72n + 22 | | | ● | 1, 0, 0, 0, 0 | m |
| 72n + 23 | | | | 1, 0, 0, 0, 0 | m |
| 72n + 24 | ● | | | 0, 0, 0, 0, 1 | m |
| 72n + 25 | | | | 0, 0, 0, 0, 1 | m |
| 72n + 26 | | | ● | 1, 0, 0, 0, 0 | m |
| 72n + 27 | | | | 1, 0, 0, 0, 0 | m |
| 72n + 28 | | ● | | 0, 1, 0, 0, 0 | m |
| 72n + 29 | | | | 0, 1, 0, 0, 0 | m |
| 72n + 30 | | | ● | 1, 0, 0, 0, 0 | m |
| 72n + 31 | | | | 1, 0, 0, 0, 0 | m |
| 72n + 32 | ● | | | 0, 0, 0, 0, 1 | m |
| 72n + 33 | | | | 0, 0, 0, 0, 1 | m |
| 72n + 34 | | | ● | 1, 0, 0, 0, 0 | m |
| 72n + 35 | | | | 1, 0, 0, 0, 0 | m |
| 72n + 36 | | ● | | 0, 1, 0, 0, 0 | m |
| 72n + 37 | | | | 0, 1, 0, 0, 0 | m |
| 72n + 38 | ● | | | 1, 0, 0, 0, 0 | m |
| 72n + 39 | | | | 1, 0, 0, 0, 0 | m |
| 72n + 40 | ● | | | 0, 0, 0, 0, 1 | m |
| 72n + 41 | | | | 0, 0, 0, 0, 1 | m |
| 72n + 42 | | | ● | 1, 0, 0, 0, 0 | m |
| 72n + 43 | | | | 1, 0, 0, 0, 0 | m |
| 72n + 44 | | ● | | 0, 1, 0, 0, 0 | m |
| 72n + 45 | | | | 0, 1, 0, 0, 0 | m |
| 72n + 46 | | | ● | 1, 0, 0, 0, 0 | m |
| 72n + 47 | | | | 1, 0, 0, 0, 0 | m |
| 72n + 48 | ● | | | 0, 0, 0, 0, 1 | m |
| 72n + 49 | | | | 0, 0, 0, 0, 1 | m |
| 72n + 50 | | ● | | 0, 1, 0, 0, 0 | m |
| 72n + 51 | | ● | | 0, 1, 0, 0, 0 | m |
| 72n + 52 | | ● | | 0, 1, 0, 0, 0 | m |
| 72n + 53 | | | | 0, 1, 0, 0, 0 | m |
| 72n + 54 | ● | | | 0, 0, 0, 0, 1 | m |
| 72n + 55 | | | | 0, 0, 0, 0, 1 | m |
| 72n + 56 | ● | | | 0, 0, 0, 0, 1 | m |
| 72n + 57 | | | | 0, 0, 0, 0, 1 | m |
| 72n + 58 | | | ● | 1, 0, 0, 0, 0 | m |
| 72n + 59 | | | | 1, 0, 0, 0, 0 | m |
| 72n + 60 | | ● | | 0, 1, 0, 0, 0 | m |
| 72n + 61 | | | | 0, 1, 0, 0, 0 | m |
| 72n + 62 | | | ● | 1, 0, 0, 0, 0 | m |
| 72n + 63 | | | | 1, 0, 0, 0, 0 | m |
| 72n + 64 | ● | | | 0, 0, 0, 0, 1 | m |
| 72n + 65 | | | | 0, 0, 0, 0, 1 | m |
| 72n + 66 | | | ● | 1, 0, 0, 0, 0 | m |
| 72n + 67 | | | | 1, 0, 0, 0, 0 | m |
| 72n + 68 | | ● | | 0, 1, 0, 0, 0 | m |
| 72n + 69 | | | | 0, 1, 0, 0, 0 | m |
| 72n + 70 | ● | | | 0, 0, 0, 0, 1 | m |
| 72n + 71 | | | | 0, 0, 0, 0, 1 | m |

Figure 8C:
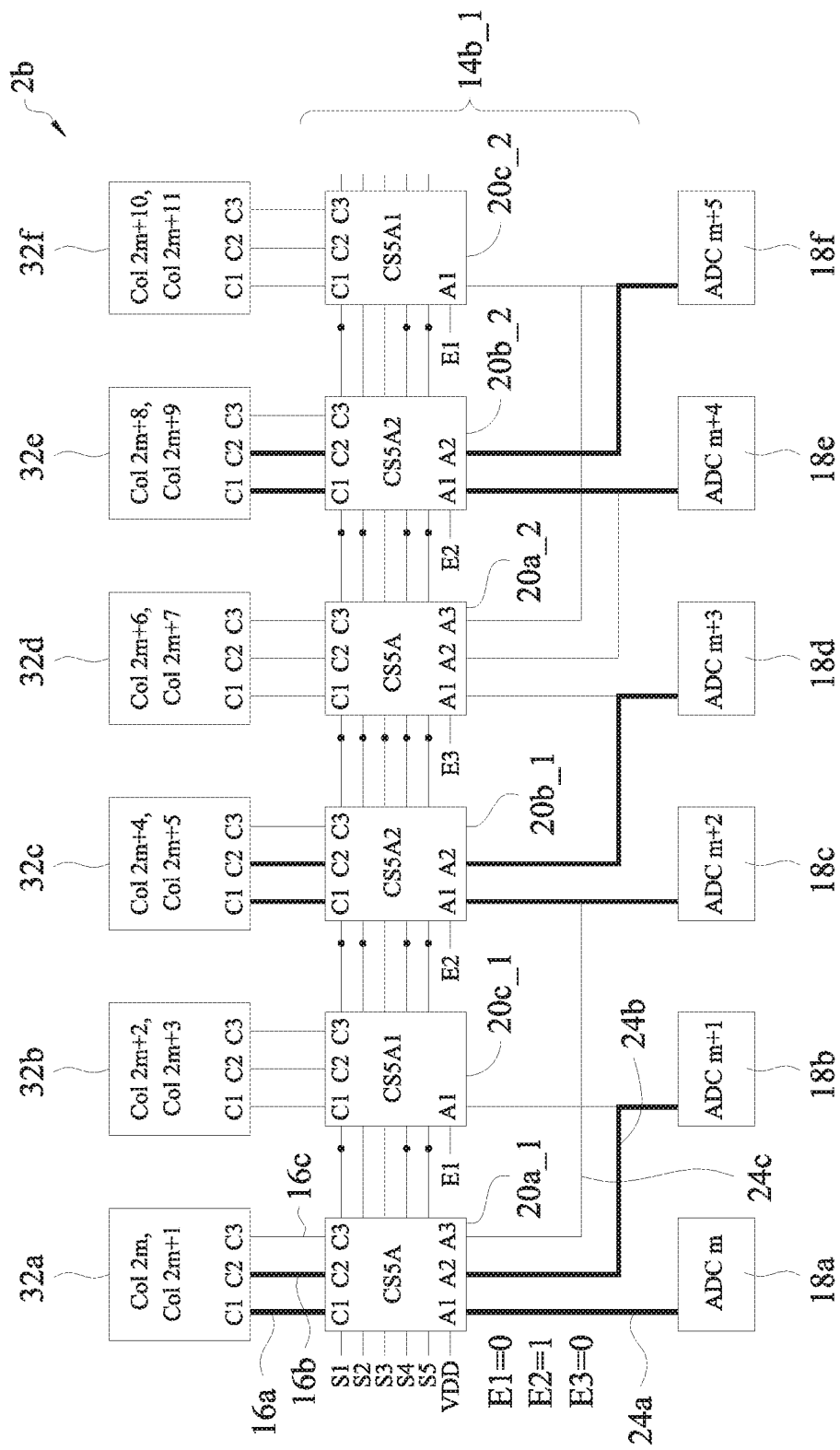
FIG. 8C illustrates the first column routing matrix of FIG. 8A configured for a (V:½, H:½) down-sampling read operation, in accordance with some embodiments.

FIG. 8C illustrates the column routing matrix 14b_1 of FIG. 8A configured for a (V:½, H:½) down-sampling read operation, in accordance with some embodiments. The column routing circuits 20a-20b for half of the columns are configured to route a first column-out signal 16a to a respective column ADC and a second column-out signal 16b to an adjacent column ADC. For example, in some embodiments, the first column-out signal 16a of a first column 32a is routed to the corresponding column ADC 18a and the second column-out signal 16b is routed to an adjacent ADC 18b. The adjacent ADC 18b corresponds to a column 32b not read during the (V:½, H:½) down-sampling read operation. For example, in the illustrated embodiments, the first column 32a is read during the (V:½, H:½) down-sampling read operation and the second column 32b is skipped. Similarly, in some embodiments, the column routing circuit 20c_1 of the first column 32a routes the second column-out signal 16b to the column ADC 18a and the first column-out signal 16a to the adjacent column ADC 18b. The third column-out signal 16c is connected to unread rows and is not passed by the column routing circuit 20a_1 during a (V:½, H:½) down-sampling read operation. Although specific routing embodiments are discussed herein including associated and adjacent column ADCs, it will be appreciated that the column routing matrix 14b_1 can route the column-out signals 16a-16b of any column 32a-32f to any of the column ADCs 18a-18f.

By routing one of the column-out signals 14a, 14b to an adjacent column ADC 18b in an unread column 32b, the CIS 2b is able to utilize all of the column ADCs 18a-18f during a (V:½, H:½) down-sampling read operation. The column routing matrix 14b_1 allows two rows of 2×2 pixel elements 30 to be read from the same column simultaneously during the (V:½, H:½) down-sampling read operation. By reading two rows simultaneously, the (V:½, H:½) down-sampling read operation can be performed in a fourth of the time required for an all-pixel read operation, e.g., the read time for a (V:½, H:½) down-sampling read operation is X/4.

In some embodiments, the column routing circuits 20a-20c are coupled to a plurality of enable signals E1-E3 that control activation of the column routing circuits 20a-20c during a read operation, such as a (V:½, H:½) down-sampling read operation. For example, in the illustrated embodiment, a first set of column routing circuits 20b_1, 20b_2 are coupled to a first enable signal E1, a second set of column routing circuits 20c_1, 20c_2 are coupled to a second enable signal E2, and a third set of column routing circuits 20a_2 are coupled to a third enable signal E3. In some embodiments, a fourth set of column routing circuits 20a_1 are always active during a read operation and have an enable input coupled directly to a power source VDD. During a (V:½, H:½) down-sampling read operation, the second enable signal E2 is high and the first and third enable signals E1, E3 are low. The second enable single E2 activates the second set of column routing circuits 20c_1, 20c_2. The fourth set of column routing circuits 20a_1 are also active during a (V:½, H:½) down-sampling read operation. In some embodiments, the active column routing circuits 20a_1, 20c_1, 20c_2 are configured to route the first column-out signal 16a to a first output 24a coupled to a corresponding column ADC 18a, 18c, 18e and the second column-out signal 16b to a second output 24b coupled to an adjacent column ADC 18b, 18d, 18f, although it will be appreciated that other routing schemes may be used. Table 5 below illustrates one embodiment of a control table for a (V:½, H:½) down-sampling read operation of the CIS 2b.

TABLE 5

| Row # | C1 | C2 | C3 | S[5:1] | ADC # |
|---|---|---|---|---|---|
| 72n | ● | | | 0, 0, 0, 1, 1 | 2m |
| 72n + 1 | | | | 0, 0, 0, 1, 1 | 2m |
| 72n + 2 | | ● | | | |
| 72n + 3 | | | | | |
| 72n + 4 | | ● | | 0, 0, 0, 1, 1 | 2m + 1 |
| 72n + 5 | | | | 0, 0, 0, 1, 1 | 2m + 1 |
| 72n + 6 | | | ● | | |
| 72n + 7 | | | | | |
| 72n + 8 | ● | | | 0, 0, 0, 1, 1 | 2m |
| 72n + 9 | | | | 0, 0, 0, 1, 1 | 2m |
| 72n + 10 | | | ● | | |
| 72n + 11 | | | | | |
| 72n + 12 | | ● | | 0, 0, 0, 1, 1 | 2m + 1 |
| 72n + 13 | | | | 0, 0, 0, 1, 1 | 2m + 1 |
| 72n + 14 | | | ● | | |
| 72n + 15 | | | | | |
| 72n + 16 | ● | | | 0, 0, 0, 1, 1 | 2m |
| 72n + 17 | | | | 0, 0, 0, 1, 1 | 2m |
| 72n + 18 | | ● | | | |
| 72n + 19 | | | | | |
| 72n + 20 | | ● | | 0, 0, 0, 1, 1 | 2m + 1 |
| 72n + 21 | | | | 0, 0, 0, 1, 1 | 2m + 1 |
| 72n + 22 | | | ● | | |
| 72n + 23 | | | | | |
| 72n + 24 | ● | | | 0, 0, 0, 1, 1 | 2m |
| 72n + 25 | | | | 0, 0, 0, 1, 1 | 2m |
| 72n + 26 | | ● | | | |
| 72n + 27 | | | | | |
| 72n + 28 | | ● | | 0, 0, 0, 1, 1 | 2m + 1 |
| 72n + 29 | | | | 0, 0, 0, 1, 1 | 2m + 1 |
| 72n + 30 | | | ● | | |
| 72n + 31 | | | | | |
| 72n + 32 | ● | | | 0, 0, 0, 1, 1 | 2m |
| 72n + 33 | | | | 0, 0, 0, 1, 1 | 2m |
| 72n + 34 | | | ● | | |
| 72n + 35 | | | | | |
| 72n + 36 | | ● | | 0, 0, 0, 1, 1 | 2m + 1 |
| 72n + 37 | | | | 0, 0, 0, 1, 1 | 2m + 1 |
| 72n + 38 | ● | | | | |
| 72n + 39 | | | | | |
| 72n + 40 | ● | | | 0, 0, 0, 1, 1 | 2m |
| 72n + 41 | | | | 0, 0, 0, 1, 1 | 2m |
| 72n + 42 | | | ● | | |
| 72n + 43 | | | | | |
| 72n + 44 | | ● | | 0, 0, 0, 1, 1 | 2m + 1 |
| 72n + 45 | | | | 0, 0, 0, 1, 1 | 2m + 1 |
| 72n + 46 | | | ● | | |
| 72n + 47 | | | | | |
| 72n + 48 | ● | | | 0, 0, 0, 1, 1 | 2m |
| 72n + 49 | | | | 0, 0, 0, 1, 1 | 2m |
| 72n + 50 | | ● | | | |
| 72n + 51 | | | | | |
| 72n + 52 | | ● | | 0, 0, 0, 1, 1 | 2m + 1 |
| 72n + 53 | | | | 0, 0, 0, 1, 1 | 2m + 1 |
| 72n + 54 | ● | | | | |
| 72n + 55 | | | | | |
| 72n + 56 | ● | | | 0, 0, 0, 1, 1 | 2m |
| 72n + 57 | | | | 0, 0, 0, 1, 1 | 2m |
| 72n + 58 | | | ● | | |
| 72n + 59 | | | | | |
| 72n + 60 | | ● | | 0, 0, 0, 1, 1 | 2m + 1 |
| 72n + 61 | | | | 0, 0, 0, 1, 1 | 2m + 1 |
| 72n + 62 | | | ● | | |
| 72n + 63 | | | | | |
| 72n + 64 | ● | | | 0, 0, 0, 1, 1 | 2m |
| 72n + 65 | | | | 0, 0, 0, 1, 1 | 2m |
| 72n + 66 | | | ● | | |
| 72n + 67 | | | | | |
| 72n + 68 | | ● | | 0, 0, 0, 1, 1 | 2m + 1 |
| 72n + 69 | | | | 0, 0, 0, 1, 1 | 2m + 1 |
| 72n + 70 | ● | | | | |
| 72n + 71 | | | | | |

Figure 8D:
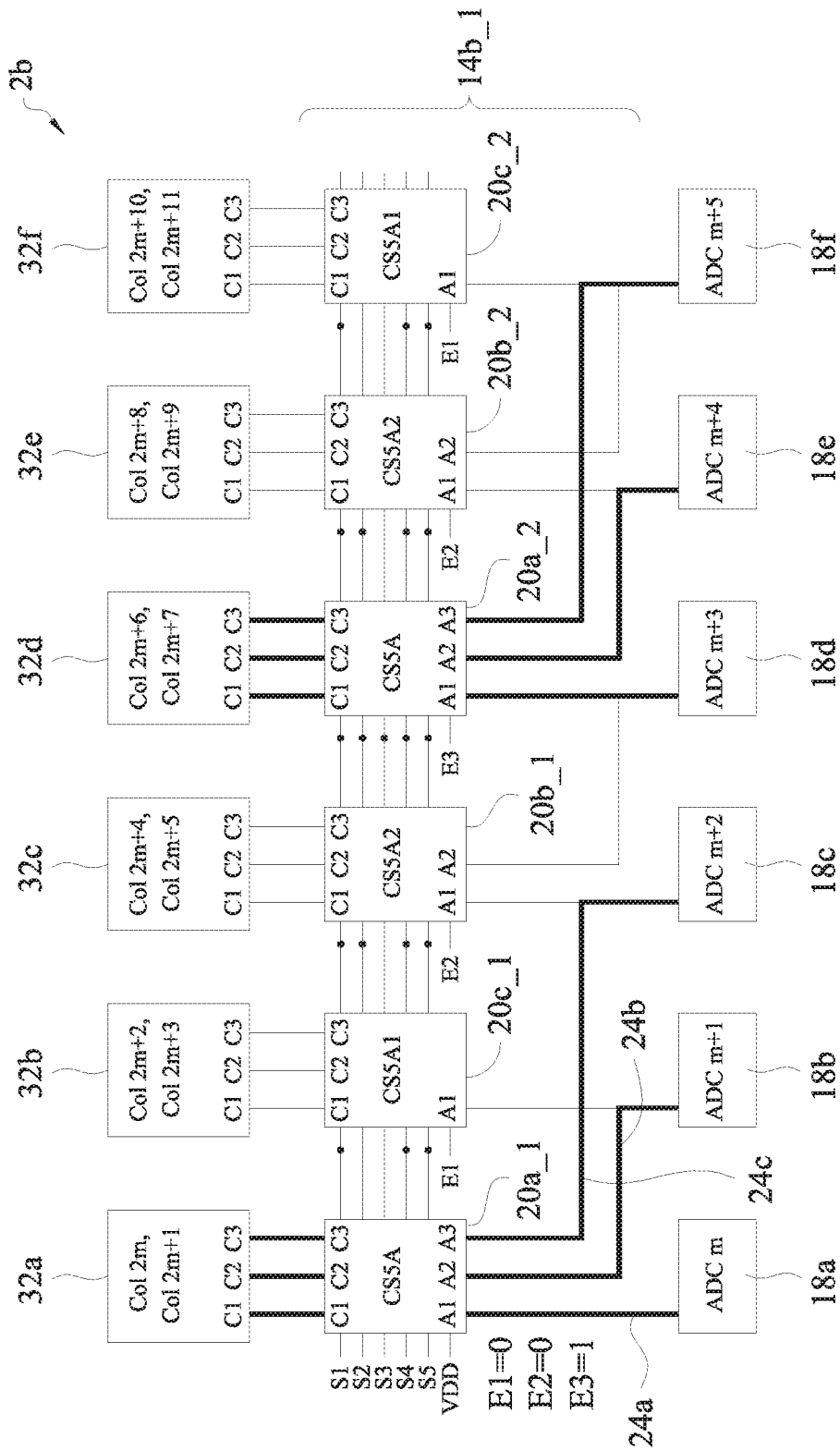
FIG. 8D illustrates the first column routing matrix of FIG. 8A configured for a (V:⅓, H:⅓) down-sampling read operation, in accordance with some embodiments.

FIG. 8D illustrates the column routing matrix 14b_1 of FIG. 8A configured for a (V:⅓, H:⅓) down-sampling read operation, in accordance with some embodiments. During a (V:⅓, H:⅓) down-sampling read operation, only one third of the columns 32a-32h and one third of the rows 34a-34g of the 2×2 pixel matrix 3c are read. The column routing circuits 20a_1, 20a_2 for one third of the columns 32a-32f are configured to route the column out signals 16a-16c to a corresponding column ADC, an adjacent column ADC, and a non-adjacent column ADC. For example, in the illustrates embodiment, during a (V:⅓, H:⅓) down-sampling read operation, every third row 34a, 34d, 34g of the first column 32a is read and the rows in between 34b, 34c are skipped. The column routing circuit 20a_1 of the first column 32a routes one of the column-out signals 16a-16c to the first column ADC 18a (e.g., the column ADC), one of the column-out signals 16a-16c to the second column ADC 18b (e.g., the adjacent column ADC), and one of the column-out signals 16a-16c to the third column ADC 18c (e.g., the non-adjacent column ADC). In some embodiments, the non-adjacent column ADC is replaced with a second adjacent column ADC. Although specific embodiments discussed herein include corresponding, adjacent, and non-adjacent ADCs, it will be appreciated that the column routing matrix 14b_1 can route the column-out signals 16a-16c of any of the columns 32a-32f to any of the column ADCs 18a-18f.

In some embodiments, the column routing circuits 20a_1, 20a_2 of the first column 32a and the fourth column 32d (respectively) route the first column-out signal 16a to a first output 24a coupled to an associated column ADC 18a, 18d, the second column-out signal 16b to a second output 24b coupled to an adjacent column ADC 18b, 18e, and the third column-out signal 16c to a third output 24c coupled to a non-adjacent column ADC 18c, 18f. Similarly, the column routing circuits 20a_1, 20a_2 can route the first column out signal 16a to one of the second output 24b (e.g., the adjacent ADC 18b) or the third output 24c (e.g., the non-adjacent ADC 18c), the second column-out signal 16b to one of the first output 24a (e.g., the column ADC 18a) or the third output 24c (e.g., the non-adjacent ADC 18c), and the third column-out signal 16c to one of the first output 24a (e.g., the column ADC 18a) or the second output 24b (e.g., the adjacent ADC 18b). In some embodiments, the third output 24c can be coupled to a second adjacent ADC.

By routing two of the column-out signals 16b, 16c to adjacent column ADCs 18b, 18e and/or non-adjacent column ADCs 18c, 18f, the CIS 2b utilizes all of the column ADCs 18a-18f during a (V:⅓, H:⅓) down-sampling read operation. Three rows of 2×2 pixel elements 30 are read from the same column 32a simultaneously during the (V:⅓, H:⅓) down-sampling read operation. The CIS 2b performs the (V:⅓, H:⅓) down-sampling read operation in a ninth of the time required for an all-pixel read operation, e.g., the read time for a (V:⅓, H:⅓) down-sampling read operation is X/9.

In the illustrated embodiment, the column routing circuits 20a-20c are coupled to a plurality of enable signals E1-E3. The enable signals E1-E3 can be configured to activate only those column routing circuits 20a_1, 20a_2 used during the (V:⅓, H:⅓) down-sampling read operation. For example, in the illustrated embodiment, the third enable signal E3 is high and the first and second enable signals E1, E2 are low. The third enable signal E3 activates the third set of column routing circuits 20a_2. The fourth set of column routing circuits 20a_1 coupled directly to VDD is also activate during the (V:⅓, H:⅓) down-sampling read operation. In some embodiments, the active column routing circuits 20a_1, 20a_2 are configured to route the first column-out signal 16a to a first output 24a coupled to a corresponding column ADC 18a, 18d, the second column-out signal 16b to a second output 24b coupled to an adjacent column ADC 18b, 18e, and the third column-out signal 16c to a third output 24c coupled to a non-adjacent ADC 18c, 18f, although it will be appreciated that other routing schemes may be used. Table 6 below illustrates one embodiment of a control table for a (V:½, H:½) down-sampling read operation of the CIS 2b.

TABLE 6

| Row # | C1 | C2 | C3 | S[5:1] | ADC # |
|---|---|---|---|---|---|
| 72n | ● | | | 0, 0, 1, 1, 1 | 3m |
| 72n + 1 | | | | 0, 0, 1, 1, 1 | 3m |
| 72n + 2 | | ● | | | |
| 72n + 3 | | | | | |
| 72n + 4 | | ● | | | |
| 72n + 5 | | | | | |
| 72n + 6 | | | ● | 0, 0, 1, 1, 1 | 3m + 2 |
| 72n + 7 | | | | 0, 0, 1, 1, 1 | 3m + 2 |
| 72n + 8 | ● | | | | |
| 72n + 9 | | | | | |
| 72n + 10 | | | ● | | |
| 72n + 11 | | | | | |
| 72n + 12 | | ● | | 0, 0, 1, 1, 1 | 3m + 1 |
| 72n + 13 | | | | 0, 0, 1, 1, 1 | 3m + 1 |
| 72n + 14 | | | ● | | |
| 72n + 15 | | | | | |
| 72n + 16 | ● | | | | |
| 72n + 17 | | | | | |
| 72n + 18 | | ● | | 0, 0, 1, 1, 1 | 3m + 1 |
| 72n + 19 | | | | 0, 0, 1, 1, 1 | 3m + 1 |
| 72n + 20 | | | ● | | |
| 72n + 21 | | | | | |
| 72n + 22 | | ● | | | |
| 72n + 23 | | | | | |
| 72n + 24 | ● | | | 0, 0, 1, 1, 1 | 3m |
| 72n + 25 | | | | 0, 0, 1, 1, 1 | 3m |
| 72n + 26 | | | ● | | |
| 72n + 27 | | | | | |
| 72n + 28 | ● | | | | |
| 72n + 29 | | | | | |
| 72n + 30 | | | ● | 0, 0, 1, 1, 1 | 3m + 2 |
| 72n + 31 | | | | 0, 0, 1, 1, 1 | 3m + 2 |
| 72n + 32 | ● | | | | |
| 72n + 33 | | | | | |
| 72n + 34 | | | ● | | |
| 72n + 35 | | | | | |
| 72n + 36 | | ● | | 0, 0, 1, 1, 1 | 3m + 1 |
| 72n + 37 | | | | 0, 0, 1, 1, 1 | 3m + 1 |
| 72n + 38 | ● | | | | |
| 72n + 39 | | | | | |
| 72n + 40 | ● | | | | |
| 72n + 41 | | | | | |
| 72n + 42 | | | ● | 0, 0, 1, 1, 1 | 3m + 2 |
| 72n + 43 | | | | 0, 0, 1, 1, 1 | 3m + 2 |
| 72n + 44 | | ● | | | |
| 72n + 45 | | | | | |
| 72n + 46 | | | ● | | |
| 72n + 47 | | | | | |
| 72n + 48 | ● | | | 0, 0, 1, 1, 1 | 3m |
| 72n + 49 | | | | 0, 0, 1, 1, 1 | 3m |
| 72n + 50 | | ● | | | |
| 72n + 51 | | | | | |
| 72n + 52 | | ● | | | |
| 72n + 53 | | | | | |
| 72n + 54 | ● | | | 0, 0, 1, 1, 1 | 3m |
| 72n + 55 | | | | 0, 0, 1, 1, 1 | 3m |
| 72n + 56 | ● | | | | |
| 72n + 57 | | | | | |
| 72n + 58 | | | ● | | |
| 72n + 59 | | | | | |
| 72n + 60 | | ● | | 0, 0, 1, 1, 1 | 3m + 1 |
| 72n + 61 | | | | 0, 0, 1, 1, 1 | 3m + 1 |
| 72n + 62 | | | ● | | |
| 72n + 63 | | | | | |
| 72n + 64 | ● | | | | |
| 72n + 65 | | | | | |
| 72n + 66 | | | ● | 0, 0, 1, 1, 1 | 3m + 2 |
| 72n + 67 | | | | 0, 0, 1, 1, 1 | 3m + 2 |

TABLE 6-continued

| Row # | C1 | C2 | C3 | S[5:1] | ADC # |
|---|---|---|---|---|---|
| 72n + 68 | | • | | | |
| 72n + 69 | | | | | |
| 72n + 70 | • | | | | |
| 72n + 71 | | | | | |

Figure 9A:
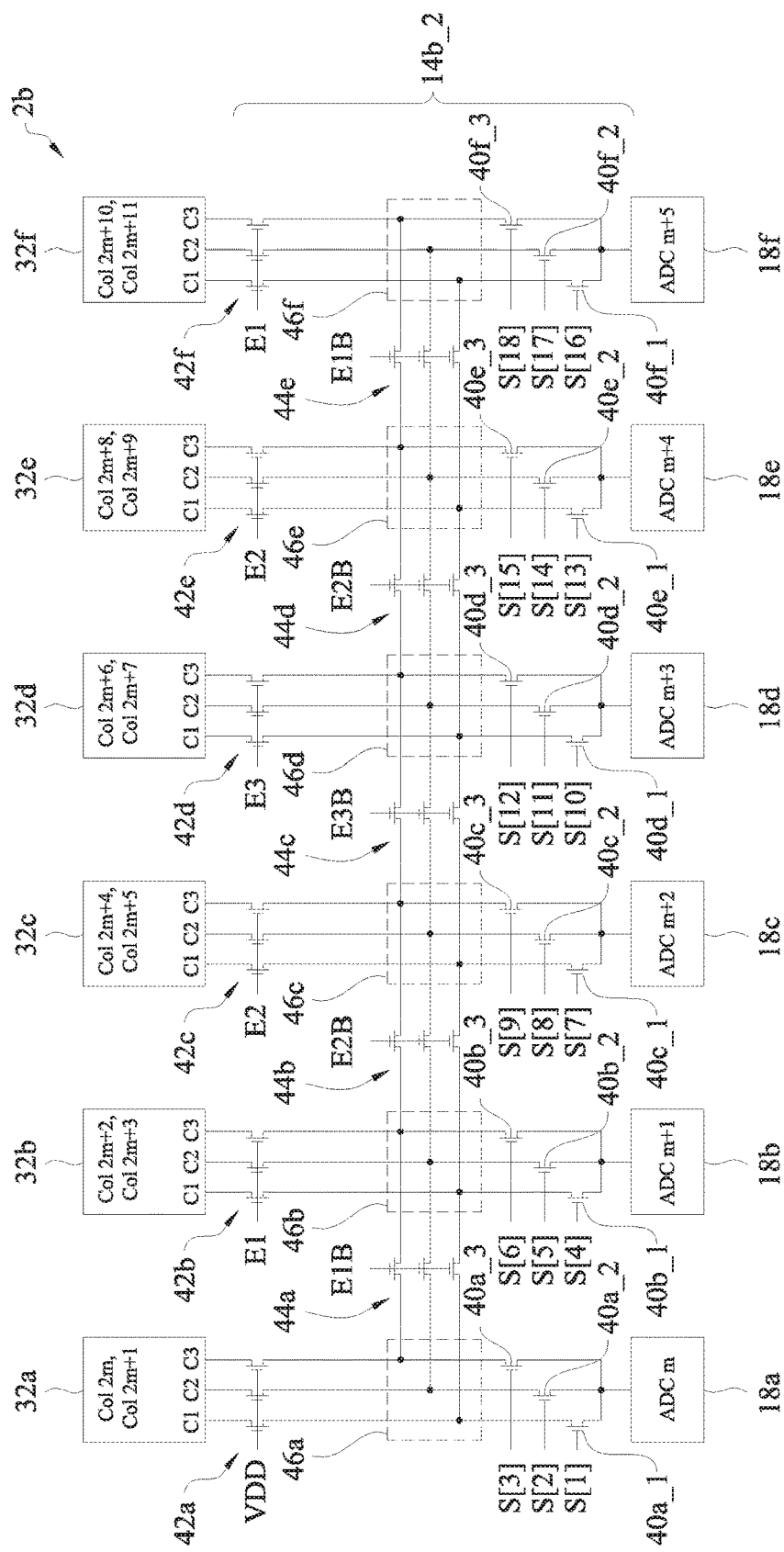
FIG. 9A illustrates a second column routing matrix for the CIS illustrated in FIG. 7A, in accordance with some embodiments.

FIG. 9A illustrates one embodiment of a column routing matrix 14b_2 of the CIS 2b of FIG. 7A. The column routing matrix 14b_2 comprises a plurality of sets of control transistors 40a-40f, a plurality of column enable transistors 42a-42f, and a plurality of cross-column enable transistors 44a-44e. Each set of control transistors 40a-40f includes a first control transistor 40a_1-40f_1, a second control transistor 40a_2-40f_2, and a third control transistor 40a_3-40f_3. Each of the control transistors 40a-40f is coupled to an associated control signal S[1:18]. The first control transistor 40a_1-40f_1 of each set of control transistors 40a-40f couples a first column-out signal 16a to a column ADC 18a-18f, the second control transistor 40a_1-40f_2 couples a second column-out signal 16b to the column ADC 18a-18f, and the third control transistor 40a_3-40f_3 couples a third column-out signal 16c to the column ADC 18a-18f.

In some embodiments, each column 32a-32f includes a plurality of column enable transistors 42a-42f The plurality of column enable transistors 42a-42f for each column each include a gate coupled to an enable signal E1-E3 and/or a power signal VDD. When the enable signal E1-E3 is high (and/or when the plurality of enable transistors 42a are coupled to VDD), the enable transistors 42a-42f allow the column-out signals 14a-14c of the corresponding columns 32a-32f to be transmitted to a first node 46a-46f connected between the column-out signal paths 16a-16c and the set of control transistors 40a-40f of the associated column 32a-32f. In some embodiments, when an enable signal E1-E3 is low, transmission of the column-out signals 14a-14c of the respective columns 32b-32f is prevented, as the enable transistors 42b-42f are off.

In some embodiments, when the plurality of column enable transistors 42a-42f are connected to a high enable signal (e.g., one of E1-E3 is high and/or the transistors are coupled to VDD) and the corresponding control transistors 40a-40f are activated (e.g., connected to a high control signal S[1:18]), the column-out signal 16a-16c is transmitted to the column ADC 18a-18f of the associated column 32a-32f. For example, in some embodiments, when the first enable signal E1 is high the plurality of column enable transistors 42b of the second column 32b transmit the column-out signals 16a-16c of the second column 32b to a column node 46b. When the control signals S[4:6] are simultaneously high, the corresponding column-out signal 16a-16c is transmitted to the associated column ADC 18b. For example, if the fourth control signal S[4] is high and the first enable signal E1 is high, the first column-out signal 16a of the second column 32b is transmitted to the second column ADC 18b. Similarly, if the fifth control signal S[5] is high, the second column out signal 16b of the second column 32b is transmitted to the second column ADC 18b.

In some embodiments, a plurality of cross-column enable transistors 44a-44f couple each set of column-out signals 16a-16c in a column 32a-32e to an adjacent column 32b-32f. Each of the plurality of cross-column enable transistors 44a-44f includes a gate coupled to a cross-column enable signal E1B-E3B. The plurality of cross-column enable transistors 44a-44f are configured to transmit column-out signals 16a-16c from a first column 32a-32e to an adjacent column 32b-32f. For example, in some embodiments, the column routing matrix 14b_2 includes a plurality of cross-column enable transistors 44a each coupled between a column-out signal path 16a-16c of a the first column 32a and a column node 46b of the second column 32b. The column node 46b of the second column 32b is coupled to the second column ADC 18b In some embodiments, when the plurality of cross-column enable transistors 44a-44f are connected to a high cross-column enable signal (e.g., one of E1B-E3B is high) and one or more control transistors 40b-40f in an adjacent column are activated (e.g., connected to a high control signal S[1:18]), the column-out signal 14a-14c of the first column 32a-32e is transmitted to the column ADC 18b-18f associated with an adjacent column 32b-32f For example, in some embodiments, when the cross-column enable signal E1B is high, the plurality of cross-column enable transistors 44a of the first column transmit the column-out signals 14a-14c of the first column to nodes 46b of the second column 32b. If any of the control signals S[4:6] are simultaneously high, one or more column-out signals 14a-14c of the first column 32a are transmitted to the column ADC 18b of the second column. For example, if the fourth control signal S[4] is high, the first enable signal E1 is high, and the first cross-column enable signal E1B is high, the first column-out signal 14a of the first column 32a is transmitted to the second column ADC 18b. Similarly, if the fifth control signal S[5] is high, the second column out signal 14b of the first column 32b is transmitted to the second column ADC 18b. Various routing combinations are explained in more detail below.

Figure 9B:
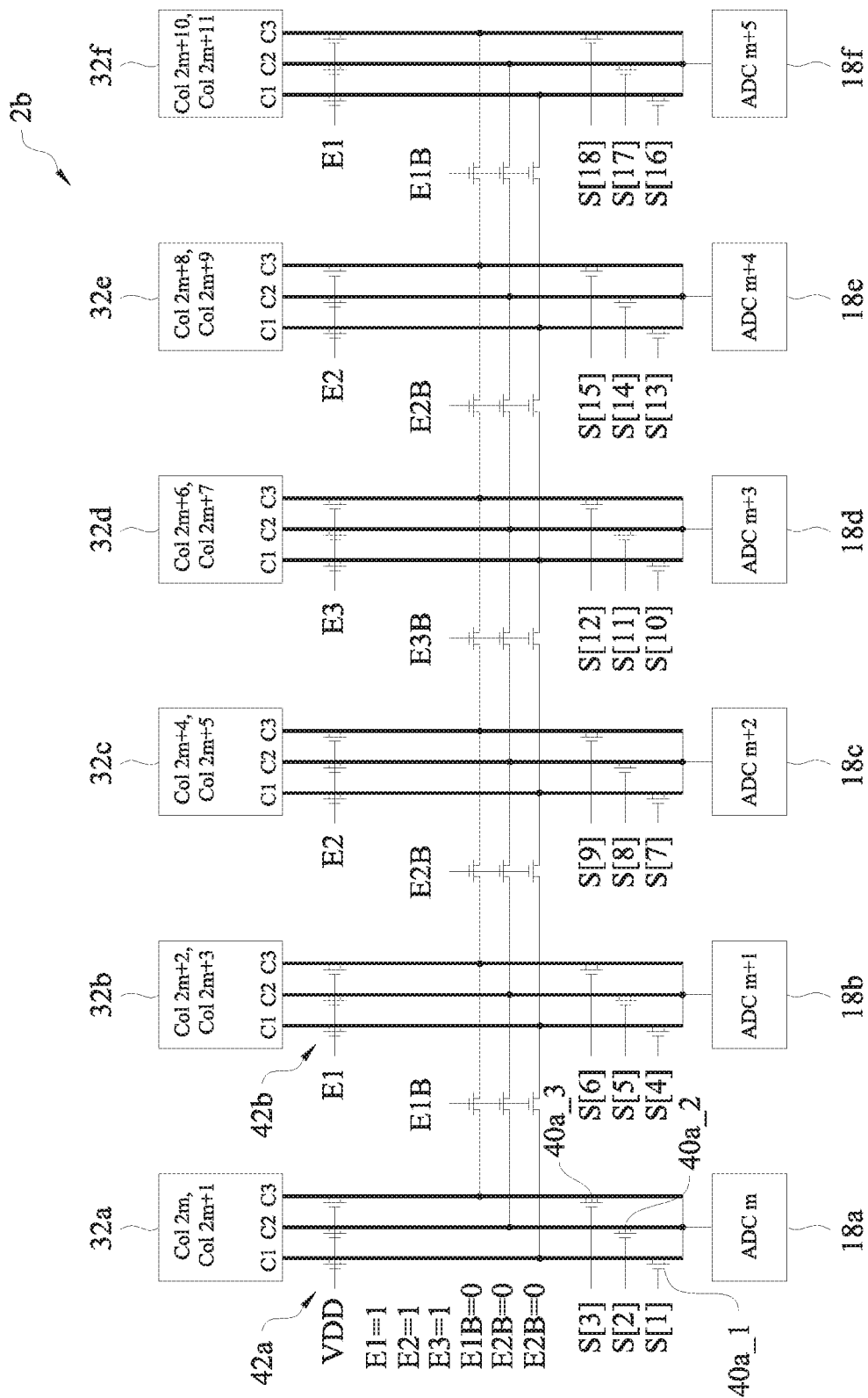
FIG. 9B illustrates the second column routing matrix of FIG. 9A configured for an all-pixel read operation, in accordance with some embodiments.

FIG. 9B illustrates the column routing matrix 14b_2 of FIG. 9A configured for an all-pixel read operation. The column-out signals 16a-16c for each column 32a-32f are routed to the associated column ADC 18a-18f by the column routing matrix 14b_2 to sequentially read each pixel element 30 in a column 32a-32f In some embodiments, during an all-pixel read operation, all of the column enable signals E1-E3 are set high and all of the cross-column enable signals E1B-E3B are set low. The control signals S[1:18] can be simultaneously and/or sequentially set high to couple each of the column-out signals 16a-16c to the associated column ADC 18a-18f. In some embodiments, a row driver circuit 10 drives each row of pixel elements 30 sequentially to output each row 34a-34g. Table 7 illustrates one embodiment of a control table for an all-pixel read operation of the column routing matrix 14b_2.

TABLE 7

| Row # | C1 | C2 | C3 | S[18:1] | AD# |
|---|---|---|---|---|---|
| 72n | • | | | 001; 001; 001; 001; 001; 001 | m |
| 72n + 1 | | • | | 001; 001; 001; 001; 001; 001 | m |
| 72n + 2 | | | • | 010; 010; 010; 010; 010; 010 | m |
| 72n + 3 | | | | 010; 010; 010; 010; 010; 010 | m |
| 72n + 4 | | | • | 010; 010; 010; 010; 010; 010 | m |
| 72n + 5 | | | | 010; 010; 010; 010; 010; 010 | m |
| 72n + 6 | | | • | 100; 100; 100; 100; 100; 100 | m |
| 72n + 7 | | | | 100; 100; 100; 100; 100; 100 | m |
| 72n + 8 | • | | | 001; 001; 001; 001; 001; 001 | m |
| 72n + 9 | | | | 001; 001; 001; 001; 001; 001 | m |
| 72n + 10 | | | • | 100; 100; 100; 100; 100; 100 | m |
| 72n + 11 | | | | 100; 100; 100; 100; 100; 100 | m |
| 72n + 12 | | • | | 010; 010; 010; 010; 010; 010 | m |
| 72n + 13 | | | | 010; 010; 010; 010; 010; 010 | m |
| 72n + 14 | | | • | 100; 100; 100; 100; 100; 100 | m |
| 72n + 15 | | | | 100; 100; 100; 100; 100; 100 | m |
| 72n + 16 | • | | | 001; 001; 001; 001; 001; 001 | m |

TABLE 7-continued

| Row # | C1 | C2 | C3 | S[18:1] | AD# |
|---|---|---|---|---|---|
| 72n + 17 | | | | 001; 001; 001; 001; 001; 001 | m |
| 72n + 18 | ● | | | 010; 010; 010; 010; 010; 010 | m |
| 72n + 19 | | | | 010; 010; 010; 010; 010; 010 | m |
| 72n + 20 | ● | | | 010; 010; 010; 010; 010; 010 | m |
| 72n + 21 | | | | 010; 010; 010; 010; 010; 010 | m |
| 72n + 22 | | ● | | 100; 100; 100; 100; 100; 100 | m |
| 72n + 23 | | | | 100; 100; 100; 100; 100; 100 | m |
| 72n + 24 | ● | | | 001; 001; 001; 001; 001; 001 | m |
| 72n + 25 | | | | 001; 001; 001; 001; 001; 001 | m |
| 72n + 26 | | ● | | 100; 100; 100; 100; 100; 100 | m |
| 72n + 27 | | | | 100; 100; 100; 100; 100; 100 | m |
| 72n + 28 | | | ● | 010; 010; 010; 010; 010; 010 | m |
| 72n + 29 | | | | 010; 010; 010; 010; 010; 010 | m |
| 72n + 30 | | ● | | 100; 100; 100; 100; 100; 100 | m |
| 72n + 31 | | | | 100; 100; 100; 100; 100; 100 | m |
| 72n + 32 | ● | | | 001; 001; 001; 001; 001; 001 | m |
| 72n + 33 | | | | 001; 001; 001; 001; 001; 001 | m |
| 72n + 34 | | ● | | 100; 100; 100; 100; 100; 100 | m |
| 72n + 35 | | | | 100; 100; 100; 100; 100; 100 | m |
| 72n + 36 | | | ● | 010; 010; 010; 010; 010; 010 | m |
| 72n + 37 | | | | 010; 010; 010; 010; 010; 010 | m |
| 72n + 38 | ● | | | 001; 001; 001; 001; 001; 001 | m |
| 72n + 39 | | | | 001; 001; 001; 001; 001; 001 | m |
| 72n + 40 | ● | | | 001; 001; 001; 001; 001; 001 | m |
| 72n + 41 | | | | 001; 001; 001; 001; 001; 001 | m |
| 72n + 42 | | ● | | 100; 100; 100; 100; 100; 100 | m |
| 72n + 43 | | | | 100; 100; 100; 100; 100; 100 | m |
| 72n + 44 | | | ● | 010; 010; 010; 010; 010; 010 | m |
| 72n + 45 | | | | 010; 010; 010; 010; 010; 010 | m |
| 72n + 46 | | ● | | 100; 100; 100; 100; 100; 100 | m |
| 72n + 47 | | | | 100; 100; 100; 100; 100; 100 | m |
| 72n + 48 | ● | | | 001; 001; 001; 001; 001; 001 | m |
| 72n + 49 | | | | 001; 001; 001; 001; 001; 001 | m |
| 72n + 50 | | | ● | 010; 010; 010; 010; 010; 010 | m |
| 72n + 51 | | | | 010; 010; 010; 010; 010; 010 | m |
| 72n + 52 | | ● | | 010; 010; 010; 010; 010; 010 | m |
| 72n + 53 | | | | 010; 010; 010; 010; 010; 010 | m |
| 72n + 54 | ● | | | 001; 001; 001; 001; 001; 001 | m |
| 72n + 55 | | | | 001; 001; 001; 001; 001; 001 | m |
| 72n + 56 | ● | | | 001; 001; 001; 001; 001; 001 | m |
| 72n + 57 | | | | 001; 001; 001; 001; 001; 001 | m |
| 72n + 58 | | | ● | 100; 100; 100; 100; 100; 100 | m |
| 72n + 59 | | | | 100; 100; 100; 100; 100; 100 | m |
| 72n + 60 | | ● | | 010; 010; 010; 010; 010; 010 | m |
| 72n + 61 | | | | 010; 010; 010; 010; 010; 010 | m |
| 72n + 62 | | ● | | 100; 100; 100; 100; 100; 100 | m |
| 72n + 63 | | | | 100; 100; 100; 100; 100; 100 | m |
| 72n + 64 | ● | | | 001; 001; 001; 001; 001; 001 | m |
| 72n + 65 | | | | 001; 001; 001; 001; 001; 001 | m |
| 72n + 66 | | ● | | 100; 100; 100; 100; 100; 100 | m |
| 72n + 67 | | | | 100; 100; 100; 100; 100; 100 | m |
| 72n + 68 | | | ● | 010; 010; 010; 010; 010; 010 | m |
| 72n + 69 | | | | 010; 010; 010; 010; 010; 010 | m |
| 72n + 70 | ● | | | 001; 001; 001; 001; 001; 001 | m |
| 72n + 71 | | | | 001; 001; 001; 001; 001; 001 | m |

Figure 9C:
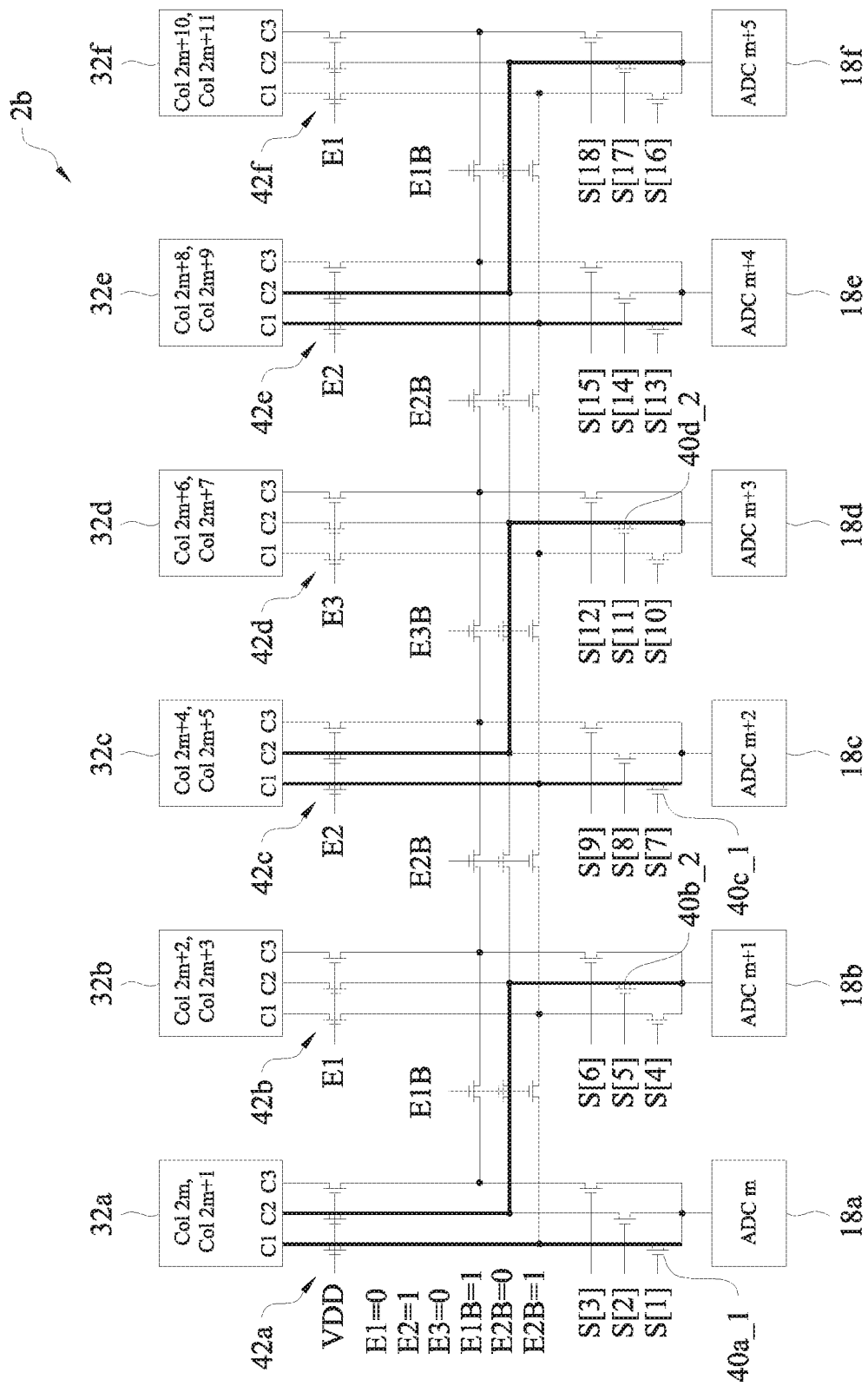
FIG. 9C illustrates the second column routing matrix of FIG. 9A configured for a (V:½, H:½) down-sampling read operation, in accordance with some embodiments.
Figure 9D:
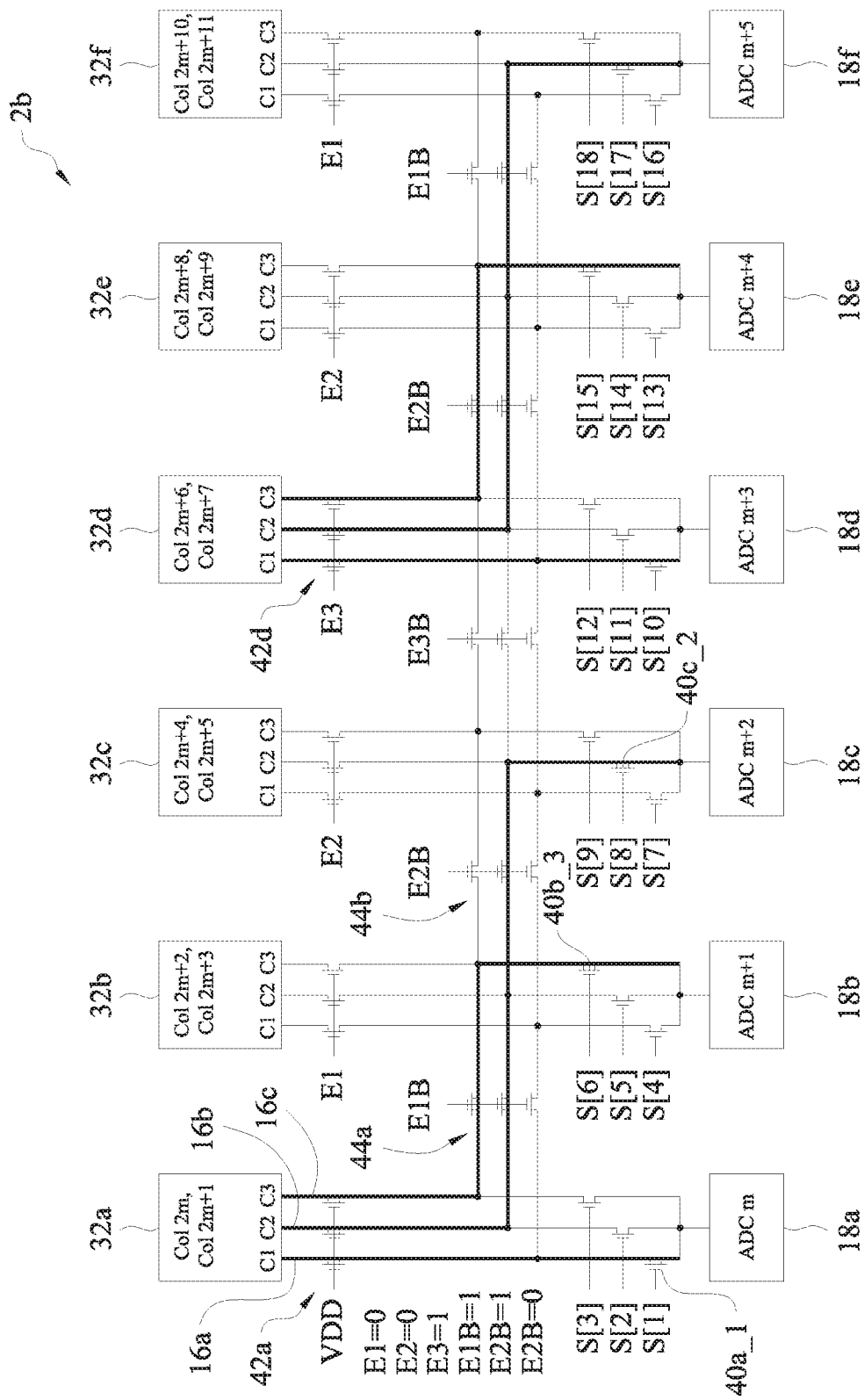
FIG. 9D illustrates the second column routing matrix of FIG. 9A configured for a first (V:⅓, H:⅓) down-sampling read operation, in accordance with some embodiments.

FIG. 9C illustrates the column routing matrix 14b_2 illustrated in FIG. 9A configured for a (V:½, H:½) down-sampling read operation. In the illustrated embodiment, the second column enable signal E2 is set high and the first and third column enable signals E1, E3 are low, activating the column enable transistors 42a, 42c, 42e of the first column 32a, third column 32c, and fifth column 32e. The first column-out signal 16a in each of the active columns 32a, 32c, 32e is routed to the column ADC 18a, 18c, 18e of the respective column 32a, 32c, 32e by activating the first control transistor 42a-42f of each column 32a, 32c, 32e (e.g., by setting control signals S[1], S[7], and S[15] high). In some embodiments, one or more cross-column enable signals E1B-E3B are set high to allow routing of the column-out signals 16a-16c to an adjacent column ADC 18b, 18d, 18f For example, in the illustrated embodiment, the first cross-column enable signal E1B and the third cross-column enable signal E3B are set high to route the second column-out signal 16b of the first column 32a, third column 32c, and fifth column 32e to an adjacent column ADC 18b, 18d, 18f (e.g., by setting control signals S5, S11, S17 high). Table 8 illustrates one embodiment of a control table for (V:½, H:½) down-sampling read operation of the column routing matrix 14b_2.

TABLE 8

| Row # | C1 | C2 | C3 | S[18:1] | AD# |
|---|---|---|---|---|---|
| 72n | ● | | | 010; 001; 010; 001; 010; 001 | 2m |
| 72n + 1 | | | | 010; 001; 010; 001; 010; 001 | 2m |
| 72n + 2 | | ● | | | |
| 72n + 3 | | | | | |
| 72n + 4 | | ● | | 010; 001; 010; 001; 010; 001 | 2m + 1 |
| 72n + 5 | | | | 010; 001; 010; 001; 010; 001 | 2m + 1 |
| 72n + 6 | | | ● | | |
| 72n + 7 | | | | | |
| 72n + 8 | ● | | | 010; 001; 010; 001; 010; 001 | 2m |
| 72n + 9 | | | | 010; 001; 010; 001; 010; 001 | 2m |
| 72n + 10 | | | ● | | |
| 72n + 11 | | | | | |
| 72n + 12 | | ● | | 010; 001; 010; 001; 010; 001 | 2m + 1 |
| 72n + 13 | | | | 010; 001; 010; 001; 010; 001 | 2m + 1 |
| 72n + 14 | | ● | | | |
| 72n + 15 | | | | | |
| 72n + 16 | ● | | | 010; 001; 010; 001; 010; 001 | 2m |
| 72n + 17 | | | | 010; 001; 010; 001; 010; 001 | 2m |
| 72n + 18 | | ● | | | |
| 72n + 19 | | | | | |
| 72n + 20 | | ● | | 010; 001; 010; 001; 010; 001 | 2m + 1 |
| 72n + 21 | | | | 010; 001; 010; 001; 010; 001 | 2m + 1 |
| 72n + 22 | | | ● | | |
| 72n + 23 | | | | | |
| 72n + 24 | ● | | | 010; 001; 010; 001; 010; 001 | 2m |
| 72n + 25 | | | | 010; 001; 010; 001; 010; 001 | 2m |
| 72n + 26 | | | ● | | |
| 72n + 27 | | | | | |
| 72n + 28 | | ● | | 010; 001; 010; 001; 010; 001 | 2m + 1 |
| 72n + 29 | | | | 010; 001; 010; 001; 010; 001 | 2m + 1 |
| 72n + 30 | | ● | | | |
| 72n + 31 | | | | | |
| 72n + 32 | ● | | | 010; 001; 010; 001; 010; 001 | 2m |
| 72n + 33 | | | | 010; 001; 010; 001; 010; 001 | 2m |
| 72n + 34 | | | ● | | |
| 72n + 35 | | | | | |
| 72n + 36 | | ● | | 010; 001; 010; 001; 010; 001 | 2m + 1 |
| 72n + 37 | | | | 010; 001; 010; 001; 010; 001 | 2m + 1 |
| 72n + 38 | ● | | | | |
| 72n + 39 | | | | | |
| 72n + 40 | ● | | | 010; 001; 010; 001; 010; 001 | 2m |
| 72n + 41 | | | | 010; 001; 010; 001; 010; 001 | 2m |
| 72n + 42 | | | ● | | |
| 72n + 43 | | | | | |
| 72n + 44 | | ● | | 010; 001; 010; 001; 010; 001 | 2m + 1 |
| 72n + 45 | | | | 010; 001; 010; 001; 010; 001 | 2m + 1 |
| 72n + 46 | | | ● | | |
| 72n + 47 | | | | | |
| 72n + 48 | ● | | | 010; 001; 010; 001; 010; 001 | 2m |
| 72n + 49 | | | | 010; 001; 010; 001; 010; 001 | 2m |
| 72n + 50 | | | ● | | |
| 72n + 51 | | | | | |
| 72n + 52 | | ● | | 010; 001; 010; 001; 010; 001 | 2m + 1 |
| 72n + 53 | | | | 010; 001; 010; 001; 010; 001 | 2m + 1 |
| 72n + 54 | ● | | | | |
| 72n + 55 | | | | | |
| 72n + 56 | ● | | | 010; 001; 010; 001; 010; 001 | 2m |
| 72n + 57 | | | | 010; 001; 010; 001; 010; 001 | 2m |
| 72n + 58 | | | ● | | |
| 72n + 59 | | | | | |
| 72n + 60 | | ● | | 010; 001; 010; 001; 010; 001 | 2m + 1 |
| 72n + 61 | | | | 010; 001; 010; 001; 010; 001 | 2m + 1 |
| 72n + 62 | | ● | | | |
| 72n + 63 | | | | | |
| 72n + 64 | ● | | | 010; 001; 010; 001; 010; 001 | 2m |
| 72n + 65 | | | | 010; 001; 010; 001; 010; 001 | 2m |
| 72n + 66 | | | ● | | |
| 72n + 67 | | | | | |
| 72n + 68 | | ● | | 010; 001; 010; 001; 010; 001 | 2m + 1 |

TABLE 8-continued

| Row # | C1 | C2 | C3 | S[18:1] | AD# |
|---|---|---|---|---|---|
| 72n + 69 | | | | 010; 001; 010; 001; 010; 001 | 2m + 1 |
| 72n + 70 | ● | | | | |
| 72n + 71 | | | | | |

Figure 9E:
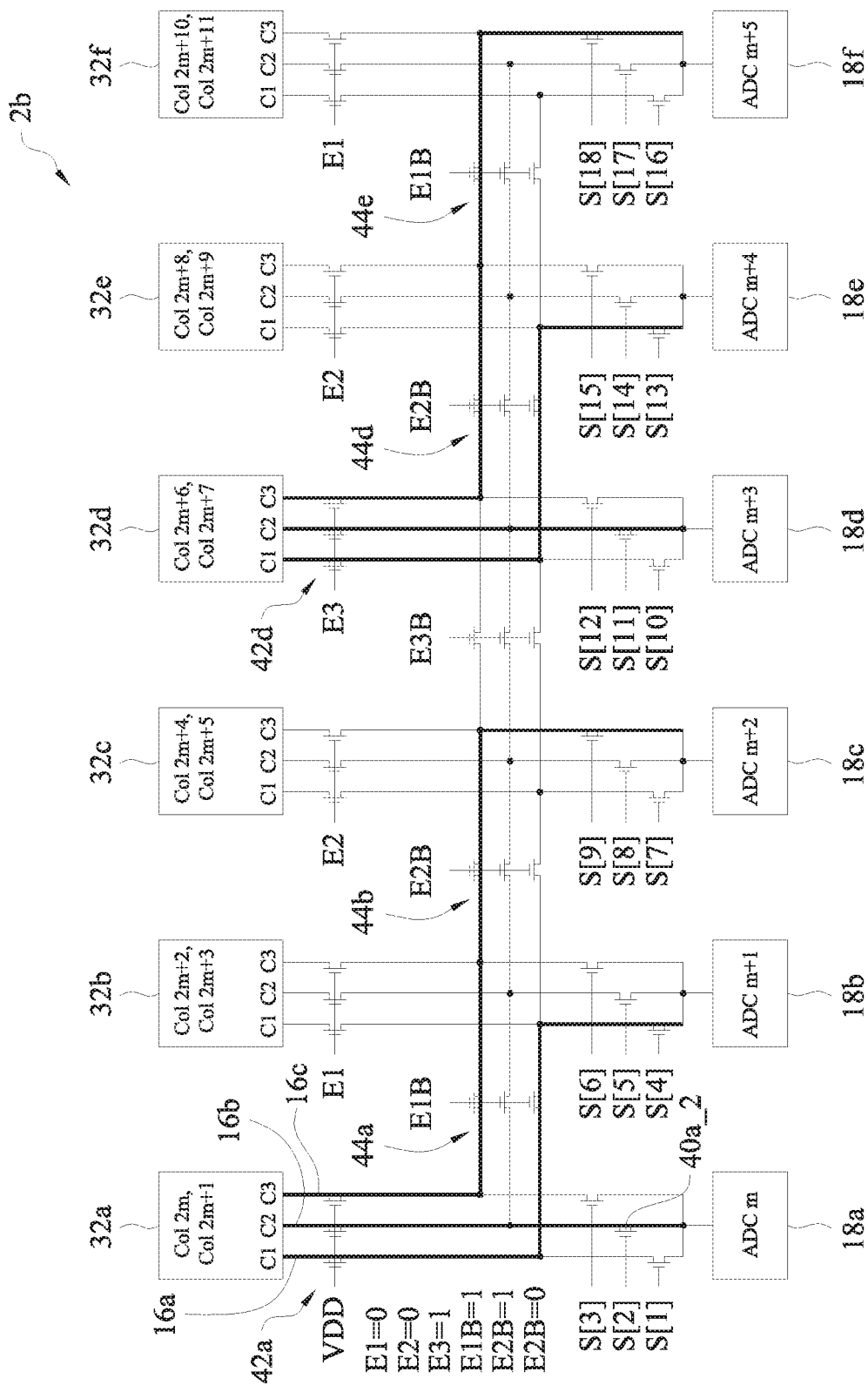
FIG. 9E illustrates the second column routing matrix of FIG. 9A configured for a second (V:⅓, H:⅓) down-sampling read operation, in accordance with some embodiments.
Figure 9F:
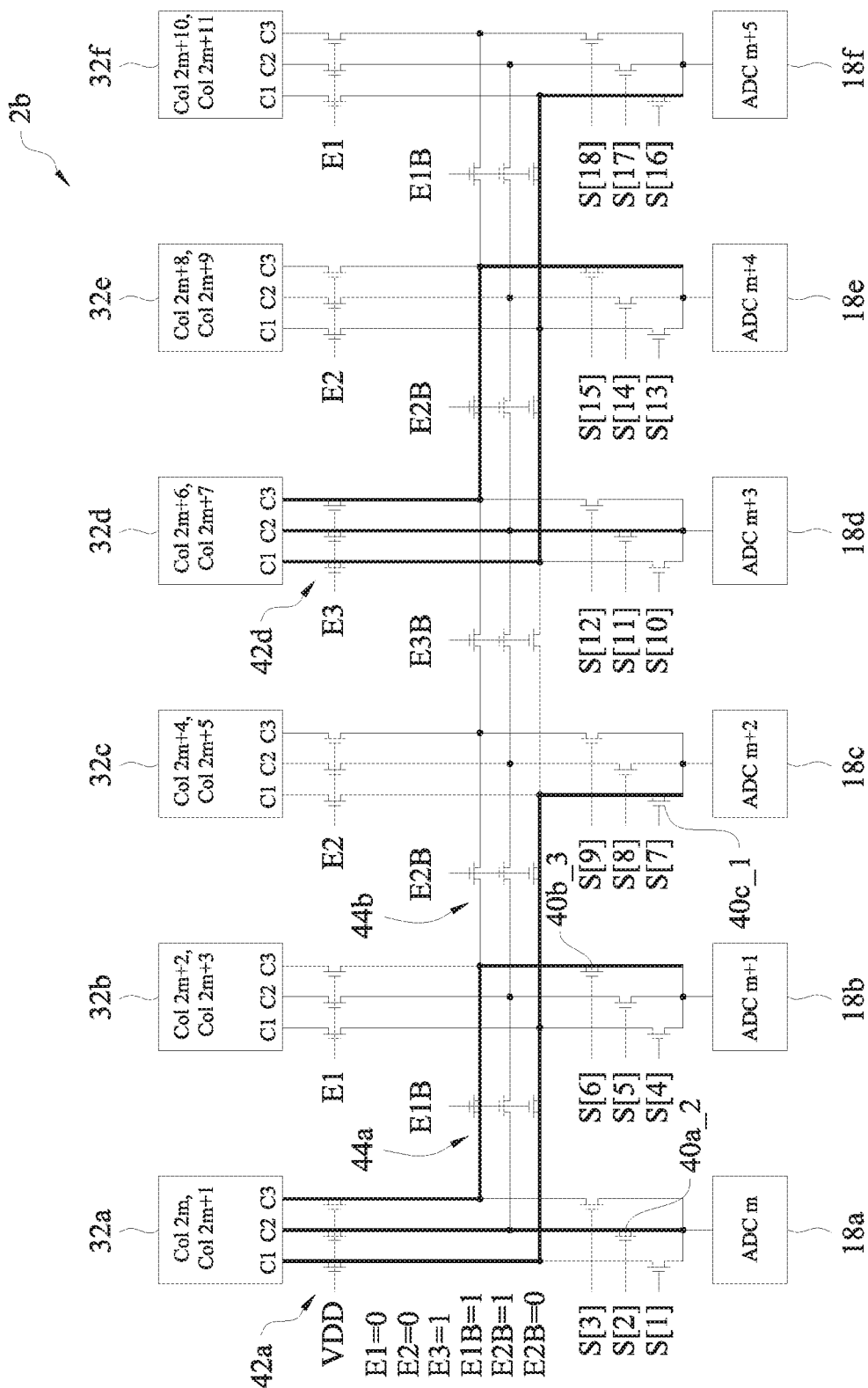
FIG. 9F illustrates the second column routing matrix of FIG. 9A configured for a third (V:⅓, H:⅓) down-sampling read operation, in accordance with some embodiments.
Figure 9G:
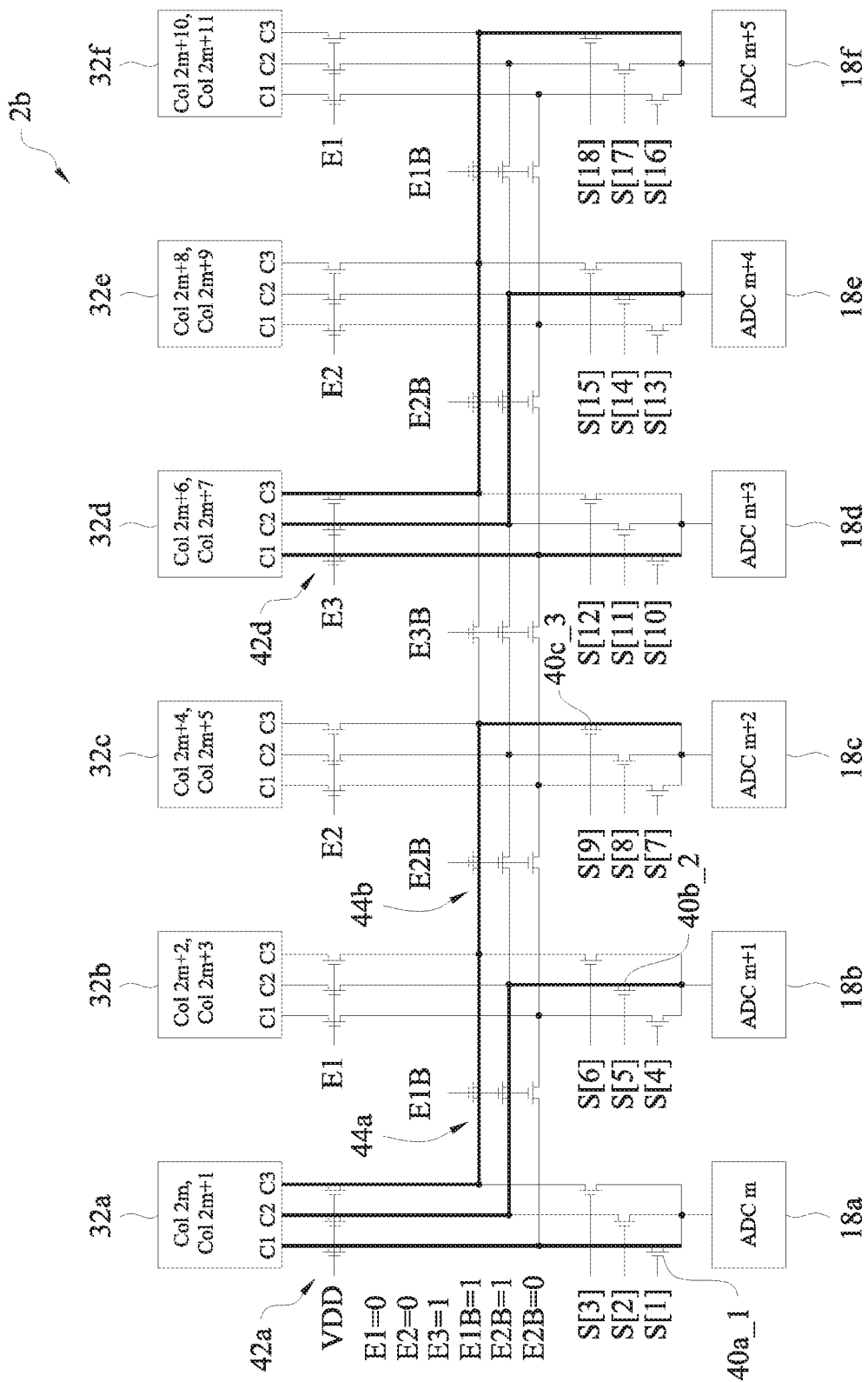
FIG. 9G illustrates the second column routing matrix of FIG. 9A configured for a fourth (V:⅓, H:⅓) down-sampling read operation, in accordance with some embodiments.

FIGS. 9D-9G illustrate various embodiments of CIS 2b illustrated in FIG. 8A configured for a (V:⅓, H:⅓) down-sampling read operation. For example, in the embodiment illustrated in FIG. 9D, the third column enable signal E3 is set high and the first and second column enable signals E1, E2 are low, enabling the column enable transistors 42a, 42d of the first column 32a and the fourth column 32e. The first column-out signal 16a in each of the active columns 32a, 32d is routed to the associated column ADC 18a, 18d by enabling the first control transistor 42a, 42d of each column 32a, 32d (e.g., setting control signals S[1] and S[10] high). In some embodiments, one or more cross-column enable signals E1B-E3B are set high to allow routing of column-out signals 16a-16c to adjacent column ADCs 18b-18c, 18e-18f. For example, in the embodiment illustrated in FIG. 9D, the first cross-column enable signal E1B and the second cross-column enable signal E2B are set high to enable the first column 32a, the second column 32b, the fourth column 32d, and the fifth column 32e to route column-out signal paths 16a-16c to an adjacent column. The third column-out signal 16c of each active column 32a, 32d is provided to an adjacent column ADC 18b, 18e (e.g., by setting the control signals S[6], S[15] high). The second column-out signal 16b of each active column 32a, 32d is further routed to a non-adjacent column ADC 18c, 18f (e.g., by setting the control signals S[8], S[17] high). FIGS. 9E-9G illustrate additional routing embodiments for a (V:⅓, H:⅓) down-sampling read operation. Table 9 illustrates one embodiment of a control table for (V:⅓, H:⅓) down-sampling read operation of the column routing matrix 14b_2.

TABLE 9

| Row # | C1 | C2 | C3 | S[18:1] | AD# |
|---|---|---|---|---|---|
| 72n | ● | | | 010; 100; 001; 010; 100; 001 | 3m |
| 72n + 1 | ● | | | 010; 100; 001; 010; 100; 001 | 3m |
| 72n + 2 | | ● | | | |
| 72n + 3 | | | | | |
| 72n + 4 | | ● | | | |
| 72n + 5 | | | | | |
| 72n + 6 | | | ● | 010; 100; 001; 010; 100; 001 | 3m + 1 |
| 72n + 7 | | | | 010; 100; 001; 010; 100; 001 | 3m + 1 |
| 72n + 8 | ● | | | | |
| 72n + 9 | | | | | |
| 72n + 10 | | ● | | | |
| 72n + 11 | | | | | |
| 72n + 12 | | ● | | 010; 100; 001; 010; 100; 001 | 3m + 2 |
| 72n + 13 | | | | 010; 100; 001; 010; 100; 001 | 3m + 2 |
| 72n + 14 | | | ● | | |
| 72n + 15 | | | | | |
| 72n + 16 | ● | | | | |
| 72n + 17 | | | | | |
| 72n + 18 | | ● | | 100; 001; 010; 100; 001; 010 | 3m |
| 72n + 19 | | | | 100; 001; 010; 100; 001; 010 | 3m |
| 72n + 20 | | | ● | | |
| 72n + 21 | | | | | |
| 72n + 22 | | ● | | | |
| 72n + 23 | | | | | |
| 72n + 24 | ● | | | 100; 001; 010; 100; 001; 010 | 3m + 1 |
| 72n + 25 | | | | 100; 001; 010; 100; 001; 010 | 3m + 1 |
| 72n + 26 | | ● | | | |
| 72n + 27 | | | | | |
| 72n + 28 | | ● | | | |
| 72n + 29 | | | | | |
| 72n + 30 | | ● | | 100; 001; 010; 100; 001; 010 | 3m + 2 |
| 72n + 31 | | | | 100; 001; 010; 100; 001; 010 | 3m + 2 |
| 72n + 32 | ● | | | | |
| 72n + 33 | | | | | |
| 72n + 34 | | ● | | | |
| 72n + 35 | | | | | |
| 72n + 36 | | ● | | 001; 100; 010; 001; 100; 010 | 3m |
| 72n + 37 | | | | 001; 100; 010; 001; 100; 010 | 3m |
| 72n + 38 | ● | | | | |
| 72n + 39 | | | | | |
| 72n + 40 | ● | | | | |
| 72n + 41 | | | | | |
| 72n + 42 | | ● | | 001; 100; 010; 001; 100; 010 | 3m + 1 |
| 72n + 43 | | | | 001; 100; 010; 001; 100; 010 | 3m + 1 |
| 72n + 44 | | ● | | | |
| 72n + 45 | | | | | |
| 72n + 46 | | ● | | | |
| 72n + 47 | | | | | |
| 72n + 48 | ● | | | 001; 100; 010; 001; 100; 010 | 3m + 2 |
| 72n + 49 | | | | 001; 100; 010; 001; 100; 010 | 3m + 2 |
| 72n + 50 | | ● | | | |
| 72n + 51 | | | | | |
| 72n + 52 | | ● | | | |
| 72n + 53 | | | | | |
| 72n + 54 | ● | | | 100; 010; 001; 100; 010; 001 | 3m |
| 72n + 55 | | | | 100; 010; 001; 100; 010; 001 | 3m |
| 72n + 56 | ● | | | | |
| 72n + 57 | | | | | |
| 72n + 58 | | ● | | | |
| 72n + 59 | | | | | |
| 72n + 60 | | ● | | 100; 010; 001; 100; 010; 001 | 3m + 1 |
| 72n + 61 | | | | 100; 010; 001; 100; 010; 001 | 3m + 1 |
| 72n + 62 | | ● | | | |
| 72n + 63 | | | | | |
| 72n + 64 | ● | | | | |
| 72n + 65 | | | | | |
| 72n + 66 | | ● | | 100; 010; 001; 100; 010; 001 | 3m + 2 |
| 72n + 67 | | | | 100; 010; 001; 100; 010; 001 | 3m + 2 |
| 72n + 68 | | ● | | | |
| 72n + 69 | | | | | |
| 72n + 70 | ● | | | | |
| 72n + 71 | | | | | |

Table 10 illustrates only the active rows of the array 4b for one embodiment of a (V:⅓, H:⅓) down-sampling read operation:

TABLE 10

| Row # | C1 | C2 | C3 | S[18:1] | AD# | |
|---|---|---|---|---|---|---|
| 72n | ● | | | 010; 100; 001; 010; 100; 001 | 3m | |
| 72n + 1 | | | | 010; 100; 001; 010; 100; 001 | 3m | C1 → ADC 3m |
| 72n + 6 | | ● | | 010; 100; 001; 010; 100; 001 | 3m + 1 | C2 → ADC 3m + 2 |
| 72n + 7 | | | | 010; 100; 001; 010; 100; 001 | 3m + 1 | C3 → ADC 3m + 1 |
| 72n + 12 | ● | | | 010; 100; 001; 010; 100; 001 | 3m + 2 | |
| 72n + 13 | | | | 010; 100; 001; 010; 100; 001 | 3m + 2 | |
| 72n + 18 | ● | | | 100; 001; 010; 100; 001; 010 | 3m | |
| 72n + 19 | | | | 100; 001; 010; 100; 001; 010 | 3m | C1 → ADC 3m + 1 |
| 72n + 24 | ● | | | 100; 001; 010; 100; 001; 010 | 3m + 1 | C2 → ADC 3m |
| 72n + 25 | | | | 100; 001; 010; 100; 001; 010 | 3m + 1 | C3 → ADC 3m + 2 |
| 72n + 30 | | ● | | 100; 001; 010; 100; 001; 010 | 3m + 2 | |
| 72n + 31 | | | | 100; 001; 010; 100; 001; 010 | 3m + 2 | |
| 72n + 36 | ● | | | 001; 100; 010; 001; 100; 010 | 3m | |
| 72n + 37 | | | | 001; 100; 010; 001; 100; 010 | 3m | C1 → ADC 3m + 1 |
| 72n + 42 | | ● | | 001; 100; 010; 001; 100; 010 | 3m + 1 | C2 → ADC 3m |
| 72n + 43 | | | | 001; 100; 010; 001; 100; 010 | 3m + 1 | C3 → ADC 3m + 2 |
| 72n + 48 | ● | | | 001; 100; 010; 001; 100; 010 | 3m + 2 | |
| 72n + 49 | | | | 001; 100; 010; 001; 100; 010 | 3m + 2 | |
| 72n + 54 | ● | | | 100; 010; 001; 100; 010; 001 | 3m | |
| 72n + 55 | | | | 100; 010; 001; 100; 010; 001 | 3m | C1 → ADC 3m |
| 72n + 60 | | ● | | 100; 010; 001; 100; 010; 001 | 3m + 1 | C2 → ADC 3m + 1 |
| 72n + 61 | | | | 100; 010; 001; 100; 010; 001 | 3m + 1 | C3 → ADC 3m + 2 |
| 72n + 66 | | | ● | 100; 010; 001; 100; 010; 001 | 3m + 2 | |
| 72n + 67 | | | | 100; 010; 001; 100; 010; 001 | 3m + 2 | |

Figure 10:
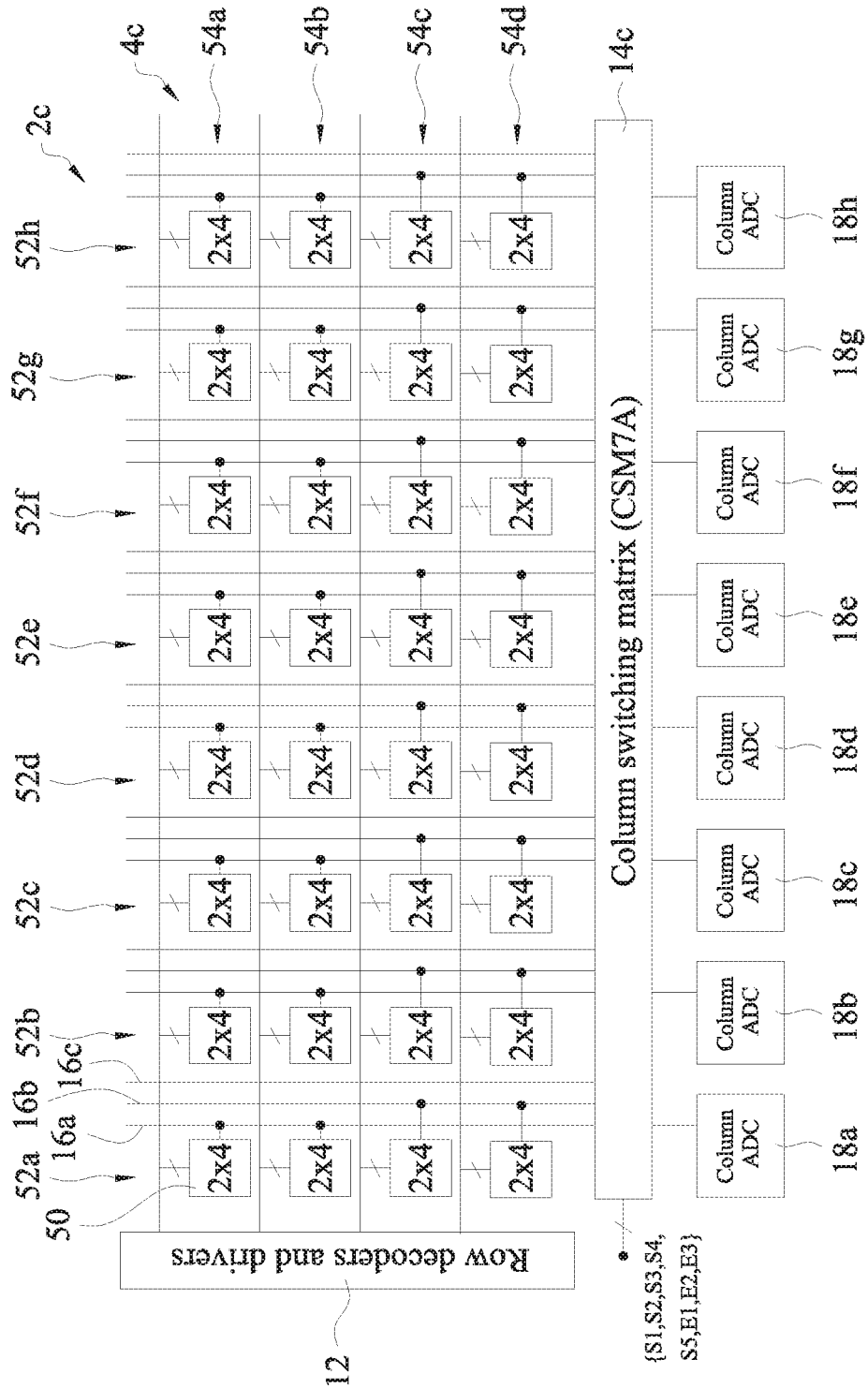
FIG. 10 illustrates a CIS including an array of 2×4 pixel elements having a plurality of column-out signal paths and a column routing matrix, in accordance with some embodiments.

FIG. 10 illustrates one embodiment of a CIS 2c including an array 4c of 2×4 shared pixel elements 50. The CIS 2c is similar to the CIS 2b described above and similar description is not repeated herein. The CIS 2c utilizes 2×4 shared pixel elements 50, which are similar to the 2×2 shared pixel elements of the CIS 2b, but include four rows of pixels per shared pixel element 50 (compared to two rows of pixels per shared pixel element 30). Each column 52a-52h of 2×4 pixel elements 50 has a single associated column ADC 18a-18h. Each column 52a-52h further includes a plurality of column-out signal paths 16a-16c each coupled to one or more shared pixel elements 50. For example, in some embodiments, each column 52a-52h includes at least three column-out signal paths 16a-16c. The column-out signal paths 16a-16c are each coupled to a column routing matrix 14c configured to route signals from one or more of the 2×4 pixel elements 50 to one or more of the column ADCs 18a-18h.

Figure 11A:
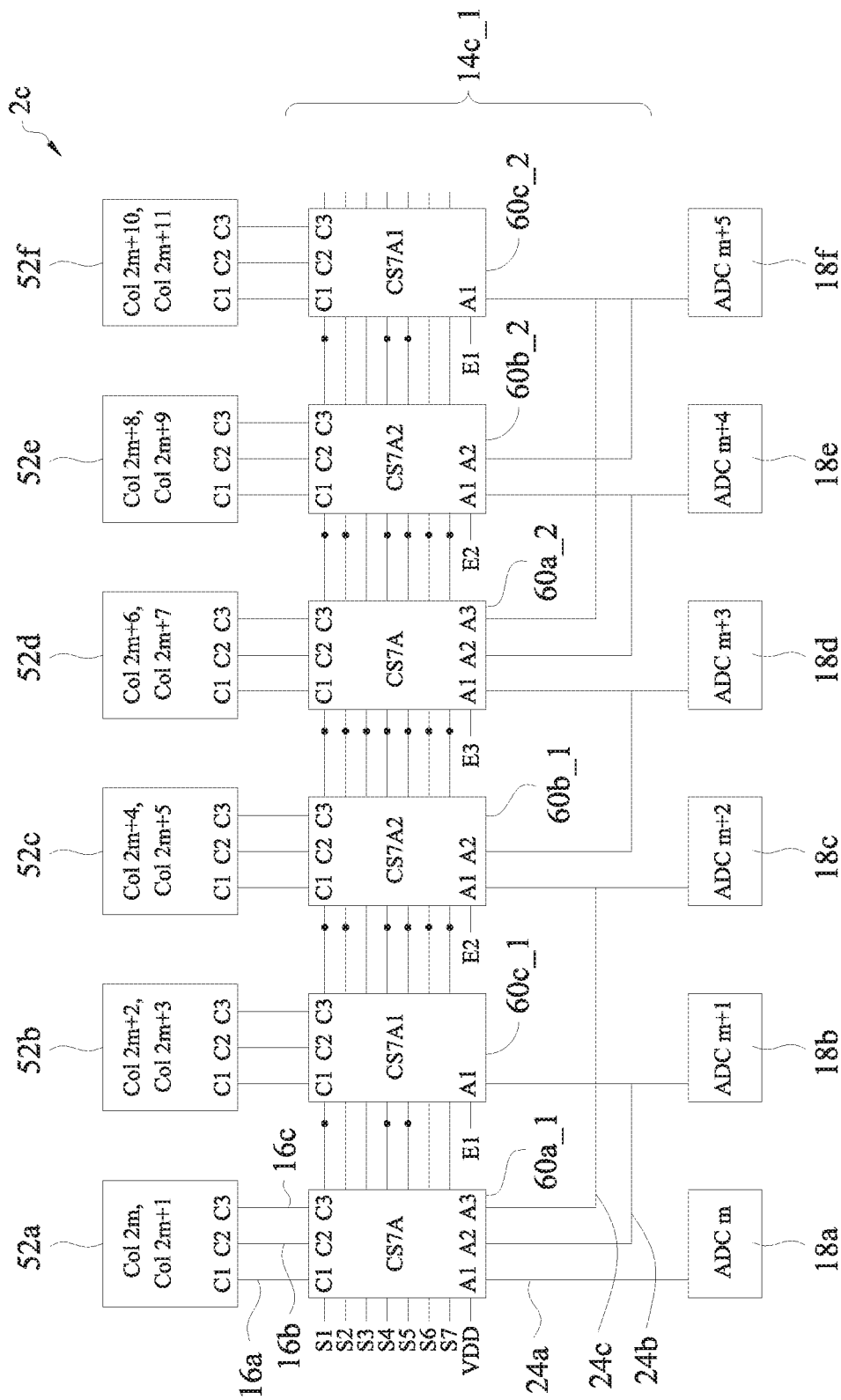
FIG. 11A illustrates a first column routing matrix of the CIS illustrated in FIG. 10, in accordance with some embodiments.

FIG. 11A illustrates the a first column routing matrix 14c_1 of the CIS of FIG. 10, in accordance with some embodiments. The column routing matrix 14c_1 includes a plurality of column routing circuits 60a-60c. Each of the plurality of routing circuits 60a-60c is coupled to a set of column-out signal paths 16a-16c for each of the respective columns 52a-52f of the CIS 2c. The routing circuits 60a-60c receive a plurality of digital control signals S[1:7]. The plurality of control signals S[1:7] control the configuration of the routing circuits 60a-60c to route one or more of the column-out signal paths 16a-16c to one or more column ADCs 18a-18f based on the read operation being performed, such as, for example, an all-pixel read operation, a (V:½, H:½) down-sampling read operation, a (V:⅓, H:⅓) down-sampling read operation, and/or any other suitable read operations, as discussed in more detail below. In some embodiments, each of the routing circuits 60a-60c can be individually, or collectively as part of a set, enabled and/or disabled, for example, by one or more enable signals E1-E3.

The plurality of routing circuits 60a-60c can include one or more types of column routing circuits, such as a first column routing circuit 60a_1-60a_2, a second column routing circuit 60b_1-60b_2, and/or a third column routing circuit 60c_1-60c_2. Each of the types of column routing circuits 60a-60c are configured to receive one or more of the control signals S[1:7] and/or to generate a different routing based on the received control signals S[1:7]. In some embodiments, only some types of routing circuits 60a, 60c are used during down-sampling read operations, such as (V:½, H:½) or (V:⅓, H:⅓) down-sampling read operations, as discussed in more detail below.

Figure 11B:
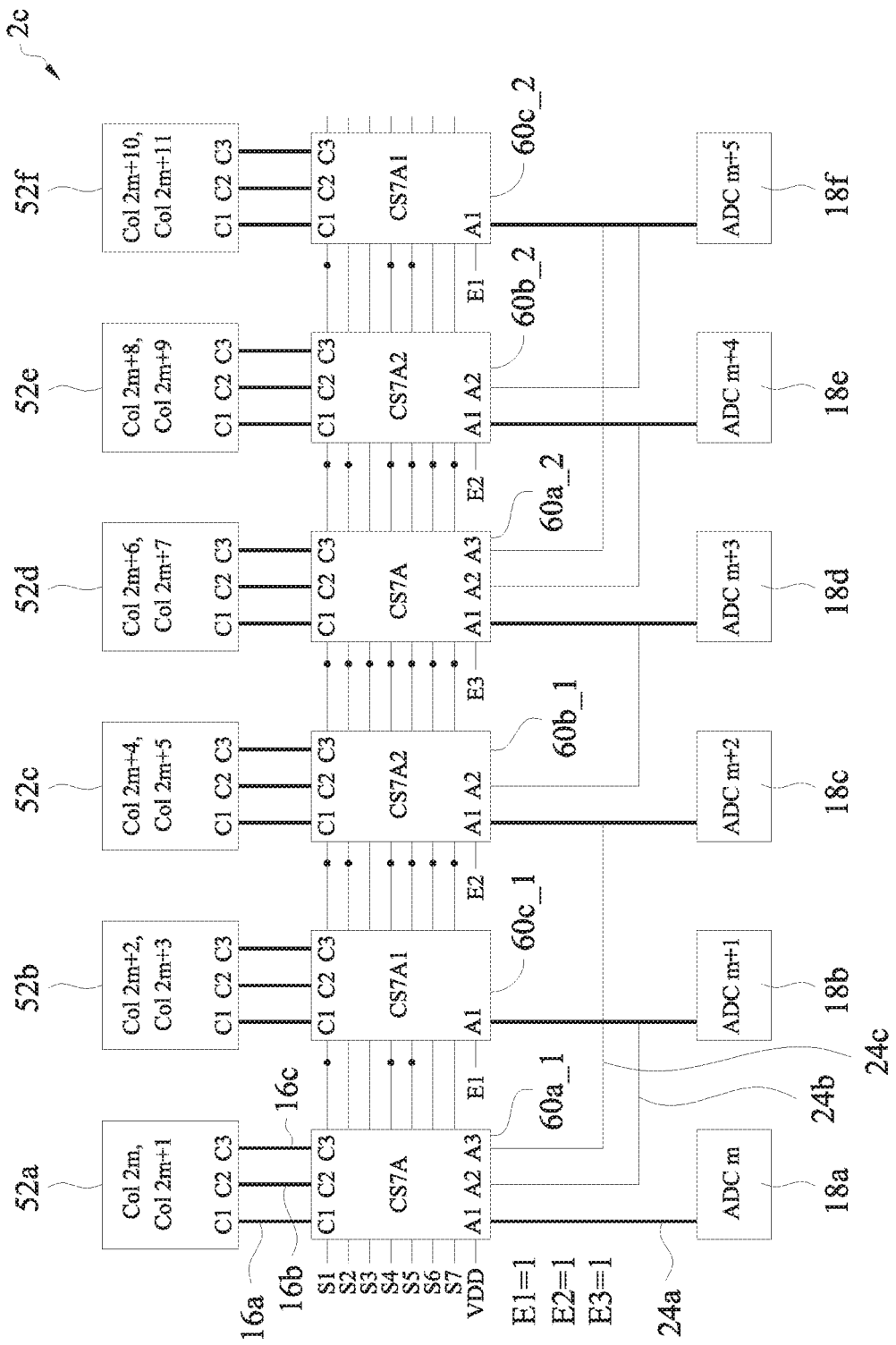
FIG. 11B illustrates the first column routing matrix of FIG. 11A configured for an all-pixel read operation, in accordance with some embodiments.

FIG. 11B illustrates the column routing matrix 14c_1 of FIG. 11A configured for an all-pixel read operation, in accordance with some embodiments. Each of the pixel elements 50 in the first column 52a are sequentially activated by the row driver circuit 12. The column routing circuits 60a-60c are configured to route each 2×4 pixel element 50 to a corresponding column ADC 18a-18f. For example, in the illustrated embodiment, the column routing circuit 60a_1 of the first column 52a routes each of the column-out signals 16a-16c to a first output 24a of the column routing circuit 60a_1 coupled to the first column ADC 18a. Similarly, the column routing circuit 60b_1 of the second column 52b routes each of the column-out signals 16a-16c of the second column 52b to a first output 24a of the column routing circuit 60b_1 coupled to the second column ADC 18b. Each of the remaining column routing circuits 60a-60c similarly route the column-out signals 16a-16c of their respective columns 52c-52f to a first output 24a coupled to the respective column ADC 18c-18f. In some embodiments, the time for execution of an all-pixel read operation is determined by the number of rows in each column and is denoted herein as X. Table 11 below illustrates one embodiment of a control table for an all-pixel read operation of the column routing matrix 14c_1.

TABLE 11

| Row # | C1 | C2 | C3 | S[7:1] | ADC # |
|---|---|---|---|---|---|
| 72n | ● | | | 0, 0, 0, 0, 0, 0, 1 | m |
| 72n + 1 | | | | 0, 0, 0, 0, 0, 0, 1 | m |
| 72n + 2 | | | | 0, 0, 0, 0, 0, 0, 1 | m |
| 72n + 3 | | | | 0, 0, 0, 0, 0, 0, 1 | m |
| 72n + 4 | | ● | | 0, 0, 0, 1, 0, 0, 0 | m |
| 72n + 5 | | | | 0, 0, 0, 1, 0, 0, 0 | m |
| 72n + 6 | | | | 0, 0, 0, 1, 0, 0, 0 | m |
| 72n + 7 | | | | 0, 0, 0, 1, 0, 0, 0 | m |
| 72n + 8 | ● | | | 0, 0, 0, 0, 0, 0, 1 | m |
| 72n + 9 | | | | 0, 0, 0, 0, 0, 0, 1 | m |
| 72n + 10 | | | | 0, 0, 0, 0, 0, 0, 1 | m |
| 72n + 11 | | | | 0, 0, 0, 0, 0, 0, 1 | m |
| 72n + 12 | | | ● | 0, 0, 1, 0, 0, 0, 0 | m |
| 72n + 13 | | | | 0, 0, 1, 0, 0, 0, 0 | m |
| 72n + 14 | | | | 0, 0, 1, 0, 0, 0, 0 | m |
| 72n + 15 | | | | 0, 0, 1, 0, 0, 0, 0 | m |
| 72n + 16 | ● | | | 0, 0, 0, 0, 0, 0, 1 | m |
| 72n + 17 | | | | 0, 0, 0, 0, 0, 0, 1 | m |
| 72n + 18 | | | | 0, 0, 0, 0, 0, 0, 1 | m |
| 72n + 19 | | | | 0, 0, 0, 0, 0, 0, 1 | m |
| 72n + 20 | | | ● | 0, 0, 1, 0, 0, 0, 0 | m |
| 72n + 21 | | | | 0, 0, 1, 0, 0, 0, 0 | m |
| 72n + 22 | | | | 0, 0, 1, 0, 0, 0, 0 | m |
| 72n + 23 | | | | 0, 0, 1, 0, 0, 0, 0 | m |
| 72n + 24 | | ● | | 0, 0, 0, 1, 0, 0, 0 | m |
| 72n + 25 | | | | 0, 0, 0, 1, 0, 0, 0 | m |
| 72n + 26 | | | | 0, 0, 0, 1, 0, 0, 0 | m |
| 72n + 27 | | | | 0, 0, 0, 1, 0, 0, 0 | m |
| 72n + 28 | | | ● | 0, 0, 1, 0, 0, 0, 0 | m |
| 72n + 29 | | | | 0, 0, 1, 0, 0, 0, 0 | m |
| 72n + 30 | | | | 0, 0, 1, 0, 0, 0, 0 | m |
| 72n + 31 | | | | 0, 0, 1, 0, 0, 0, 0 | m |
| 72n + 32 | | ● | | 0, 0, 0, 1, 0, 0, 0 | m |
| 72n + 33 | | | | 0, 0, 0, 1, 0, 0, 0 | m |
| 72n + 34 | | | | 0, 0, 0, 1, 0, 0, 0 | m |
| 72n + 35 | | | | 0, 0, 0, 1, 0, 0, 0 | m |
| 72n + 36 | ● | | | 0, 0, 0, 0, 0, 0, 1 | m |
| 72n + 37 | | | | 0, 0, 0, 0, 0, 0, 1 | m |
| 72n + 38 | | | | 0, 0, 0, 0, 0, 0, 1 | m |
| 72n + 39 | | | | 0, 0, 0, 0, 0, 0, 1 | m |
| 72n + 40 | | ● | | 0, 0, 0, 1, 0, 0, 0 | m |
| 72n + 41 | | | | 0, 0, 0, 1, 0, 0, 0 | m |
| 72n + 42 | | | | 0, 0, 0, 1, 0, 0, 0 | m |
| 72n + 43 | | | | 0, 0, 0, 1, 0, 0, 0 | m |
| 72n + 44 | ● | | | 0, 0, 0, 0, 0, 0, 1 | m |
| 72n + 45 | | | | 0, 0, 0, 0, 0, 0, 1 | m |
| 72n + 46 | | | | 0, 0, 0, 0, 0, 0, 1 | m |
| 72n + 47 | | | | 0, 0, 0, 0, 0, 0, 1 | m |
| 72n + 48 | | | ● | 0, 0, 1, 0, 0, 0, 0 | m |
| 72n + 49 | | | | 0, 0, 1, 0, 0, 0, 0 | m |
| 72n + 50 | | | | 0, 0, 1, 0, 0, 0, 0 | m |
| 72n + 51 | | | | 0, 0, 1, 0, 0, 0, 0 | m |
| 72n + 52 | ● | | | 0, 0, 0, 0, 0, 0, 1 | m |
| 72n + 53 | | | | 0, 0, 0, 0, 0, 0, 1 | m |
| 72n + 54 | | | | 0, 0, 0, 0, 0, 0, 1 | m |
| 72n + 55 | | | | 0, 0, 0, 0, 0, 0, 1 | m |
| 72n + 56 | | | ● | 0, 0, 1, 0, 0, 0, 0 | m |
| 72n + 57 | | | | 0, 0, 1, 0, 0, 0, 0 | m |
| 72n + 58 | | | | 0, 0, 1, 0, 0, 0, 0 | m |
| 72n + 59 | | | | 0, 0, 1, 0, 0, 0, 0 | m |
| 72n + 60 | | ● | | 0, 0, 0, 1, 0, 0, 0 | m |
| 72n + 61 | | | | 0, 0, 0, 1, 0, 0, 0 | m |
| 72n + 62 | | | | 0, 0, 0, 1, 0, 0, 0 | m |
| 72n + 63 | | | | 0, 0, 0, 1, 0, 0, 0 | m |
| 72n + 64 | | | ● | 0, 0, 1, 0, 0, 0, 0 | m |
| 72n + 65 | | | | 0, 0, 1, 0, 0, 0, 0 | m |
| 72n + 66 | | | | 0, 0, 1, 0, 0, 0, 0 | m |
| 72n + 67 | | | | 0, 0, 1, 0, 0, 0, 0 | m |
| 72n + 68 | | ● | | 0, 0, 0, 1, 0, 0, 0 | m |
| 72n + 69 | | | | 0, 0, 0, 1, 0, 0, 0 | m |
| 72n + 70 | | | | 0, 0, 0, 1, 0, 0, 0 | m |
| 72n + 71 | | | | 0, 0, 0, 1, 0, 0, 0 | m |

Figure 11C:
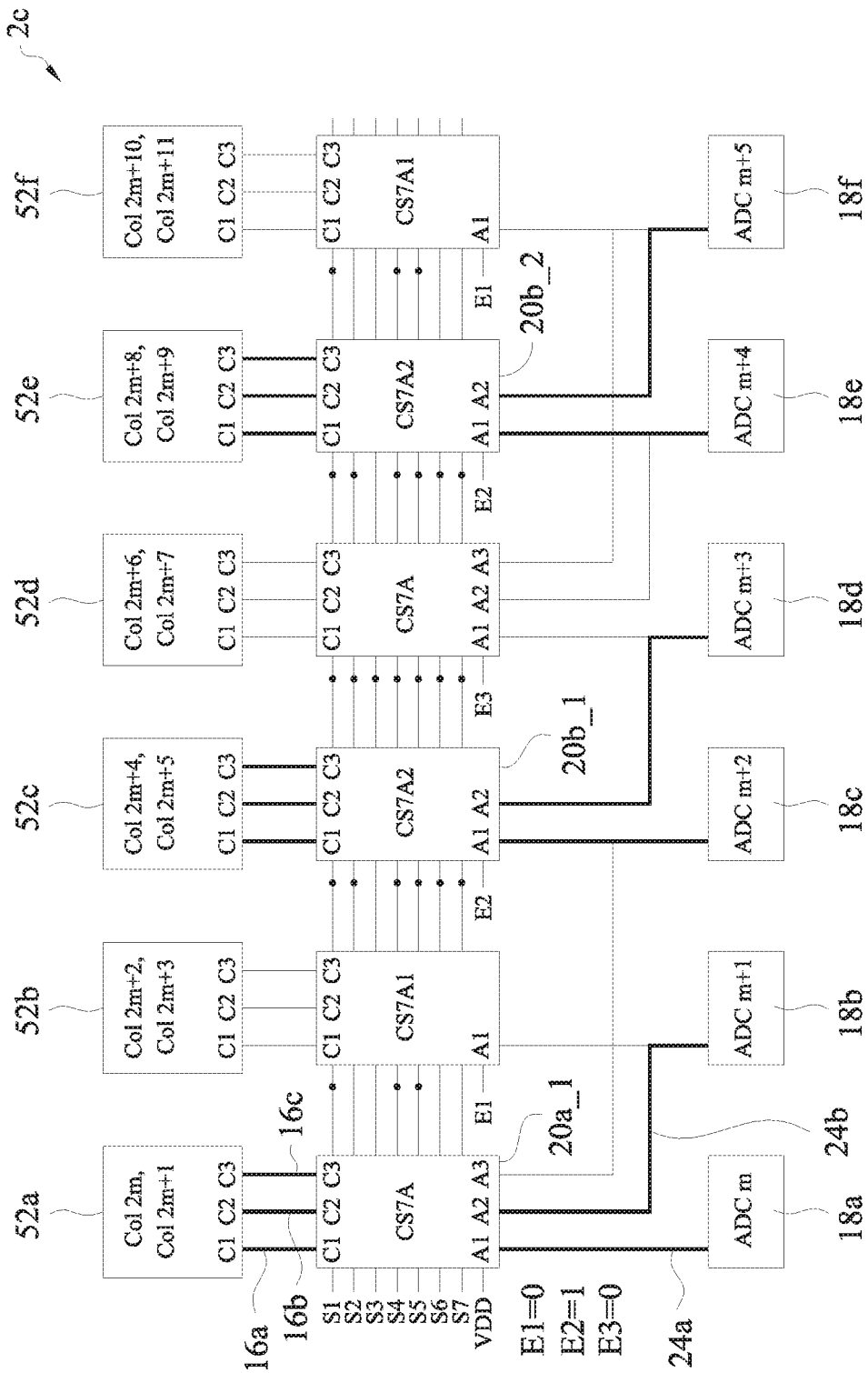
FIG. 11C illustrates the first column routing matrix of FIG. 11A configured for a (V:½, H:½) down-sampling read operation, in accordance with some embodiments.

FIG. 11C illustrates the column routing matrix 14c_1 of FIG. 11A configured for a (V:½, H:½) down-sampling read operation, in accordance with some embodiments. The column routing circuits 60a, 60c for half of the columns are configured to route a first column-out signal 16a to a respective column ADC and a second column-out signal 16b to an adjacent column ADC. For example, in some embodiments, the first column-out signal 16a of a first column 52a is routed to the corresponding column ADC 18a and the second column-out signal 16b is routed to an adjacent ADC 18b. The adjacent ADC 18b corresponds to a column 52b not read during the (V:½, H:½) down-sampling read operation. For example, in the illustrated embodiments, the first column 52a is read during the (V:½, H:½) down-sampling read operation and the second column 52b is skipped. Similarly, in some embodiments, the column routing circuit 60a_1 of the first column 52a routes the second column-out signal 16b to the column ADC 18a and the first column-out signal 16a to the adjacent column ADC 18b. The third column-out signal 16c is connected to unread rows and is not routed by the column routing circuit 60a_1 during a (V:½, H:½) down-sampling read operation. Although specific routing embodiments are discussed herein including associated and adjacent column ADCs, it will be appreciated that the column routing matrix 14c_1 can route the column-out signals 16a-16b of any column 52a-52f to any of the column ADCs 18a-18f.

By routing one of the column-out signals 16a, 16b to an adjacent column ADC 18b, 18d, 18f in an unread column 52b, the CIS 2c utilizes all of the column ADCs 18a-18f during a (V:½, H:½) down-sampling read operation. The column routing matrix 14c_1 allows two rows of 2×4 pixel elements 50 to be read from the same column simultaneously during the (V:½, H:½) down-sampling read operation. By reading two rows simultaneously, the (V:½, H:½) down-sampling read operation can be performed in a fourth of the time required for an all-pixel read operation, e.g., the read time for a (V:½, H:½) down-sampling read operation is X/4.

In some embodiments, the column routing circuits 60a-60c are coupled to a plurality of enable signals E1-E3 that control activation of the column routing circuits 60a-60c during a read operation, such as a (V:½, H:½) down-sampling read operation. For example, in the illustrated embodiment, a first set of column routing circuits 60b_1, 60b_2 are coupled to a first enable signal E1, a second set of column routing circuits 60c_1, 60c_2 are coupled to a second enable signal E2, and a third set of column routing circuits 60a_2 are coupled to a third enable signal E3. In some embodiments, a fourth set of column routing circuits 60a_1 are always active during a read operation and have an enable input coupled directly to a power source VDD. During a (V:½, H:½) down-sampling read operation, the second enable signal E2 is high and the first and third enable signals E1, E3 are low. The second enable single E2 activates the second set of column routing circuits 60c_1, 60c_2. The fourth set of column routing circuits 60a_1 are also active during a (V:½, H:½) down-sampling read operation. In some embodiments, the active column routing circuits 60a_1, 60c_1, 60c_2 are configured to route the first column-out signal 16a to a first output 24a coupled to a corresponding column ADC 18a, 18c, 18e and the second column-out signal 16b to a second output 24b coupled to an adjacent column ADC 18b, 18d, 18f, although it will be appreciated that other routing schemes may be used. Table 12 below illustrates one embodiment of a control table for a (V:½, H:½) down-sampling read operation of the column routing matrix 14c_1.

TABLE 12

| Row # | C1 | C2 | C3 | S[7:1] | ADC # |
|---|---|---|---|---|---|
| 72n | ● | | | 0, 0, 0, 0, 0, 1, 1 | 2m |
| 72n + 1 | | | | 0, 0, 0, 0, 0, 1, 1 | 2m |
| 72n + 2 | | | | | |
| 72n + 3 | | | | | |
| 72n + 4 | | ● | | 0, 0, 0, 0, 0, 1, 1 | 2m + 1 |
| 72n + 5 | | | | 0, 0, 0, 0, 0, 1, 1 | 2m + 1 |
| 72n + 6 | | | | | |
| 72n + 7 | | | | | |
| 72n + 8 | ● | | | 1, 0, 0, 0, 0, 0, 1 | 2m |
| 72n + 9 | | | | 1, 0, 0, 0, 0, 0, 1 | 2m |
| 72n + 10 | | | | | |
| 72n + 11 | | | | | |
| 72n + 12 | | | ● | 1, 0, 0, 0, 0, 0, 1 | 2m + 1 |
| 72n + 13 | | | | 1, 0, 0, 0, 0, 0, 1 | 2m + 1 |
| 72n + 14 | | | | | |
| 72n + 15 | | | | | |
| 72n + 16 | ● | | | 1, 0, 0, 0, 0, 0, 1 | 2m |
| 72n + 17 | | | | 1, 0, 0, 0, 0, 0, 1 | 2m |
| 72n + 18 | | | | | |
| 72n + 19 | | | | | |
| 72n + 20 | | | ● | 1, 0, 0, 0, 0, 0, 1 | 2m + 1 |
| 72n + 21 | | | | 1, 0, 0, 0, 0, 0, 1 | 2m + 1 |
| 72n + 22 | | | | | |
| 72n + 23 | | | | | |
| 72n + 24 | | ● | | 1, 0, 0, 1, 0, 0, 0 | 2m |
| 72n + 25 | | | | 1, 0, 0, 1, 0, 0, 0 | 2m |
| 72n + 26 | | | | | |
| 72n + 27 | | | | | |
| 72n + 28 | | | ● | 1, 0, 0, 1, 0, 0, 0 | 2m + 1 |
| 72n + 29 | | | | 1, 0, 0, 1, 0, 0, 0 | 2m + 1 |
| 72n + 30 | | | | | |
| 72n + 31 | | | | | |
| 72n + 32 | | ● | | 0, 1, 0, 1, 0, 0, 0 | 2m |
| 72n + 33 | | | | 0, 1, 0, 1, 0, 0, 0 | 2m |
| 72n + 34 | | | | | |
| 72n + 35 | | | | | |
| 72n + 36 | ● | | | 0, 1, 0, 1, 0, 0, 0 | 2m + 1 |
| 72n + 37 | | | | 0, 1, 0, 1, 0, 0, 0 | 2m + 1 |
| 72n + 38 | | | | | |
| 72n + 39 | | | | | |
| 72n + 40 | | ● | | 0, 1, 0, 1, 0, 0, 0 | 2m |
| 72n + 41 | | | | 0, 1, 0, 1, 0, 0, 0 | 2m |
| 72n + 42 | | | | | |
| 72n + 43 | | | | | |
| 72n + 44 | ● | | | 0, 1, 0, 1, 0, 0, 0 | 2m + 1 |
| 72n + 45 | | | | 0, 1, 0, 1, 0, 0, 0 | 2m + 1 |
| 72n + 46 | | | | | |
| 72n + 47 | | | | | |
| 72n + 48 | | | ● | 0, 1, 1, 0, 0, 0, 0 | 2m |
| 72n + 49 | | | | 0, 1, 1, 0, 0, 0, 0 | 2m |
| 72n + 50 | | | | | |
| 72n + 51 | | | | | |
| 72n + 52 | ● | | | 0, 1, 1, 0, 0, 0, 0 | 2m + 1 |
| 72n + 53 | | | | 0, 1, 1, 0, 0, 0, 0 | 2m + 1 |
| 72n + 54 | | | | | |
| 72n + 55 | | | | | |
| 72n + 56 | | | ● | 0, 0, 1, 0, 0, 1, 0 | 2m |
| 72n + 57 | | | | 0, 0, 1, 0, 0, 1, 0 | 2m |
| 72n + 58 | | | | | |
| 72n + 59 | | | | | |
| 72n + 60 | | ● | | 0, 0, 1, 0, 0, 1, 0 | 2m + 1 |
| 72n + 61 | | | | 0, 0, 1, 0, 0, 1, 0 | 2m + 1 |
| 72n + 62 | | | | | |
| 72n + 63 | | | | | |
| 72n + 64 | | ● | | 0, 0, 1, 0, 0, 1, 0 | 2m |
| 72n + 65 | | | | 0, 0, 1, 0, 0, 1, 0 | 2m |
| 72n + 66 | | | | | |
| 72n + 67 | | | | | |
| 72n + 68 | | ● | | 0, 0, 1, 0, 0, 1, 0 | 2m + 1 |
| 72n + 69 | | | | 0, 0, 1, 0, 0, 1, 0 | 2m + 1 |
| 72n + 70 | | | | | |
| 72n + 71 | | | | | |

Figure 11D:
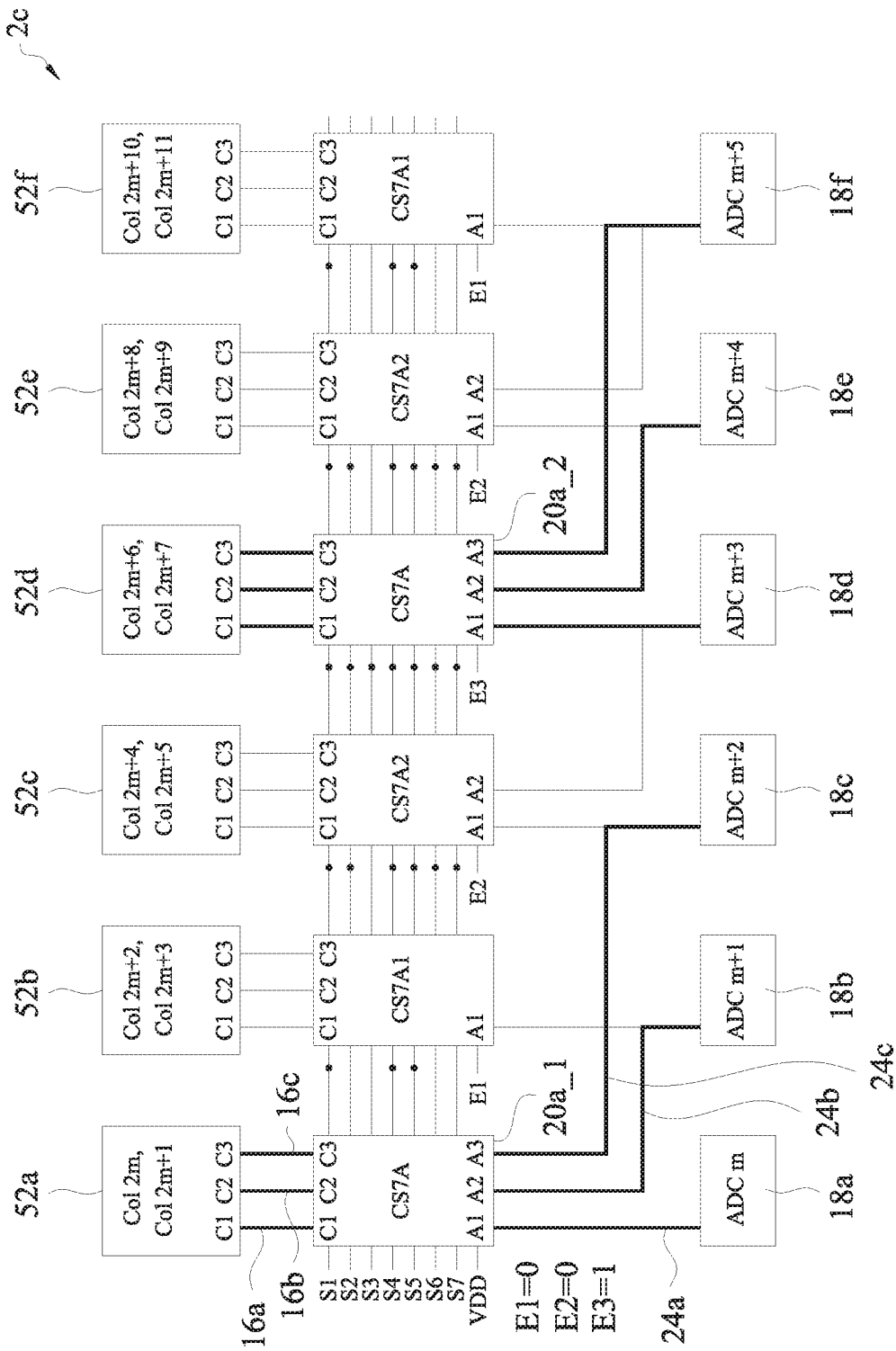
FIG. 11D illustrates the first column routing matrix of FIG. 11A configured for a (V:⅓, H:⅓) down-sampling read operation, in accordance with some embodiments.

FIG. 11D illustrates the column routing matrix 14c_1 of FIG. 11A configured for a (V:⅓, H:⅓) down-sampling read operation, in accordance with some embodiments. The column routing circuits 60a_1, 60a_2 for one third of the columns 52a-52f are configured to route the column out signals 16a-16c to a corresponding column ADC, an adjacent column ADC, and a non-adjacent column ADC. For example, in the illustrated embodiment, during a (V:⅓, H:⅓) down-sampling read operation, every third row of the first column 52a is read and the rows in between are skipped. The column routing circuit 60a_1 of the first column 52a routes one of the column-out signals 16a-16c to the first column ADC 18a (e.g., the column ADC), one of the column-out signals 16a-16c to the second column ADC 18b (e.g., the adjacent column ADC), and one of the column-out signals 16a-16c to the third column ADC 18c (e.g., the non-adjacent column ADC). In some embodiments, the non-adjacent column ADC is replaced with a second adjacent column ADC. Although specific embodiments discussed herein include corresponding, adjacent, and non-adjacent ADCs, it will be appreciated that the column routing matrix 14c_1 can route the column-out signals 16a-16c of any of the columns 52a-52f to any of the column ADCs 18a-18f.

In some embodiments, the column routing circuits 60a_1, 60a_2 of the first column 52a and the fourth column 52d (respectively) route the first column-out signal 16a to a first output 24a coupled to an associated column ADC 18a, 18d, the second column-out signal 16b to a second output 24b coupled to an adjacent column ADC 18b, 18e, and the third column-out signal 16c to a third output 24c coupled to a non-adjacent column ADC 18c, 18f. Similarly, the column routing circuits 60a_1, 60a_2 can route the first column out signal 16a to one of the second output 24b (e.g., the adjacent ADC 18b) or the third output 24c (e.g., the non-adjacent ADC 18c), the second column-out signal 16b to one of the first output 24a (e.g., the column ADC 18a) or the third output 24c (e.g., the non-adjacent ADC 18c), and the third column-out signal 16c to one of the first output 24a (e.g., the column ADC 18a) or the second output 24b (e.g., the adjacent ADC 18b). In some embodiments, the third output 24c can be coupled to a second adjacent ADC.

By routing two of the column-out signals 16b, 16c to adjacent column ADCs 18b, 18e and/or non-adjacent column ADCs 18c, 18f, the CIS 2c utilizes all of the column ADCs 18a-18f during a (V:⅓, H:⅓) down-sampling read operation. Three rows of 2×4 pixel elements 50 are read from the same column 52a simultaneously during the (V:⅓, H:⅓) down-sampling read operation. The CIS 2c performs the (V:⅓, H:⅓) down-sampling read operation in a ninth of the time required for an all-pixel read operation, e.g., the read time for a (V:⅓, H:⅓) down-sampling read operation is X/9.

In the illustrated embodiment, the column routing circuits 60a-60c are coupled to a plurality of enable signals E1-E3. The enable signals E1-E3 can be configured to activate only those column routing circuits 60a_1, 60a_2 used during the (V:⅓, H:⅓) down-sampling read operation. For example, in the illustrated embodiment, the third enable signal E3 is high and the first and second enable signals E1, E2 are low. The third enable signal E3 activates the third set of column routing circuits 60a_2. The fourth set of column routing circuits 60a_1 coupled directly to VDD is also activate during the (V:⅓, H:⅓) down-sampling read operation. In some embodiments, the active column routing circuits 60a_1, 60a_2 are configured to route the first column-out signal 16a to a first output 24a coupled to a corresponding column ADC 18a, 18d, the second column-out signal 16b to a second output 24b coupled to an adjacent column ADC 18b, 18e, and the third column-out signal 16c to a third output 24c coupled to a non-adjacent ADC 18c, 18f, although it will be appreciated that other routing schemes may be used. Table 13 below illustrates one embodiment of a control table for a (V:⅓, H:⅓) down-sampling read operation of the column routing matrix 14c_1.

TABLE 13

| Row # | C1 | C2 | C3 | S[7:1] | ADC # |
|---|---|---|---|---|---|
| 72n | ● | | | 0, 0, 0, 0, 1, 1, 1 | 3m |
| 72n + 1 | | | | 0, 0, 0, 0, 1, 1, 1 | 3m |
| 72n + 2 | | | | | |
| 72n + 3 | | | | | |
| 72n + 4 | | ● | | | |
| 72n + 5 | | | | | |
| 72n + 6 | | | | 0, 0, 0, 0, 1, 1, 1 | 3m + 1 |
| 72n + 7 | | | | 0, 0, 0, 0, 1, 1, 1 | 3m + 1 |
| 72n + 8 | ● | | | | |
| 72n + 9 | | | | | |
| 72n + 10 | | | | | |
| 72n + 11 | | | | | |
| 72n + 12 | | | ● | 0, 0, 0, 0, 1, 1, 1 | 3m + 2 |
| 72n + 13 | | | | 0, 0, 0, 0, 1, 1, 1 | 3m + 2 |
| 72n + 14 | | | | | |
| 72n + 15 | | | | | |
| 72n + 16 | ● | | | | |
| 72n + 17 | | | | | |
| 72n + 18 | | | | 0, 0, 0, 0, 1, 1, 1 | 3m |
| 72n + 19 | | | | 0, 0, 0, 0, 1, 1, 1 | 3m |
| 72n + 20 | | ● | | | |
| 72n + 21 | | | | | |
| 72n + 22 | | | | | |
| 72n + 23 | | | | | |
| 72n + 24 | | | ● | 0, 0, 0, 0, 1, 1, 1 | 3m + 1 |
| 72n + 25 | | | | 0, 0, 0, 0, 1, 1, 1 | 3m + 1 |
| 72n + 26 | | | | | |
| 72n + 27 | | | | | |
| 72n + 28 | | ● | | | |
| 72n + 29 | | | | | |
| 72n + 30 | | | | 0, 0, 0, 0, 1, 1, 1 | 3m + 2 |
| 72n + 31 | | | | 0, 0, 0, 0, 1, 1, 1 | 3m + 2 |
| 72n + 32 | | ● | | | |
| 72n + 33 | | | | | |
| 72n + 34 | | | | | |
| 72n + 35 | | | | | |
| 72n + 36 | ● | | | 0, 0, 0, 0, 1, 1, 1 | 3m |
| 72n + 37 | | | | 0, 0, 0, 0, 1, 1, 1 | 3m |
| 72n + 38 | | | | | |
| 72n + 39 | | | | | |
| 72n + 40 | | ● | | | |
| 72n + 41 | | | | | |
| 72n + 42 | | | | 0, 0, 0, 0, 1, 1, 1 | 3m + 1 |
| 72n + 43 | | | | 0, 0, 0, 0, 1, 1, 1 | 3m + 1 |
| 72n + 44 | ● | | | | |
| 72n + 45 | | | | | |
| 72n + 46 | | | | | |
| 72n + 47 | | | | | |
| 72n + 48 | | | ● | 0, 0, 0, 0, 1, 1, 1 | 3m + 2 |
| 72n + 49 | | | | 0, 0, 0, 0, 1, 1, 1 | 3m + 2 |
| 72n + 50 | | | | | |
| 72n + 51 | | | | | |
| 72n + 52 | ● | | | | |
| 72n + 53 | | | | | |
| 72n + 54 | | | | 0, 0, 0, 0, 1, 1, 1 | 3m |
| 72n + 55 | | | | 0, 0, 0, 0, 1, 1, 1 | 3m |
| 72n + 56 | | ● | | | |
| 72n + 57 | | | | | |
| 72n + 58 | | | | | |
| 72n + 59 | | | | | |
| 72n + 60 | | | ● | 0, 0, 0, 0, 1, 1, 1 | 3m + 1 |
| 72n + 61 | | | | 0, 0, 0, 0, 1, 1, 1 | 3m + 1 |
| 72n + 62 | | | | | |
| 72n + 63 | | | | | |
| 72n + 64 | | ● | | | |
| 72n + 65 | | | | | |
| 72n + 66 | | | | 0, 0, 0, 0, 1, 1, 1 | 3m + 2 |
| 72n + 67 | | | | 0, 0, 0, 0, 1, 1, 1 | 3m + 2 |
| 72n + 68 | ● | | | | |
| 72n + 69 | | | | | |
| 72n + 70 | | | | | |
| 72n + 71 | | | | | |

Figure 12A:
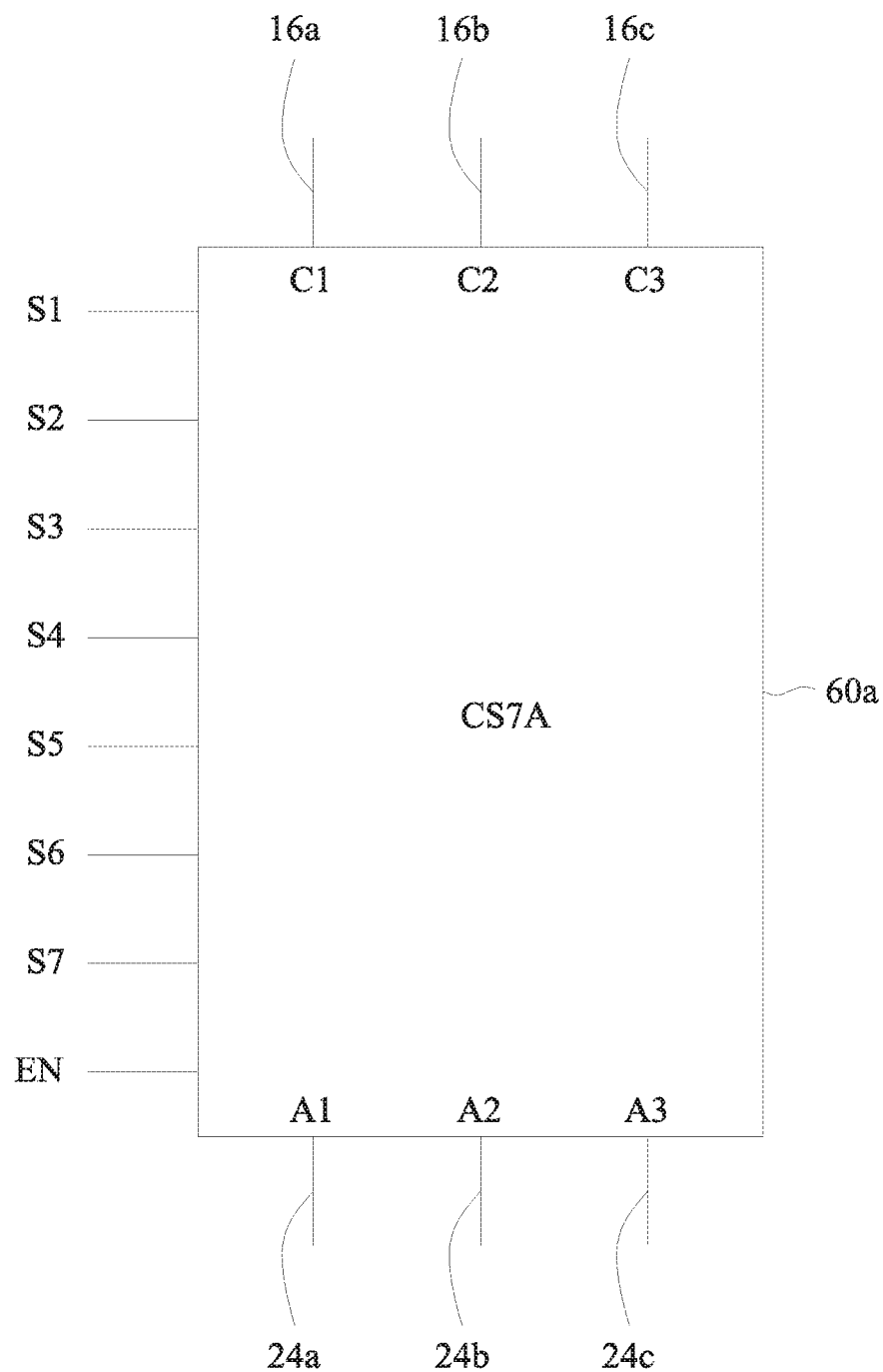
FIG. 12A illustrates a first column routing circuit of the CIS of FIG. 11A, in accordance with some embodiments.

FIGS. 12A-14B illustrate the column routing circuits 60a-60c, in accordance with some embodiments. One embodiment of the first column routing circuit 60a is illustrated in FIG. 12A. The first column routing circuit 60a is configured to receive a plurality of control signals S[1:7], an enable signal EN, and a plurality of column-out signals 16a-16c. The first column routing circuit 60a is configured to route at least one of the column-out signal paths 16a-16c to one or more outputs 24a-24c. The outputs 24a-24c are each coupled to a different column ADC 18a-18f For example, in some embodiments, the first output 24a is coupled to a column ADC 18a associated with the same column 52a as the first column routing circuit 60a, the second output 24b is coupled to an adjacent column ADC 18b, and the third output is coupled to a non-adjacent column ADC 18c. In some embodiments, the non-adjacent column ADC 18c is adjacent to the adjacent column ADC 18b. Although specific routing arrangements are discussed herein, it will be appreciated that the outputs 24a-24c of the column routing circuit 60a can be coupled to any of the column ADCs 18a-18f in the CIS 2c. The first column routing circuit 60a routes one or more of the column-out signals 16a-16c to one or more of the outputs 24a-24c based on the read operation being performed by the CIS 2c. In some embodiments, an enable signal EN is configured to control activation of the first column routing circuit 60a.

Figure 12B:
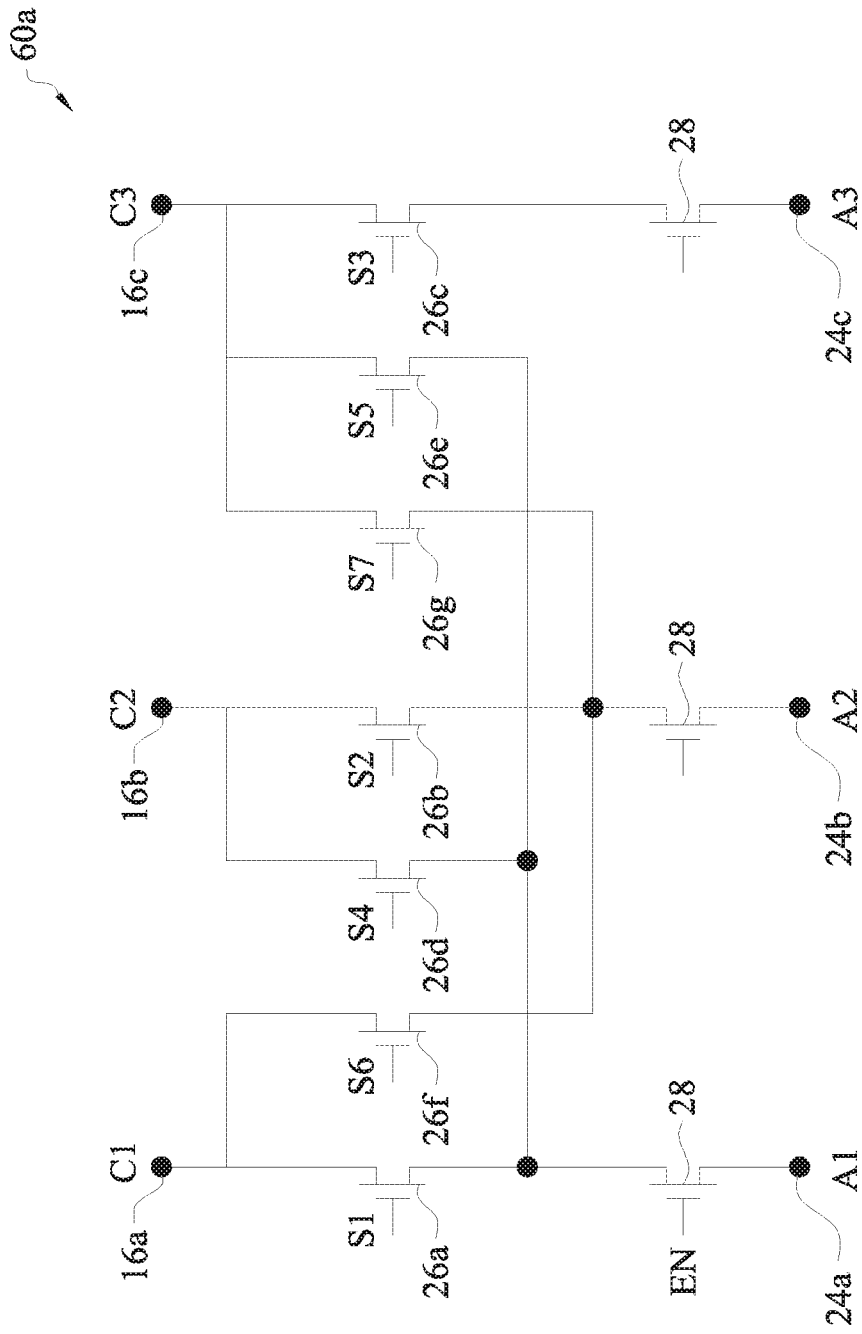
FIG. 12B illustrates a schematic of the first column routing circuit of FIG. 12A, in accordance with some embodiments.

FIG. 12B illustrates a circuit schematic of one embodiment of the first column routing circuit 60a. In some embodiments, the first column routing circuit 60a includes a plurality of routing transistors 26a-26g coupled to the plurality of column-out signal paths 16a-16c and the plurality of outputs 24a-24c. Each of the plurality of routing transistors 26a-26g includes a gate coupled to a corresponding control signal S[1:7]. For example, a first routing transistor 26a can be coupled to the first column-out signal 16a at a drain and the first output 24a at a source. When the first control signal S1 is high, the first routing transistor 26a routes a signal on the first column-out signal path 16a to the first output 24a. Similarly, a second routing transistor 26b can be coupled to the second column-out signal path 16b at a drain and the second output 24b at a source, and a third routing transistor 26c can be coupled to the third column-out signal path 16c at a drain and the third output 24c at a source. When the second or the third control signals S[2:3] are high, the respective column routing transistor 26b, 26c are turned on to route signals on the respective column-out signal path 16b, 16c to the associated outputs 24b, 24c.

A fourth routing transistor 26d can be further coupled between the second column-out path 16b (at a drain) and the first output 24a of the column routing circuit 20a (at a source). The gate of the fourth routing transistor 26d is coupled to a fourth control signal S[4]. When the fourth control signal S[4] is high, the fourth routing transistor 26d routes the signal on the second column-out signal path 16b to the first output 24a. Similarly, a fifth routing transistor 26e is further coupled between the third column-out path 16c (at a drain) and the first output 24a (at a source) of the column routing circuit 60a. The gate of the fifth routing transistor 26e is coupled to a fifth control signal S[5]. When the fifth control signal S[5] is high, the fifth routing transistor 26e routes the signal on the third column-out signal path 16c to the first output 24a.

A sixth control transistor 26f can be further coupled between the first column-out path 16a (at a drain) and the second output 24b (at a source). The gate of the sixth control transistor 26f is coupled to a sixth control signal S[6]. When the sixth control signal S[6] is high, the sixth routing transistor 26f routes the signal on the first column-out signal path 16a to the second output 24b. Similarly, a seventh control transistor 26g can be further coupled between the third column-out signal path 16c (at a drain) and the second output 24b (at a source). The gate of the seventh control transistor 26g is coupled to a seventh control signal S[7]. When the seventh control signal S[7] is high, the seventh routing transistor 26g routes the signal on the third column-out signal path 16c to the second output 24b. Although embodiments including enable-high transistors are discussed herein, it will be appreciated that any of the column routing circuits 60a-60c discussed herein can including enable-low transistors.

In some embodiments, an enable transistor 28 is coupled between each of the routing transistors 26a-26g and the respective outputs 24a-24c. The enable transistors 28 each have a gate coupled to the enable signal EN. During a read operation that includes the first column routing circuit 60a, the enable signal EN is set high, enabling one or more of the column-out signals 16a-16c to be output at one or more of the outputs 24a-24c. During a read operation that does not include the first column routing circuit 60a, the enable signal is set low, preventing the pixels 10 of the unused columns from being transmitted to the column ADCs 18a-18f. In some embodiments, the enable signal EN is a constant signal VDD that maintains the column routing circuit 60a in an enabled state.

The control signals S[1:7] define the read operation performed on the array 4c of the CIS 2c. For example, during an all-pixel read operation, each of the column-out signal paths 16a-16c are coupled to the first output 24a of the column routing circuit 60a to sequentially output all of the pixel elements 50 in a column 52a to a single column ADC 18a. The first control signal S[1], fourth control signal S[4], and fifth control signal S[5] are simultaneously set high to connect each of the column-out signal paths 16a-16c to the first output 24a. Each of the pixel elements 50 in the column 52a associated with the first column routing circuit 60a are sequentially activated by the row driver circuit 12 and provided to the first column ADC 18a, which is coupled to the first output 24a. In other embodiments, the first, fourth, and fifth control signals S[1], S[4], S[5] may be sequentially cycled to couple only a single column-out signal path 16a-16c to the output 24a at any time. Alternatively, the second control signal S[2], the sixth control signal S[6] and the seventh control signal S[7] can be set high to perform an all pixel read operation by using an adjacent column ADC 18b coupled to the second output 24b.

In some embodiments, during a (V:½, H:½) down-sampling read operation, the first control signal S[1] and the second control signal S[2] can be set high, coupling the first column-out signal path 16a to the first output 24a and the second signal path 16b to the second output 24b. The third through seventh control signals S[3:7] are set low and the third column-out signal path 16c is not used (e.g., the third, fifth, and seventh routing transistors 26c, 26e, 26g are off). A first pixel element 50a coupled to the first column-out signal path 16a in the associated column 52a is activated by the row driver circuit 12. Simultaneously, a second pixel element 50b coupled to the second column-out signal path 16b in the associated column 52a is activated by the row driver circuit 12. The first column-out signal path 16a is routed to a column ADC 18a by the first output 24a and the second column-out signal path 16b is routed to an adjacent ADC 18b by the second output 24b. The row driver circuit 12 sequentially activates pairs of pixel elements to read two rows simultaneously from the column 52a during a (V:½, H:½) down-sampling read operation. In other embodiments, the first column routing circuit 60a is not used during a (V:½, H:½) down-sampling read operation and the enable signal EN is set low. In other embodiments, during a (V:½, H:½) down-sampling read operation, the fourth control signal S[4] and the sixth control signal S[6] are set high, coupling the first column-out signal path 16a to the second output 24b and the second signal path 16b to the first output 24a.

In some embodiments, during a (V:⅓, H:⅓) down-sampling read operation, the first control signal S[1], the second control signal S[2], and the third control signal S[3] can be set high, coupling the first column-out signal path 16a to the first output 24a, the second column-out signal path 16b to the second output 24b, and the third column-out signal path 16c to the third output 24c. The fourth through seventh control signals S[4:7] are set low. A first pixel element 50a coupled to the first column-out signal path 16a in the associated column 52a is activated by the row driver circuit 12. Simultaneously, a second pixel element 50b coupled to the second column-out signal path 16b and a third pixel element 50c coupled to the third column-out signal path 16c in the associated column 52a are activated by the row driver circuit 12. The signal of the first column-out signal path 16a is routed to a column ADC 18a coupled to the first output 24a. The signal of the second column-out signal path 16b is routed to an adjacent ADC 18b coupled to the second output 24b. The signal of the third column-out signal path 16c is routed to a non-adjacent ADC 18c coupled to the third output 24c. The row driver circuit 12 sequentially activates triplets of pixels to read three rows simultaneously from the column 6a during a (V:⅓, H:⅓) down-sampling read operation. In other embodiments, the first column routing circuit 60a is not used during a (V:⅓, H:⅓) down-sampling read operation and the enable signal EN is set low. In other embodiments, during a (V:½, H:½) down-sampling read operation, one or more alternative control signals S[4:7] can be set high to couple any of the column-out signal paths 16a-16c to any of the outputs 24a-24c.

Figure 13A:
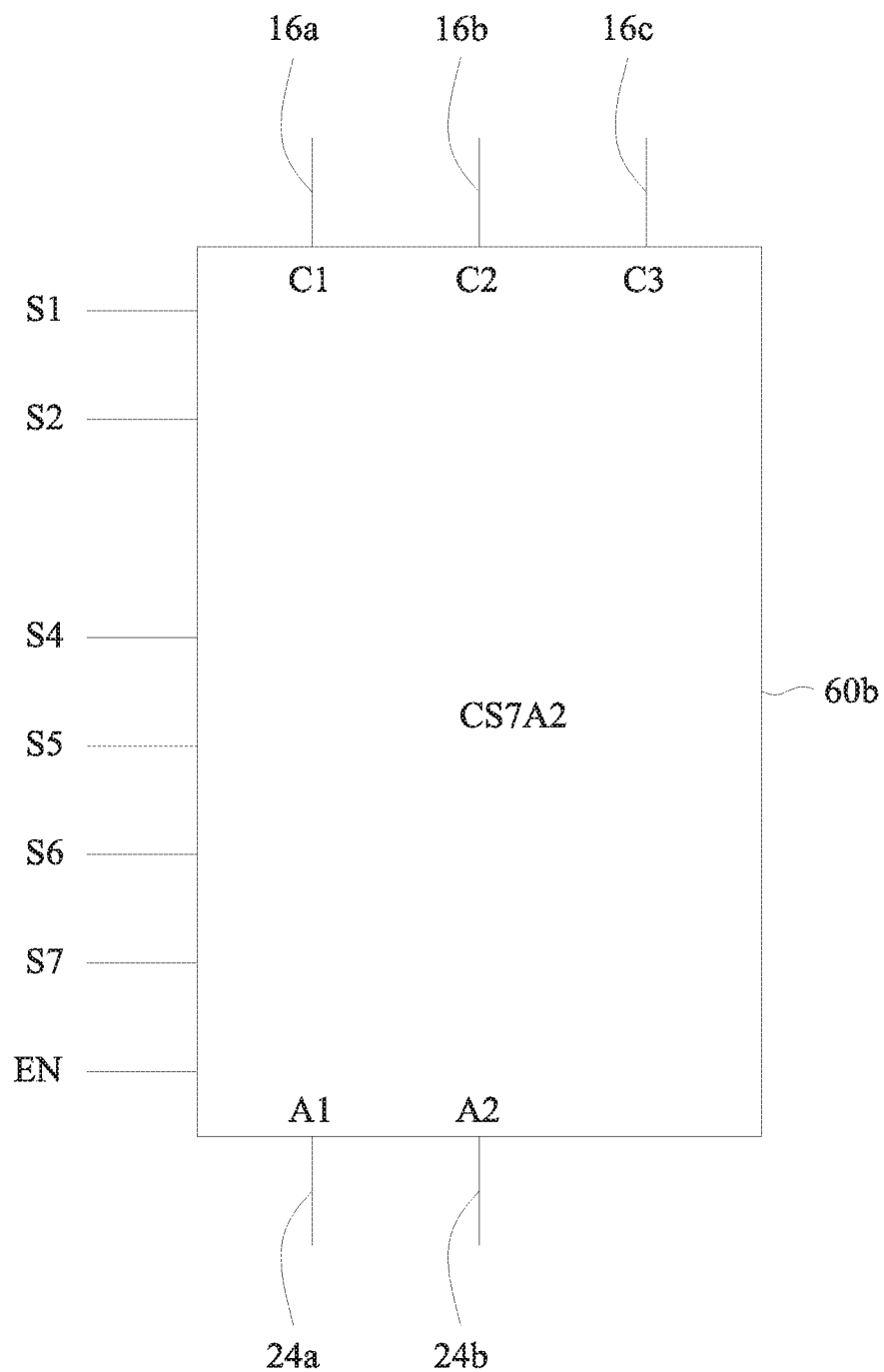
FIG. 13A illustrates a second column routing circuit of the CIS of FIG. 11A, in accordance with some embodiments.

FIG. 13A illustrates one embodiment of a second column routing circuit 60b. The second column routing circuit 60b receives a sub-set of the plurality of control signals S[1:7], an enable signal EN, and a plurality of column-out signals 16a-16c. In the illustrated embodiment, the second column routing circuit 60b receives only the first S[1], fourth S[4], and fifth S[5] control signals. The second column routing circuit 60b is configured to route the column-out signal paths 16a-16c to an output 24a. The output 24a is coupled to a column ADC 18b associated with the column 6b of the second column routing circuit 60b. The second column routing circuit 60b routes each of the column-out signal paths 16a-16c to a column ADC 18b coupled to the output 24a during an all-pixel read operation. In some embodiments, an enable signal EN is configured to control activation of the second column routing circuit 60b.

Figure 13B:
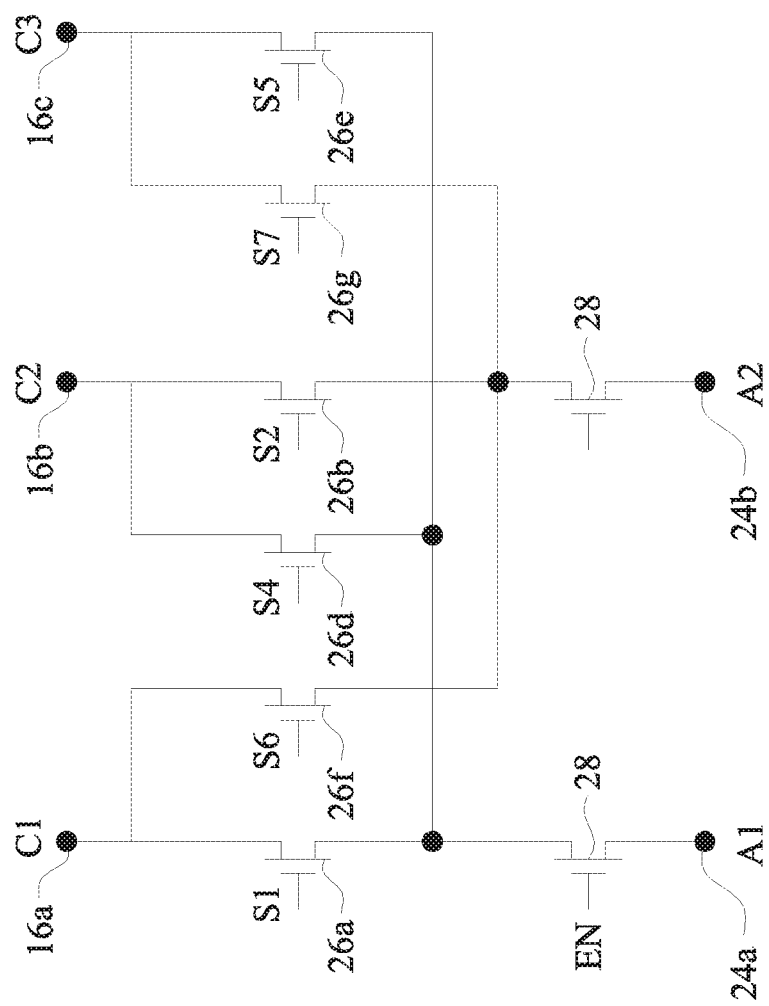
FIG. 13B illustrates a schematic of the second column routing circuit of FIG. 13A, in accordance with some embodiments.

FIG. 13B illustrates a circuit schematic of one embodiment of the second column routing circuit 60b. The second column routing circuit 20b is similar to the first column routing circuit 20a but omits the second, third, sixth, and seventh routing transistors 26b, 26c, 26f-26g. In some embodiments, during an all-pixel read operation, the first control signal S[1], fourth control signal S[4], and fifth control signal S[5] are simultaneously set high to connect each of the column-out signal paths 16a-16c to the first output 24a. Each of the pixel elements 50 in the column 52b associated with the second column routing circuit 20b are sequentially activated by the row driver circuit 12 and provided to the column ADC 18b. In other embodiments, the control signals S[1], S[4], and S[5] may be sequentially cycled to couple only a single column-out signal path 16a-16c to the output 24a at any time.

The second column routing circuit 20b is not used during either a (V:½, H:½) down-sampling read operation or a (V:⅓, H:⅓) down-sampling read operation. The second column routing circuit 20b is coupled to columns 52b that are skipped in both down-sampling read operations. In some embodiments, the second column routing circuit 20b is coupled to an enable signal EN. The enable signal EN is high during an all-pixel read operation and low during any down-sampling read operation.

The column routing circuits 60a-60c are combined in a column routing matrix 14c_1 to route the pixel elements 50 of the array 4c as discussed above. Although specific embodiments of column routing circuits 60a-60c and column routing matrix 14c_1 are presented herein, it will be appreciated that any set of column routing circuits and/or column routing matrix configured to properly route the column-out signals 16a-16c of each column 52a-52f during each of an all-pixel read operation, a (V:½, H:½) down-sampling read operation, or a (V:⅓, H:⅓) down-sampling read operation can be used and are within the scope of this disclosure.

Figure 14A:
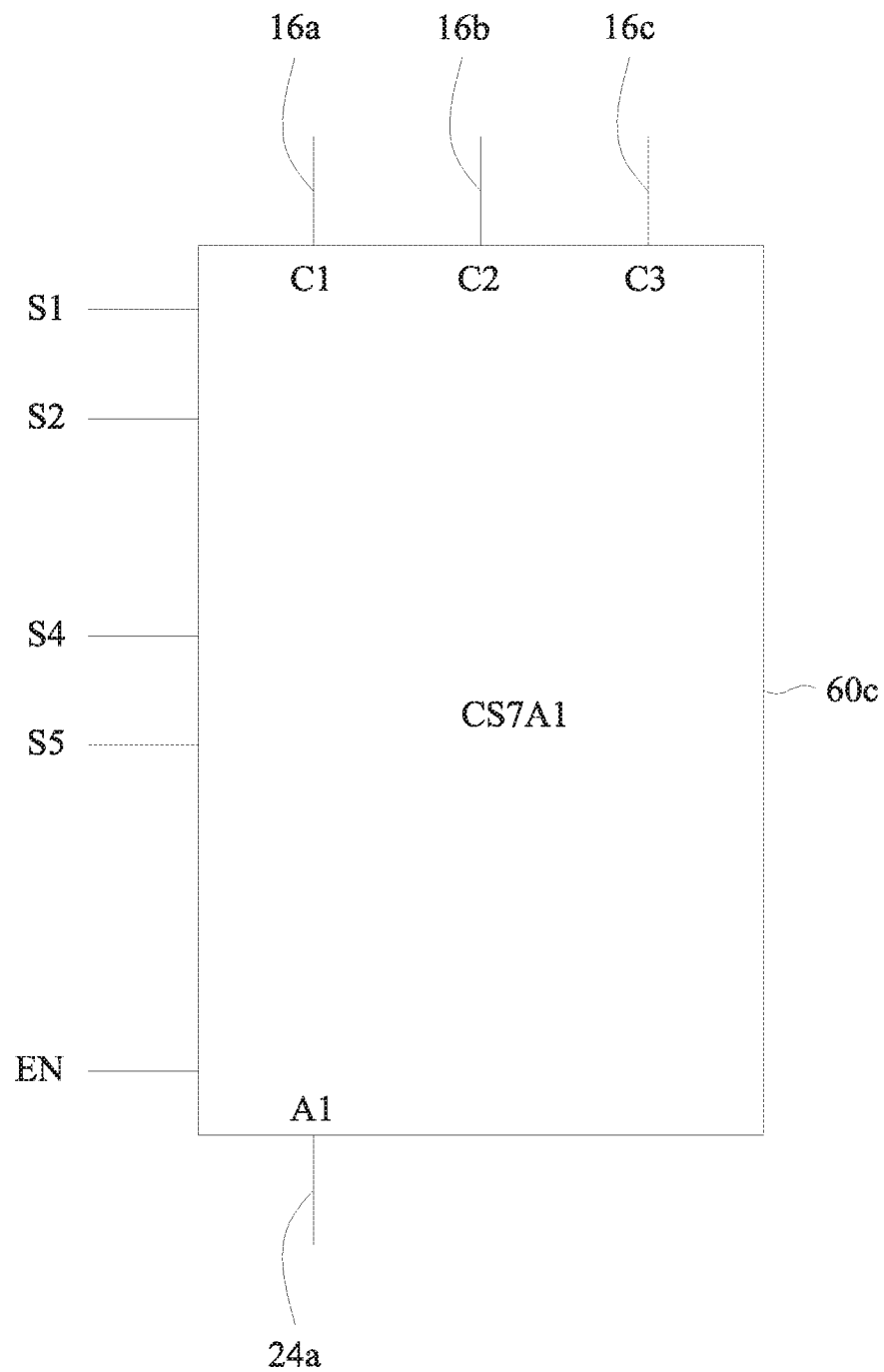
FIG. 14A illustrates a third column routing circuit of the CIS of FIG. 11A, in accordance with some embodiments.

FIG. 14A illustrates one embodiment of a third column routing circuit 60c. The third column routing circuit 60c receives a sub-set of the plurality of control signals S[1:7], an enable signal EN, and a plurality of column-out signals 16a-16c. In the illustrated embodiment, the third column routing circuit 60c does not receive the third control signal S[3]. The third column routing circuit 60c is configured to route one or more of the column-out signal paths 16a-16c to one or more output lines 24a-24b. The output lines 24a-24b are each coupled to a different column ADC 18a-18f. For example, in some embodiments, the first output 24a is coupled to a column ADC 18c associated with the corresponding column 52c of the third column routing circuit 60c and the second output 24b is coupled to an adjacent column ADC 18d. Although specific routing arrangements are discussed herein, it will be appreciated that the outputs 24a-24b of the third column routing circuit 60c can be coupled to any of the column ADCs 18a-18l in the CIS 2c. The third column routing circuit 60c routes each of the column-out signal 16a-16c inputs to one or more of the outputs 24a-24b based on the read operation being performed by the CIS 2c. In some embodiments, an enable signal EN is configured to control activation of the third column routing circuit 60c.

Figure 14B:
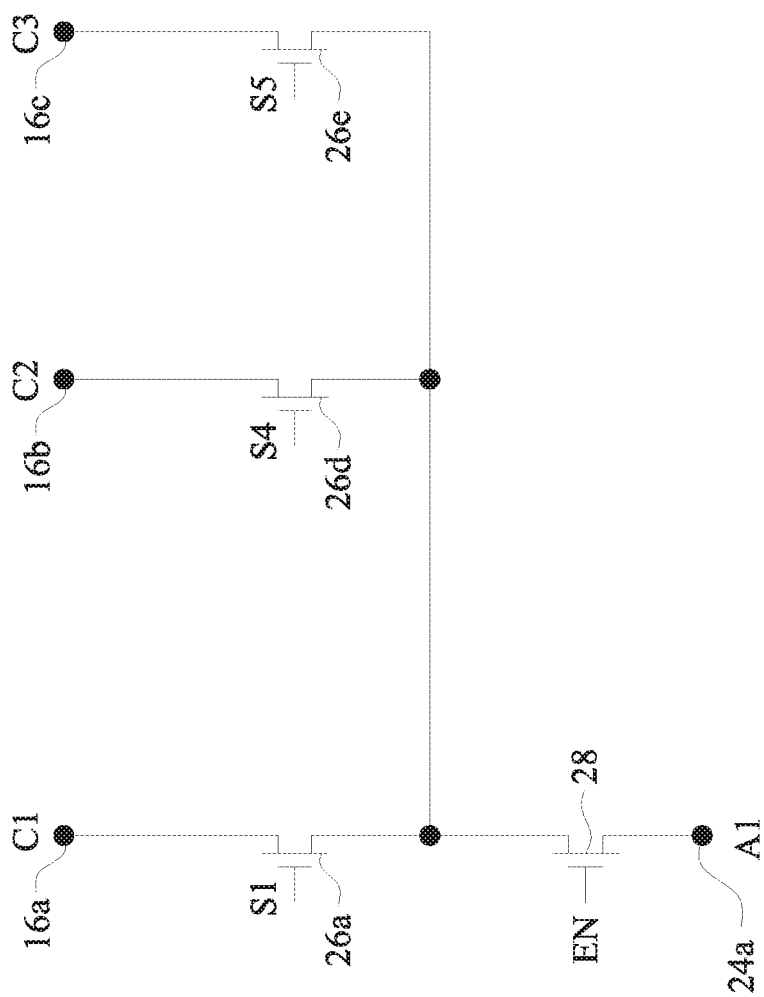
FIG. 14B illustrates a schematic of the third column routing circuit of FIG. 14A, in accordance with some embodiments.

FIG. 14B illustrates a circuit schematic of one embodiment of the third column routing circuit 60c. The third column routing circuit 60c is similar to the first column routing circuit 60a but omits the third routing transistor 26c. In some embodiments, during an all-pixel read operation, each of the column-out signal paths 16a-16b are coupled to the first output 24a of the third column routing circuit 60c to sequentially output all of the pixel elements 50 in a column 52c to an associated column ADC 18c. In some embodiments, the first control signal S[1], fourth control signal S[4], and fifth control signal S[5] are simultaneously set high to connect each of the column-out signal paths 16a-16c to the first output 24a. Each of the pixel elements 50 in the column 52a associated with the third column routing circuit 60c are sequentially activated by the row driver circuit 12 and provided to the third column ADC 18c, which is coupled to the first output 24a. In other embodiments, the control signals S[1], S[4], and S[5] may be sequentially cycled to couple only a single column-out signal path 16a-16c to the output 24a at any time. In other embodiments, the second control signal S[2], the sixth control signal S[6] and the seventh control signal S[7] can be high to route all of the column-out signal paths 16a-16c to a second output 24b during an all-pixel read operation.

In some embodiments, during a (V:½, H:½) down-sampling read operation, the first control signal S[1] and the second control signal S[2] are set high, coupling the first column-out signal path 16a to the first output 24a and the second signal path to the second output 24b. The third through seventh control signals S[3:7] are set low, and the third column-out signal path 16c is not routed during a (V:½, H:½) down-sampling read operation. A first pixel element 50a coupled to the first column-out signal path 16a in the associated column 52c is activated by the row driver circuit 12. Simultaneously, a second pixel element 50b coupled to the second column-out signal path 16b in the associated column 52c is activated by the row driver circuit 12. The first column-out signal path 16a is routed to a column ADC 18a coupled to the first output 24a and the second column-out signal path 16b is routed to an adjacent ADC 18b coupled to the second output 24b. The row driver circuit 12 sequentially activates two rows simultaneously from the column 52c during a (V:½, H:½) down-sampling read operation. In other embodiments, the third column routing circuit 60c is not used during a (V:½, H:½) down-sampling read operation and the enable signal EN is set low.

Figure 15A:
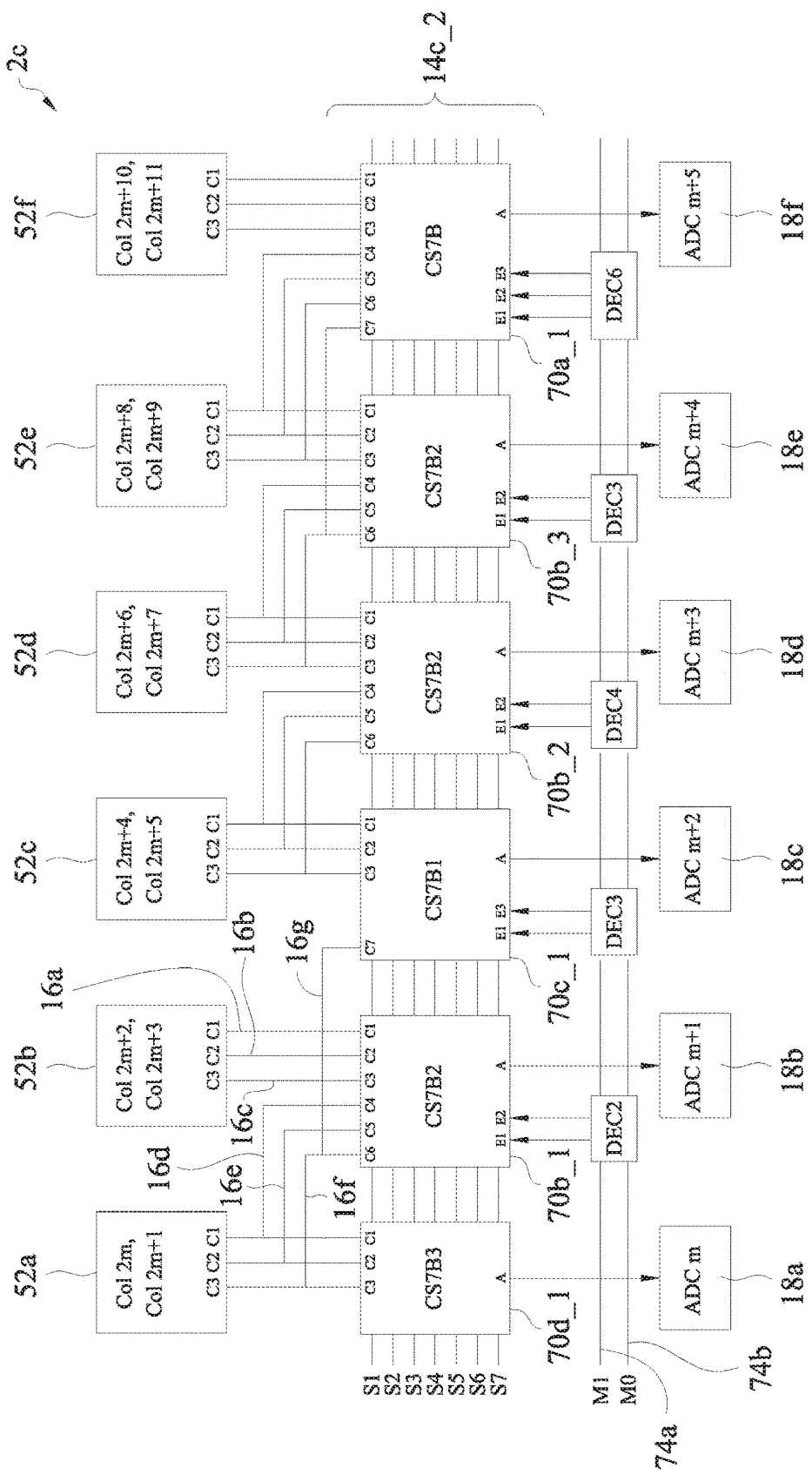
FIG. 15A illustrates a second column routing matrix of the CIS illustrated in FIG. 10, in accordance with some embodiments.

FIG. 15A illustrates a second column routing matrix 14c_2 of the CIS 2c of FIG. 10, in accordance with some embodiments. The column routing matrix 14c_2 includes a plurality of column routing circuits 70a-70d. Each of the plurality of routing circuits 70a-70d is coupled to a set of column-out signal paths 16a-16c for each of the respective columns 52a-52f of the CIS 2c. One or more of the plurality of routing circuits 70a-70c are further coupled to at least one of a column-out signal path 16d-16f for an adjacent and/or non-adjacent column. The routing circuits 70a-70d receive a plurality of digital control signals S[1:7]. The plurality of control signals S[1:7] control the configuration of the routing circuits 70a-70d to route one or more of the column-out signal paths 16a-16c to an associated column ADC 18a-18f based on the read operation being performed, such as, for example, an all-pixel read operation, a (V:½, H:½) down-sampling read operation, a (V:⅓, H:⅓) down-sampling read operation, and/or any other suitable read operations, as discussed in more detail below. In some embodiments, each of the routing circuits 70a-70d can be individually, or collectively as part of a set, enabled and/or disabled, for example, by one or more enable signals E1-E3. The enable signals can be generated by a plurality of decoders 72 coupled to a first master enable signal 74a and a second master enable signal 74b.

The plurality of routing circuits 70a-70d can include one or more types of column routing circuits, such as a first column routing circuit 70a_1, a second column routing circuit 70b_1, a third column routing circuit 70c_1-70c_3, and/or a fourth column routing circuit 70d_1. Each of the types of column routing circuits 70a-70d are configured to receive one or more of the control signals S[1:7] and/or to generate a different routing based on the received control signals S[1:7]. Each of the routing circuits 70a-70d are coupled to a corresponding column ADC 18a-18f.

Figure 15B:
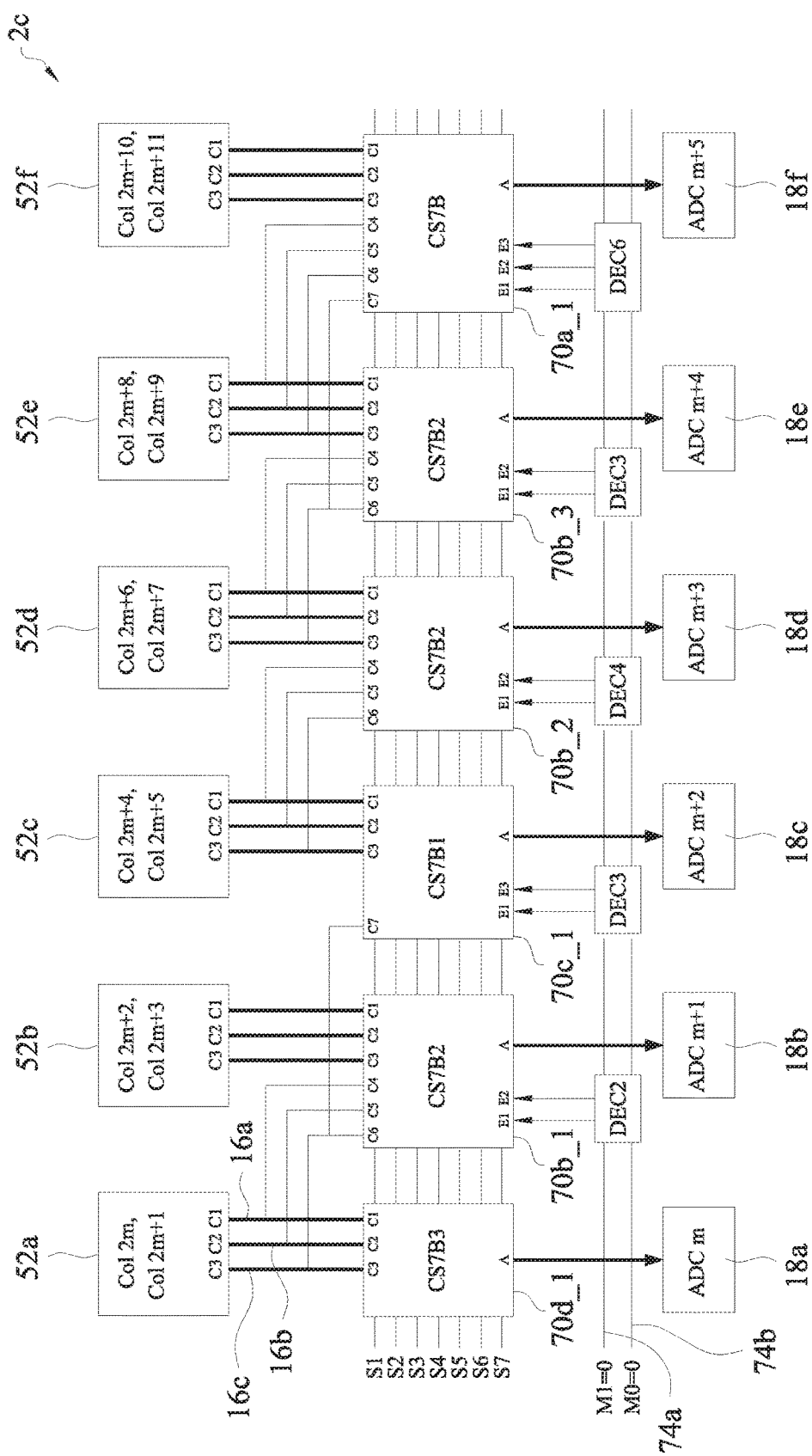
FIG. 15B illustrates the second column routing matrix of FIG. 15A configured for an all-pixel read operation, in accordance with some embodiments.

FIG. 15B illustrates the second column routing matrix 14c_2 of FIG. 15A configured for an all-pixel read operation, in accordance with some embodiments. Each of the pixel elements 50 in the first column 52a are sequentially activated by the row driver circuit 12. The column routing circuits 70a-70d are configured to route each 2×4 pixel element 50 of a corresponding column 52a-52f to the associated column ADC 18a-18f. For example, in the illustrated embodiment, the column routing circuit 70d_1 of the first column 52a routes each of the column-out signals 16a-16c of the first column 52a to a the first column ADC 18a. Similarly, the column routing circuit 60b_1 of the second column 52b routes each of the column-out signals 16a-16c of the second column 52b to the second column ADC 18b. Each of the remaining column routing circuits 60a-60c similarly route the column-out signals 16a-16c of their respective columns 52c-52f to the respective column ADC 18c-18f. The column-out signals 14d-14f received from an adjacent and/or non-adjacent column are not routed during an all-pixel read operation. In some embodiments, the time for execution of an all-pixel read operation is determined by the number of rows in each column and is denoted herein as X. Table 14 below illustrates one embodiment of a control table for an all-pixel read operation of the column routing matrix 14c_2.

TABLE 14

| Row # | C1 | C2 | C3 | S[7:1] | ADC # |
|---|---|---|---|---|---|
| 72n | ● | | | 0, 0, 0, 0, 0, 0, 1 | m |
| 72n + 1 | | | | 0, 0, 0, 0, 0, 0, 1 | m |
| 72n + 2 | | | | 0, 0, 0, 0, 0, 0, 1 | m |
| 72n + 3 | | | | 0, 0, 0, 0, 0, 0, 1 | m |
| 72n + 4 | | ● | | 0, 0, 0, 0, 0, 1, 0 | m |
| 72n + 5 | | | | 0, 0, 0, 0, 0, 1, 0 | m |
| 72n + 6 | | | | 0, 0, 0, 0, 0, 1, 0 | m |
| 72n + 7 | | | | 0, 0, 0, 0, 0, 1, 0 | m |
| 72n + 8 | ● | | | 0, 0, 0, 0, 0, 0, 1 | m |
| 72n + 9 | | | | 0, 0, 0, 0, 0, 0, 1 | m |
| 72n + 10 | | | | 0, 0, 0, 0, 0, 0, 1 | m |
| 72n + 11 | | | | 0, 0, 0, 0, 0, 0, 1 | m |
| 72n + 12 | | | ● | 0, 0, 0, 0, 1, 0, 0 | m |
| 72n + 13 | | | | 0, 0, 0, 0, 1, 0, 0 | m |
| 72n + 14 | | | | 0, 0, 0, 0, 1, 0, 0 | m |
| 72n + 15 | | | | 0, 0, 0, 0, 1, 0, 0 | m |
| 72n + 16 | ● | | | 0, 0, 0, 0, 0, 0, 1 | m |
| 72n + 17 | | | | 0, 0, 0, 0, 0, 0, 1 | m |
| 72n + 18 | | | | 0, 0, 0, 0, 0, 0, 1 | m |
| 72n + 19 | | | | 0, 0, 0, 0, 0, 0, 1 | m |
| 72n + 20 | | | ● | 0, 0, 0, 0, 1, 0, 0 | m |
| 72n + 21 | | | | 0, 0, 0, 0, 1, 0, 0 | m |
| 72n + 22 | | | | 0, 0, 0, 0, 1, 0, 0 | m |
| 72n + 23 | | | | 0, 0, 0, 0, 1, 0, 0 | m |
| 72n + 24 | | ● | | 0, 0, 0, 0, 0, 1, 0 | m |
| 72n + 25 | | | | 0, 0, 0, 0, 0, 1, 0 | m |
| 72n + 26 | | | | 0, 0, 0, 0, 0, 1, 0 | m |
| 72n + 27 | | | | 0, 0, 0, 0, 0, 1, 0 | m |
| 72n + 28 | | | ● | 0, 0, 0, 0, 1, 0, 0 | m |
| 72n + 29 | | | | 0, 0, 0, 0, 1, 0, 0 | m |
| 72n + 30 | | | | 0, 0, 0, 0, 1, 0, 0 | m |
| 72n + 31 | | | | 0, 0, 0, 0, 1, 0, 0 | m |
| 72n + 32 | | ● | | 0, 0, 0, 0, 0, 1, 0 | m |
| 72n + 33 | | | | 0, 0, 0, 0, 0, 1, 0 | m |
| 72n + 34 | | | | 0, 0, 0, 0, 0, 1, 0 | m |
| 72n + 35 | | | | 0, 0, 0, 0, 0, 1, 0 | m |
| 72n + 36 | ● | | | 0, 0, 0, 0, 0, 0, 1 | m |
| 72n + 37 | | | | 0, 0, 0, 0, 0, 0, 1 | m |
| 72n + 38 | | | | 0, 0, 0, 0, 0, 0, 1 | m |
| 72n + 39 | | | | 0, 0, 0, 0, 0, 0, 1 | m |
| 72n + 40 | | ● | | 0, 0, 0, 0, 0, 1, 0 | m |
| 72n + 41 | | | | 0, 0, 0, 0, 0, 1, 0 | m |
| 72n + 42 | | | | 0, 0, 0, 0, 0, 1, 0 | m |
| 72n + 43 | | | | 0, 0, 0, 0, 0, 1, 0 | m |
| 72n + 44 | ● | | | 0, 0, 0, 0, 0, 0, 1 | m |
| 72n + 45 | | | | 0, 0, 0, 0, 0, 0, 1 | m |
| 72n + 46 | | | | 0, 0, 0, 0, 0, 0, 1 | m |
| 72n + 47 | | | | 0, 0, 0, 0, 0, 0, 1 | m |
| 72n + 48 | | | ● | 0, 0, 0, 0, 1, 0, 0 | m |
| 72n + 49 | | | | 0, 0, 0, 0, 1, 0, 0 | m |
| 72n + 50 | | | | 0, 0, 0, 0, 1, 0, 0 | m |
| 72n + 51 | | | | 0, 0, 0, 0, 1, 0, 0 | m |
| 72n + 52 | ● | | | 0, 0, 0, 0, 0, 0, 1 | m |
| 72n + 53 | | | | 0, 0, 0, 0, 0, 0, 1 | m |
| 72n + 54 | | | | 0, 0, 0, 0, 0, 0, 1 | m |
| 72n + 55 | | | | 0, 0, 0, 0, 0, 0, 1 | m |
| 72n + 56 | | | ● | 0, 0, 0, 0, 1, 0, 0 | m |
| 72n + 57 | | | | 0, 0, 0, 0, 1, 0, 0 | m |
| 72n + 58 | | | | 0, 0, 0, 0, 1, 0, 0 | m |
| 72n + 59 | | | | 0, 0, 0, 0, 1, 0, 0 | m |
| 72n + 60 | | ● | | 0, 0, 0, 0, 0, 1, 0 | m |
| 72n + 61 | | | | 0, 0, 0, 0, 0, 1, 0 | m |
| 72n + 62 | | | | 0, 0, 0, 0, 0, 1, 0 | m |
| 72n + 63 | | | | 0, 0, 0, 0, 0, 1, 0 | m |
| 72n + 64 | | | ● | 0, 0, 0, 0, 1, 0, 0 | m |
| 72n + 65 | | | | 0, 0, 0, 0, 1, 0, 0 | m |
| 72n + 66 | | | | 0, 0, 0, 0, 1, 0, 0 | m |
| 72n + 67 | | | | 0, 0, 0, 0, 1, 0, 0 | m |
| 72n + 68 | | ● | | 0, 0, 0, 0, 0, 1, 0 | m |
| 72n + 69 | | | | 0, 0, 0, 0, 0, 1, 0 | m |
| 72n + 70 | | | | 0, 0, 0, 0, 0, 1, 0 | m |
| 72n + 71 | | | | 0, 0, 0, 0, 0, 1, 0 | m |

Figure 15C:
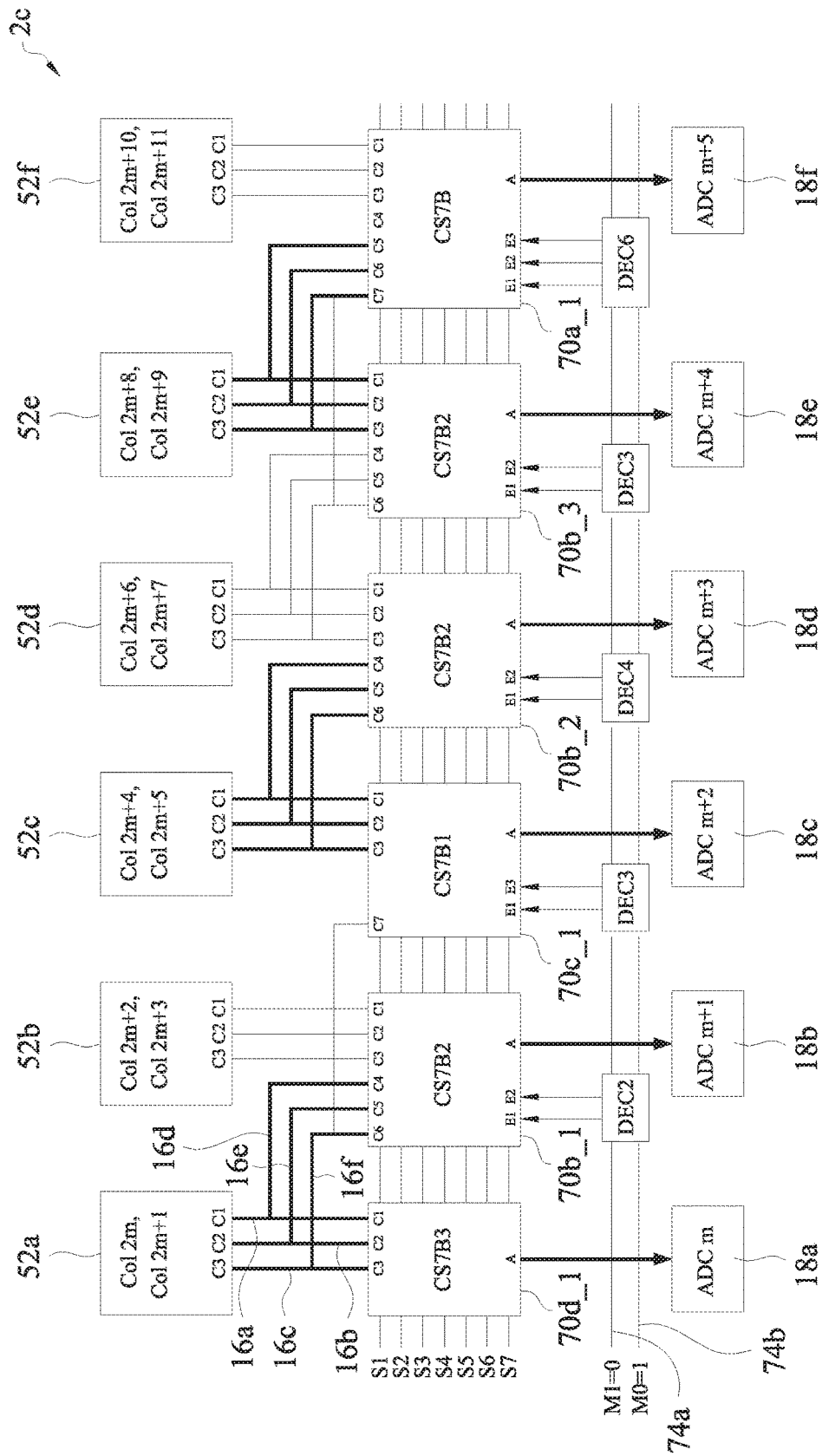
FIG. 15C illustrates the second column routing matrix of FIG. 15A configured for a (V:½, H:½) down-sampling read operation, in accordance with some embodiments.

FIG. 15C illustrates the second column routing matrix 14c_2 of FIG. 15A configured for a (V:½, H:½) down-sampling read operation, in accordance with some embodiments. The column routing circuits 70a-70d for half of the columns are configured to route one of the column-out signal paths 16a-16c of the associated column to the column ADC and the second half of the column routing circuits 70a-70d are configured to route one of the column-out signal paths 16d-16f received from an adjacent column to the associated column ADC. For example, in some embodiments, the first column-out signal 16a of a first column 52a is routed to the corresponding column ADC 18a by the first column routing circuit 70d_1. The column-out signals 16a-16c of the first column 52a are received by the second column routing circuit 70c_1 as adjacent column-out signals 16d-16f and routed to the associated column ADC 18b. For example, in the illustrated embodiment, the column routing circuit 70c_1 of the second column 52b receives a second adjacent column-out signal 16e and routes the second adjacent column-out signal 16e to an output 24. The third column-out signal 16c is connected to unread rows and is not routed by the column routing circuit 70d_1 and/or the adjacent column routing circuit 70c_1 during a (V:½, H:½) down-sampling read operation. Although specific routing embodiments are discussed herein, it will be appreciated that the column routing matrix 14c_2 can route the column-out signals 16a-16b of any column 52a-52f to any of the column ADCs 18a-18f.

By routing one of the column-out signals 16a, 16b to an adjacent column ADC 18b, 18d, 18f, the CIS 2c utilizes all of the column ADCs 18a-18f during a (V:½, H:½) down-sampling read operation. The column routing matrix 14c_2 allows two rows of 2×4 pixel elements 50 to be read from the same column simultaneously during the (V:½, H:½) down-sampling read operation. By reading two rows simultaneously, the (V:½, H:½) down-sampling read operation can be performed in a fourth of the time required for an all-pixel read operation, e.g., the read time for a (V:½, H:½) down-sampling read operation is X/4. In some embodiments, the column routing circuits 70a-70d are coupled to a plurality of enable signals E1-E3 that control activation of the column routing circuits 70a-70d during a read operation, such as a (V:½, H:½) down-sampling read operation. Table 15 below illustrates one embodiment of a control table for a (V:½, H:½) read operation of the column routing matrix 14c_2.

TABLE 15

| Row # | C1 | C2 | C3 | S[7:1] | ADC # |
|---|---|---|---|---|---|
| 72n | ● | | | 0, 0, 1, 0, 0, 0, 1 | 2m |
| 72n + 1 | | | | 0, 0, 1, 0, 0, 0, 1 | 2m |
| 72n + 2 | | | | | |
| 72n + 3 | | | | | |
| 72n + 4 | | ● | | 0, 0, 1, 0, 0, 0, 1 | 2m + 1 |
| 72n + 5 | | | | 0, 0, 1, 0, 0, 0, 1 | 2m + 1 |
| 72n + 6 | | | | | |
| 72n + 7 | | | | | |
| 72n + 8 | ● | | | 0, 1, 0, 0, 0, 0, 1 | 2m |
| 72n + 9 | | | | 0, 1, 0, 0, 0, 0, 1 | 2m |
| 72n + 10 | | | | | |
| 72n + 11 | | | | | |
| 72n + 12 | | | ● | 0, 1, 0, 0, 0, 0, 1 | 2m + 1 |
| 72n + 13 | | | | 0, 1, 0, 0, 0, 0, 1 | 2m + 1 |
| 72n + 14 | | | | | |
| 72n + 15 | | | | | |
| 72n + 16 | ● | | | 0, 1, 0, 0, 0, 0, 1 | 2m |
| 72n + 17 | | | | 0, 1, 0, 0, 0, 0, 1 | 2m |
| 72n + 18 | | | | | |
| 72n + 19 | | | | | |
| 72n + 20 | | | ● | 0, 1, 0, 0, 0, 0, 1 | 2m + 1 |
| 72n + 21 | | | | 0, 1, 0, 0, 0, 0, 1 | 2m + 1 |
| 72n + 22 | | | | | |
| 72n + 23 | | | | | |
| 72n + 24 | | ● | | 0, 1, 0, 0, 0, 1, 0 | 2m |
| 72n + 25 | | | | 0, 1, 0, 0, 0, 1, 0 | 2m |
| 72n + 26 | | | | | |
| 72n + 27 | | | | | |
| 72n + 28 | | | ● | 0, 1, 0, 0, 0, 1, 0 | 2m + 1 |
| 72n + 29 | | | | 0, 1, 0, 0, 0, 1, 0 | 2m + 1 |
| 72n + 30 | | | | | |
| 72n + 31 | | | | | |
| 72n + 32 | | ● | | 0, 0, 0, 1, 0, 1, 0 | 2m |
| 72n + 33 | | | | 0, 0, 0, 1, 0, 1, 0 | 2m |
| 72n + 34 | | | | | |
| 72n + 35 | | | | | |
| 72n + 36 | ● | | | 0, 0, 0, 1, 0, 1, 0 | 2m + 1 |
| 72n + 37 | | | | 0, 0, 0, 1, 0, 1, 0 | 2m + 1 |
| 72n + 38 | | | | | |
| 72n + 39 | | | | | |
| 72n + 40 | | ● | | 0, 0, 0, 1, 0, 1, 0 | 2m |
| 72n + 41 | | | | 0, 0, 0, 1, 0, 1, 0 | 2m |
| 72n + 42 | | | | | |
| 72n + 43 | | | | | |
| 72n + 44 | ● | | | 0, 0, 0, 1, 0, 1, 0 | 2m + 1 |
| 72n + 45 | | | | 0, 0, 0, 1, 0, 1, 0 | 2m + 1 |
| 72n + 46 | | | | | |
| 72n + 47 | | | | | |
| 72n + 48 | | | ● | 0, 0, 0, 1, 1, 0, 0 | 2m |
| 72n + 49 | | | | 0, 0, 0, 1, 1, 0, 0 | 2m |
| 72n + 50 | | | | | |
| 72n + 51 | | | | | |
| 72n + 52 | ● | | | 0, 0, 0, 1, 1, 0, 0 | 2m + 1 |
| 72n + 53 | | | | 0, 0, 0, 1, 1, 0, 0 | 2m + 1 |
| 72n + 54 | | | | | |
| 72n + 55 | | | | | |
| 72n + 56 | | | ● | 0, 0, 1, 0, 1, 0, 0 | 2m |
| 72n + 57 | | | | 0, 0, 1, 0, 1, 0, 0 | 2m |
| 72n + 58 | | | | | |
| 72n + 59 | | | | | |
| 72n + 60 | | ● | | 0, 0, 1, 0, 1, 0, 0 | 2m + 1 |
| 72n + 61 | | | | 0, 0, 1, 0, 1, 0, 0 | 2m + 1 |
| 72n + 62 | | | | | |
| 72n + 63 | | | | | |
| 72n + 64 | | | ● | 0, 0, 1, 0, 1, 0, 0 | 2m |
| 72n + 65 | | | | 0, 0, 1, 0, 1, 0, 0 | 2m |
| 72n + 66 | | | | | |
| 72n + 67 | | | | | |
| 72n + 68 | | ● | | 0, 0, 1, 0, 1, 0, 0 | 2m + 1 |
| 72n + 69 | | | | 0, 0, 1, 0, 1, 0, 0 | 2m + 1 |
| 72n + 70 | | | | | |
| 72n + 71 | | | | | |

Figure 15D:
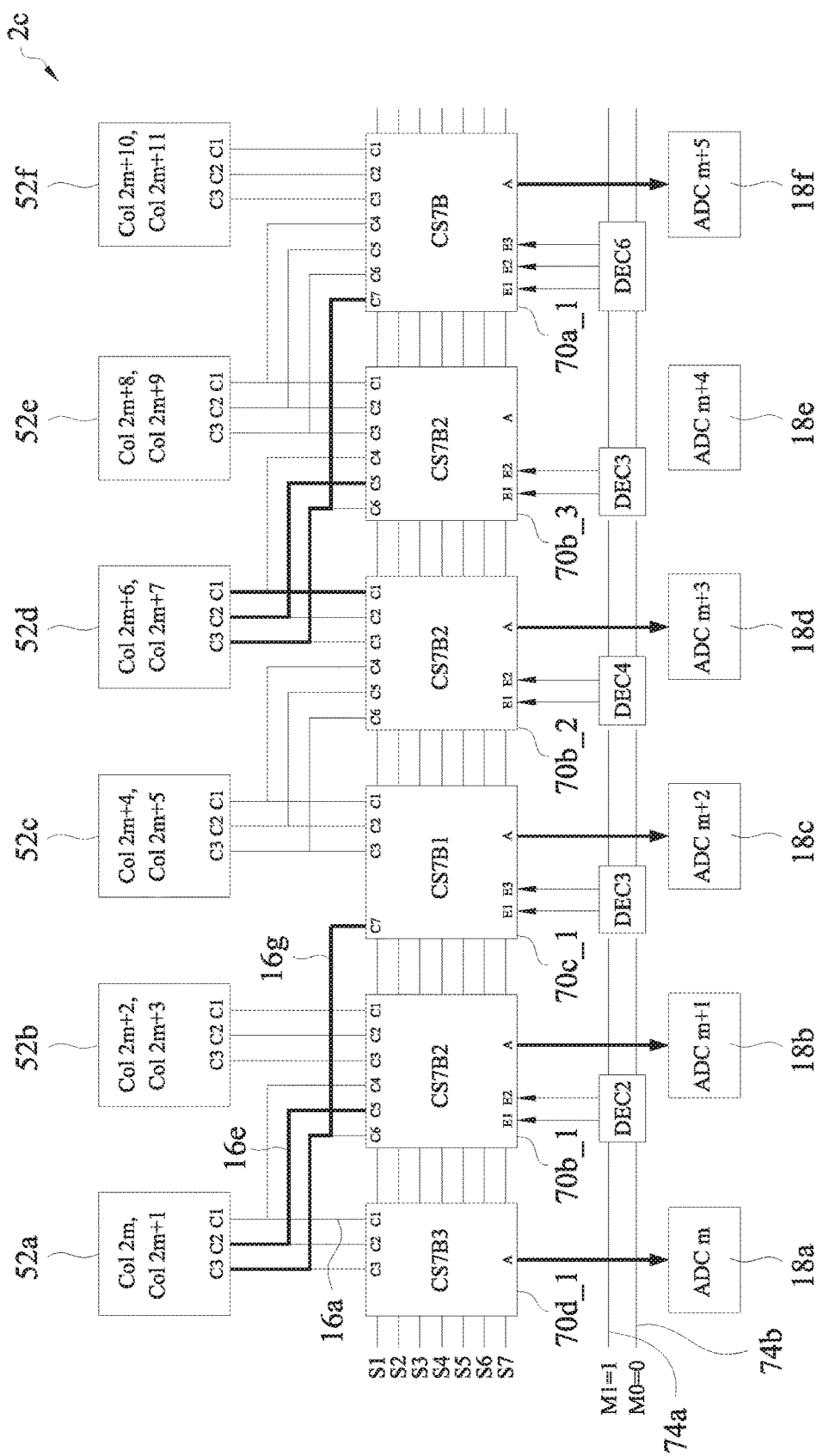
FIG. 15D illustrates the second column routing matrix of FIG. 15A configured for a (V:⅓, H:⅓) down-sampling read operation, in accordance with some embodiments.

FIG. 15D illustrates the second column routing matrix 14c_2 of FIG. 15A configured for a (V:⅓, H:⅓) down-sampling read operation, in accordance with some embodiments. In the illustrated embodiment, during a (V:⅓, H:⅓) down-sampling read operation, every third row of the first column 52a is read and the rows in between are skipped. The column-out signals 16a-16c of the first and fourth columns 52a, 52d are routed to each of an adjacent column 52b, 52e and a non-adjacent column 52c, 52f. The column routing circuit 70a-70d of each of the columns 52a-52f is configured to route one of the received column-out signals 16-16c to an output 24 coupled to a corresponding column ADC 18a-18f. For example, in the illustrated embodiment, the column routing circuit 70d_1 of the first column 52a is configured to route a first column-out signal path 16a to a corresponding first column ADC 18a. The second column-out signal path 16b of the first column 52a is received by the column routing circuit 70c_1 of the second column 52b as a second adjacent column-out signal path 16e. The second adjacent column-out signal path 16e is routed to a second column ADC 18b by the column routing circuit 70c_1. The third column-out signal path 16d of the first column 52a is received by the column routing circuit 70b_1 of the third column 52c as a third adjacent column-out signal path 16f. The third adjacent column-out signal path 16f is routed to a third column ADC 18c by the column routing circuit 70b_1. Although specific routing schemes are discussed herein, it will be appreciated that any suitable routing scheme may be implemented.

By routing two of the column-out signals 16b, 16c to adjacent column ADCs 18b, 18e and/or non-adjacent column ADCs 18c, 18f, the CIS 2c utilizes all of the column ADCs 18a-18f during a (V:⅓, H:⅓) down-sampling read operation. Three rows of 2×4 pixel elements 50 are read from the same column 52a simultaneously during the (V:⅓, H:⅓) down-sampling read operation. The CIS 2c performs the (V:⅓, H:⅓) down-sampling read operation in a ninth of the time required for an all-pixel read operation, e.g., the read time for a (V:⅓, H:⅓) down-sampling read operation is X/9. In the illustrated embodiment, the column routing circuits 70a-70d are coupled to a plurality of enable signals E1-E3. The enable signals E1-E3 can be configured to activate only those column routing circuits 70a-70d used during the (V:⅓, H:⅓) down-sampling read operation. Table 16 below illustrates one embodiment of a control table for a (V:⅓, H:⅓) read operation of the column routing matrix 14c_2.

TABLE 16

| Row # | C1 | C2 | C3 | S[7:1] | ADC # |
|---|---|---|---|---|---|
| 72n | ● | | | 1, 0, 1, 0, 0, 0, 1 | 3m |
| 72n + 1 | | | | 1, 0, 1, 0, 0, 0, 1 | 3m |
| 72n + 2 | | | | | |
| 72n + 3 | | | | | |
| 72n + 4 | | ● | | | |
| 72n + 5 | | | | | |
| 72n + 6 | | | | 1, 0, 1, 0, 0, 0, 1 | 3m + 1 |
| 72n + 7 | | | | 1, 0, 1, 0, 0, 0, 1 | 3m + 1 |
| 72n + 8 | ● | | | | |
| 72n + 9 | | | | | |
| 72n + 10 | | | | | |
| 72n + 11 | | | | | |
| 72n + 12 | | | ● | 1, 0, 1, 0, 0, 0, 1 | 3m + 2 |
| 72n + 13 | | | | 1, 0, 1, 0, 0, 0, 1 | 3m + 2 |
| 72n + 14 | | | | | |
| 72n + 15 | | | | | |
| 72n + 16 | ● | | | | |
| 72n + 17 | | | | | |
| 72n + 18 | | | | 1, 0, 1, 0, 0, 0, 1 | 3m |
| 72n + 19 | | | | 1, 0, 1, 0, 0, 0, 1 | 3m |
| 72n + 20 | | ● | | | |
| 72n + 21 | | | | | |
| 72n + 22 | | | | | |
| 72n + 23 | | | | | |

TABLE 16-continued

| Row # | C1 | C2 | C3 | S[7:1] | ADC # |
|---|---|---|---|---|---|
| 72n + 24 | | ● | | 1, 0, 1, 0, 0, 0, 1 | 3m + 1 |
| 72n + 25 | | | | 1, 0, 1, 0, 0, 0, 1 | 3m + 1 |
| 72n + 26 | | | | | |
| 72n + 27 | | | | | |
| 72n + 28 | | | ● | | |
| 72n + 29 | | | | | |
| 72n + 30 | | | | 1, 0, 1, 0, 0, 0, 1 | 3m + 2 |
| 72n + 31 | | | | 1, 0, 1, 0, 0, 0, 1 | 3m + 2 |
| 72n + 32 | | ● | | | |
| 72n + 33 | | | | | |
| 72n + 34 | | | | | |
| 72n + 35 | | | | | |
| 72n + 36 | ● | | | 1, 0, 1, 0, 0, 0, 1 | 3m |
| 72n + 37 | | | | 1, 0, 1, 0, 0, 0, 1 | 3m |
| 72n + 38 | | | | | |
| 72n + 39 | | | | | |
| 72n + 40 | | ● | | | |
| 72n + 41 | | | | | |
| 72n + 42 | | | | 1, 0, 1, 0, 0, 0, 1 | 3m + 1 |
| 72n + 43 | | | | 1, 0, 1, 0, 0, 0, 1 | 3m + 1 |
| 72n + 44 | ● | | | | |
| 72n + 45 | | | | | |
| 72n + 46 | | | | | |
| 72n + 47 | | | | | |
| 72n + 48 | | | ● | 1, 0, 1, 0, 0, 0, 1 | 3m + 2 |
| 72n + 49 | | | | 1, 0, 1, 0, 0, 0, 1 | 3m + 2 |
| 72n + 50 | | | | | |
| 72n + 51 | | | | | |
| 72n + 52 | ● | | | | |
| 72n + 53 | | | | | |
| 72n + 54 | | | | 1, 0, 1, 0, 0, 0, 1 | 3m |
| 72n + 55 | | | | 1, 0, 1, 0, 0, 0, 1 | 3m |
| 72n + 56 | | ● | | | |
| 72n + 57 | | | | | |
| 72n + 58 | | | | | |
| 72n + 59 | | | | | |
| 72n + 60 | | ● | | 1, 0, 1, 0, 0, 0, 1 | 3m + 1 |
| 72n + 61 | | | | 1, 0, 1, 0, 0, 0, 1 | 3m + 1 |
| 72n + 62 | | | | | |
| 72n + 63 | | | | | |
| 72n + 64 | | ● | | | |
| 72n + 65 | | | | | |
| 72n + 66 | | | | 1, 0, 1, 0, 0, 0, 1 | 3m + 2 |
| 72n + 67 | | | | 1, 0, 1, 0, 0, 0, 1 | 3m + 2 |
| 72n + 68 | | ● | | | |
| 72n + 69 | | | | | |
| 72n + 70 | | | | | |
| 72n + 71 | | | | | |

Figure 16A:
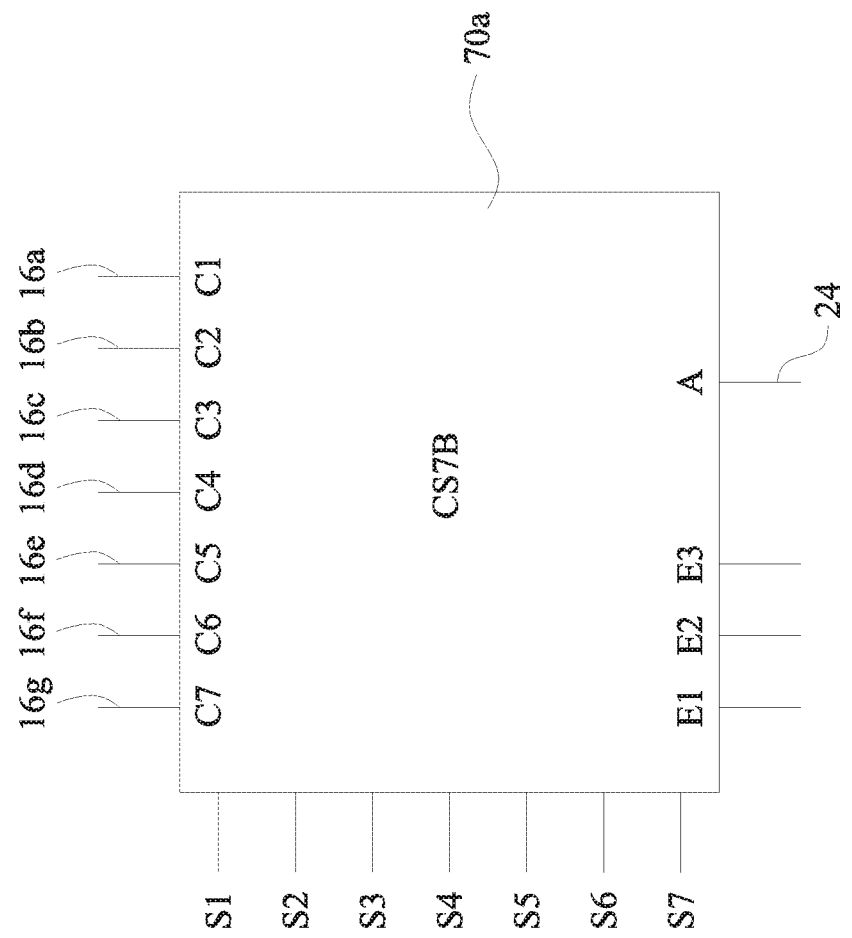
FIG. 16A illustrates a first column routing circuit of the CIS of FIG. 15A, in accordance with some embodiments.

FIGS. 16A-19B illustrate column routing circuits 70a-70d, in accordance with some embodiments. One embodiment of the first column routing circuit 70a is illustrated in FIG. 16A. The first column routing circuit 70a is configured to receive a plurality of control signals S[1:7], a plurality of enable signals E1-E3, a plurality of associated column-out signals 16a-16c, a plurality of adjacent column-out signal 16d-16f, and a non-adjacent column-out signal 16g. The first column routing circuit 70a is configured to route at least one of the column-out signal paths 16a-16g to an output 24. The output 24 is coupled to a column ADC associated with the same column as the first column routing circuit 70a. The first column routing circuit 70a routes one or more of the column-out signals 16a-16g to the output 24 based on the read operation being performed by the CIS 2c. In some embodiments, the enable signals E1-E3 are configured to control activation of the first column routing circuit 70a.

Figure 16B:
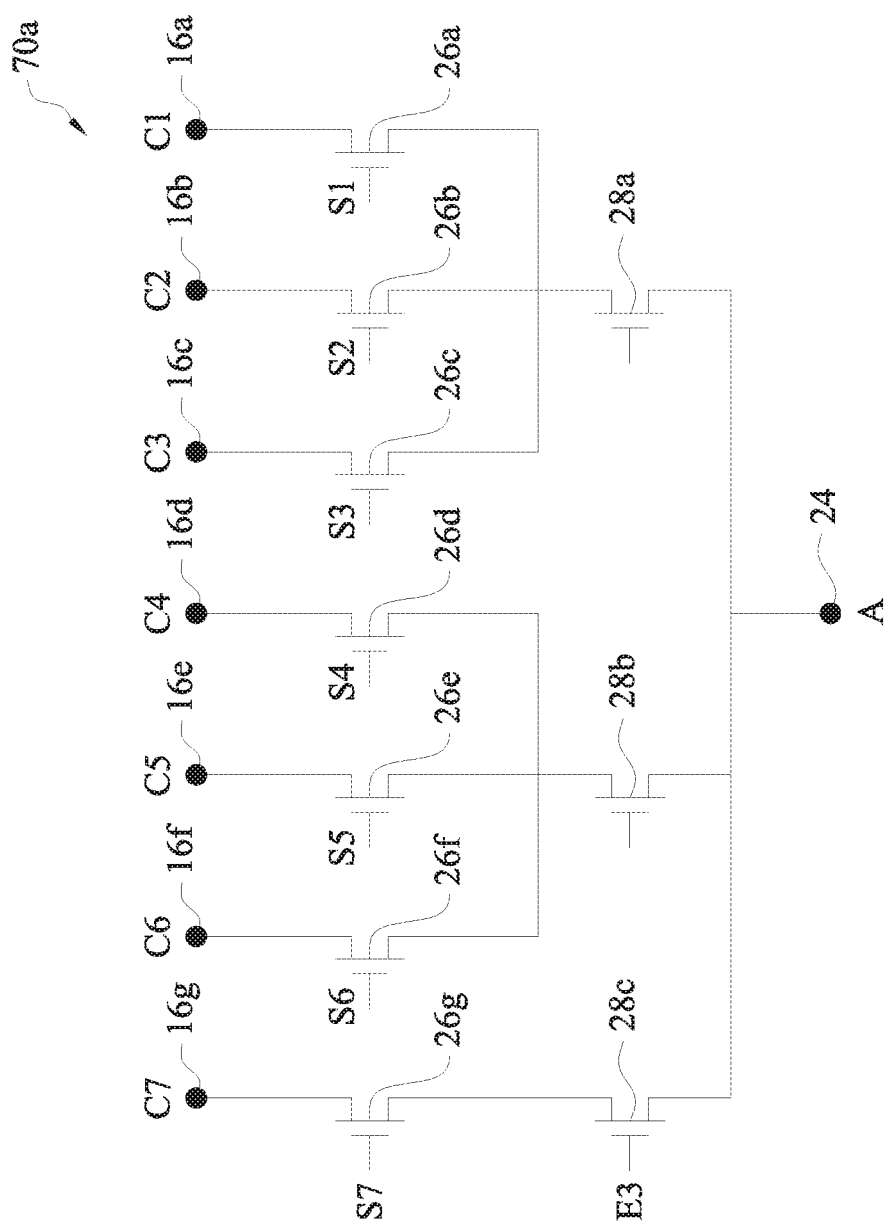
FIG. 16B illustrates a schematic of the first column routing circuit of FIG. 16A, in accordance with some embodiments.

FIG. 16B illustrates a circuit schematic of one embodiment of the first column routing circuit 70a. In some embodiments, the first column routing circuit 60a includes a plurality of routing transistors 26a-26g coupled to the plurality of column-out signal paths 16a-16g and the output 24. Each of the plurality of routing transistors 26a-26g includes a gate coupled to a corresponding control signal S[1:7]. For example, a first routing transistor 26a can be coupled to the first column-out signal 16a at a drain and a first enable transistor 28a at a source. When the first control signal S1 is high, the first routing transistor 26a routes a signal on the first column-out signal path 16a to the output 24 through the first enable transistor 28a. Similarly, a second routing transistor 26b can be coupled to the second column-out signal path 16b at a drain and the first enable transistor 28a at a source, and a third routing transistor 26c can be coupled to the third column-out signal path 16c at a drain and the first enable transistor 28a at a source. When the second or the third control signals S[2:3] are high (and the first enable signal E1 is high), the respective column routing transistor 26b, 26c are turned on to route signals on the respective column-out signal path 16b, 16c to the output 24. The associated column-out signal paths 16a-16c are each coupled to the first enable transistor 28a.

A set of adjacent column-out signal paths 16d-16f are coupled to a second enable transistor 28b. For example, a fourth routing transistor 26d can be coupled to the first adjacent column-out signal 16d at a drain and the second enable transistor 28a at a source. When the fourth control signal S[4] is high (and the second enable signal E2 is high), the fourth routing transistor 26a routes a signal on the first adjacent column-out signal path 16d to the output 24 through the second enable transistor 28b. Similarly, a fifth routing transistor 26e can be coupled to the second adjacent column-out signal path 16e at a drain and the second enable transistor 28b at a source, and a sixth routing transistor 26f can be coupled to the third adjacent column-out signal path 16f at a drain and the second enable transistor 28b at a source. When the fifth or the sixth control signals S[5:6] are high (and the second enable signal E2 is high), the respective column routing transistor 26e, 26f are turned on to route signals on the respective adjacent column-out signal path 16e, 16f to the output 24. The adjacent column-out signal paths 16d-16f are each coupled to the second enable transistor 28a.

A non-adjacent column-out signal path 16g is coupled to a third enable transistor 28c. For example, a seventh routing transistor 26g can be coupled to the non-adjacent column-out signal path 16g at a drain and the third enable transistor 28c at a source. When the seventh control signal S[7] is high (and the third enable signal E3 is high), the seventh routing transistor 26g routes a signal on the non-adjacent column-out signal path 16g to the output 24 through the third enable transistor 28c.

The control signals S[1:7] and the enable signals E1-E3 define the read operation performed on the array 4c of the CIS 2c. For example, during an all-pixel read operation, each of the associated column-out signal paths 16a-16c are coupled to the output 24 of the column routing circuit 70a to sequentially output all of the pixel elements 50 in a column to a single column ADC. The first control signal S[1], the second control signal S[2], and third control signal S[3] are simultaneously set high to connect each of the column-out signal paths 16a-16c to the first enable transistor 28a. The first enable signal E1 is also set high to connect the associated column-out signal paths 16a-16c to the output 24. Each of the pixel elements 50 in the column 52a associated with the first column routing circuit 70a are sequentially activated by the row driver circuit 12 and provided to the column ADC, which is coupled to the output 24. The remaining control signals S[4:7] and/or the enable signals E2-E3 are low to prevent routing of the adjacent and non-adjacent column-out signal paths 16d-16g to the output 24.

In some embodiments, during a (V:½, H:½) down-sampling read operation, one of the adjacent column-out signal paths 16d-16f is routed to the output 24 of the first routing circuit 70a. For example, in some embodiments, the second enable signal E2 is set high and the first and third enable signals E1, E3 are set low. If any one of the control signals S[4:6] corresponding to the adjacent column-out signal paths 16d-16f is set high, the corresponding adjacent column-out signal path 16d-16f is routed to the output 24. For example, if the second enable signal E2 and the fifth control signal S[5] are set high, the second adjacent column-out signal path 16e (corresponding to the second column-out signal path 16b of an adjacent column) is routed to the output 24. It will be appreciated that any of the adjacent column-out signal paths 16d-16f can be routed to the output during a (V:½, H:½) down-sampling read operation.

In some embodiments, during a (V:⅓, H:⅓) down-sampling read operation, the non-adjacent column-out signal path 16g is routed to the output 24 of the first routing circuit 70a. For example, in some embodiments, the third enable signal E3 is set high and the first and second enable signals E1, E2 are set low. If the control signal S[7] corresponding to the non-adjacent column-out signal path 16g is set high, the non-adjacent column-out signal path 16g is routed to the output 24. It will be appreciated that in some embodiments, one or more of the first column routing circuits 70a may not be used during a (V:½, H:½) down-sampling read operation or a (V:⅓, H:⅓) down-sampling read operation.

Figure 17A:
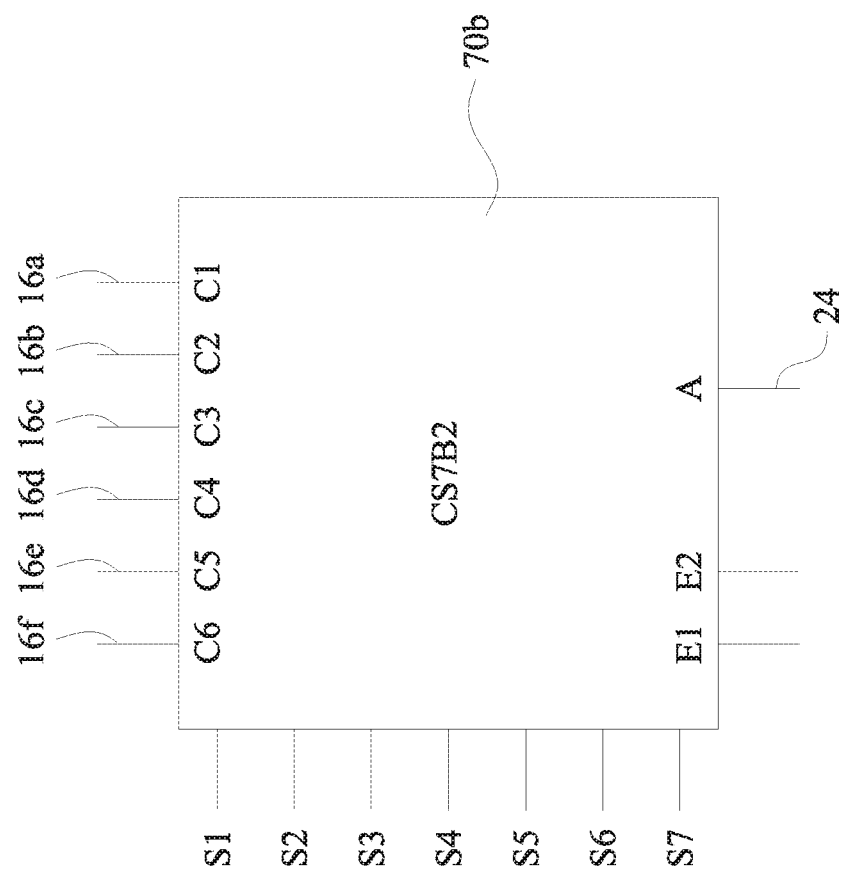
FIG. 17A illustrates a second column routing circuit of the CIS of FIG. 15A, in accordance with some embodiments.

FIG. 17A illustrates one embodiment of a second column routing circuit 70b. The second column routing circuit 70b is configured to receive a sub-set of the plurality of control signals S[1:7], a plurality of enable signals E1-E2, a plurality of associated column-out signals 16a-16c, and a plurality of adjacent column-out signal 16d-16f. The second column routing circuit 70b is configured to route at least one of the column-out signal paths 16a-16f to an output 24. The output 24 is coupled to a column ADC associated with the same column as the second column routing circuit 70b. The second column routing circuit 70b routes one or more of the column-out signals 16a-16f to the output 24 based on the read operation being performed by the CIS 2c. In some embodiments, the enable signals E1-E2 are configured to control operation of the second column routing circuit 70b.

Figure 17B:
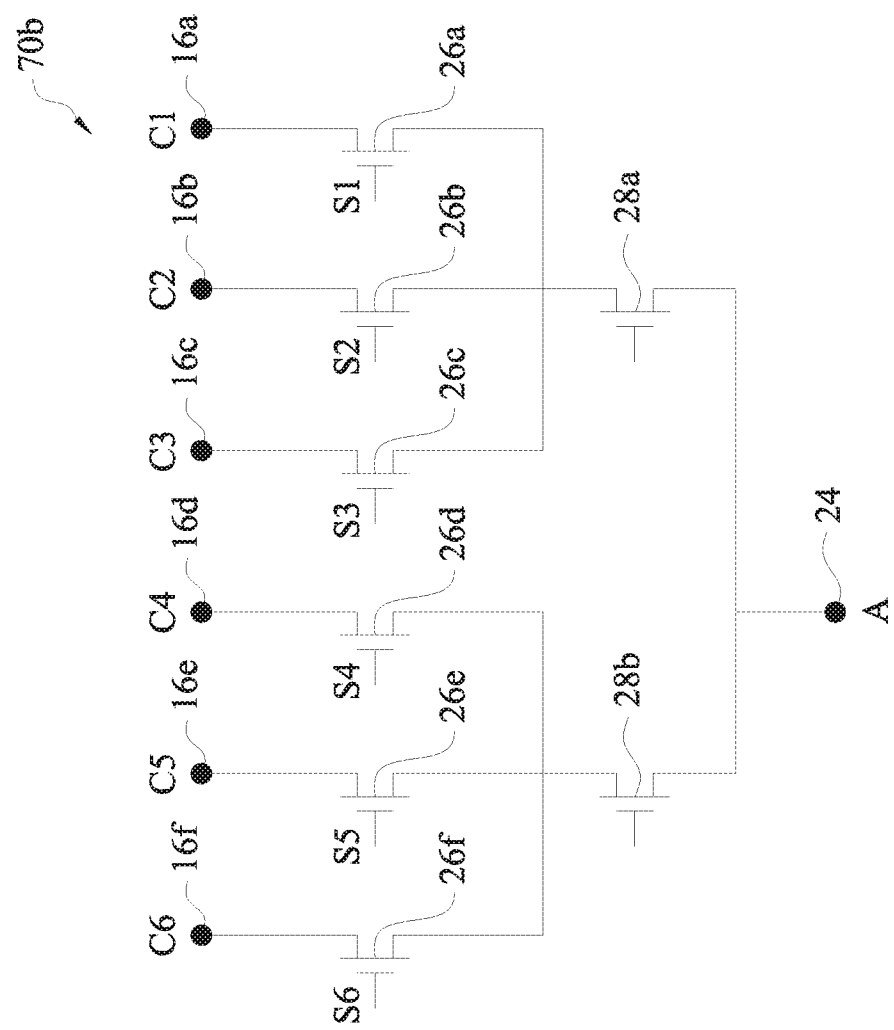
FIG. 17B illustrates a schematic of the second column routing circuit of FIG. 17A, in accordance with some embodiments.

FIG. 17B illustrates a circuit schematic of one embodiment of the second column routing circuit 70b. In some embodiments, the second column routing circuit 70b includes a plurality of routing transistors 26a-26f coupled to the plurality of column-out signal paths 16a-16f and the output 24. Each of the plurality of routing transistors 26a-26f includes a gate coupled to a corresponding control signal S[1:6]. For example, a first routing transistor 26a can be coupled to the first column-out signal 16a at a drain and a first enable transistor 28a at a drain. When the first control signal S1 is high, the first routing transistor 26a routes a signal on the first column-out signal path 16a to the output 24 through the first enable transistor 28a. Similarly, a second routing transistor 26b can be coupled to the second column-out signal path 16b at a drain and the first enable transistor 28a at a source, and a third routing transistor 26c can be coupled to the third column-out signal path 16c at a drain and the first enable transistor 28a at a source. When the second or the third control signals S[2:3] are high (and the first enable signal E1 is high), the respective column routing transistor 26b, 26c are turned on to route signals on the respective column-out signal path 16b, 16c to the output 24. The associated column-out signal paths 16a-16c are each coupled to the first enable transistor 28a.

A set of adjacent column-out signal paths 16d-16f are coupled to a second enable transistor 28b. For example, a fourth routing transistor 26d can be coupled to the first adjacent column-out signal 16d at a drain and the second enable transistor 28a at a source. When the fourth control signal S[4] is high (and the second enable signal E2 is high), the fourth routing transistor 26a routes a signal on the first adjacent column-out signal path 16d to the output 24 through the second enable transistor 28b. Similarly, a fifth routing transistor 26e can be coupled to the second adjacent column-out signal path 16e at a drain and the second enable transistor 28b at a source, and a sixth routing transistor 26f can be coupled to the third adjacent column-out signal path 16f at a drain and the second enable transistor 28b at a source. When the fifth or the sixth control signals S[5:6] are high (and the second enable signal E2 is high), the respective column routing transistor 26e, 26f are turned on to route signals on the respective adjacent column-out signal path 16e, 16f to the output 24. The adjacent column-out signal paths 16d-16f are each coupled to the second enable transistor 28a.

The control signals S[1:6] and the enable signals E1-E2 define the read operation performed on the array 4c of the CIS 2c. For example, during an all-pixel read operation, each of the associated column-out signal paths 16a-16c are coupled to the output 24 of the second column routing circuit 70b to sequentially output all of the pixel elements 50 in a column to a corresponding column ADC. The first control signal S[1], the second control signal S[2], and fifth control signal S[3] are simultaneously set high to connect each of the column-out signal paths 16a-16c to the first enable transistor 28a. The first enable signal E1 is also set high to connect the associated column-out signal paths 16a-16c to the output 24. Each of the pixel elements 50 in the column 52a associated with the second column routing circuit 70b are sequentially activated by the row driver circuit 12 and provided to the column ADC, which is coupled to the output 24. The remaining control signals S[4:6] and/or the second enable signal E2 are low to prevent routing of the adjacent column-out signal paths 16d-16f to the output 24.

In some embodiments, during a (V:½, H:½) down-sampling read operation or a (V:⅓, H:⅓) down-sampling read operation, one of the adjacent column-out signal paths 16d-16f is routed to the output 24 of the second column routing circuit 70b. For example, in some embodiments, the second enable signal E2 is set high and the first enable signal E1 is set low. If any one of the control signals S[4:6] corresponding to the adjacent column-out signal paths 16d-16f is set high, the corresponding adjacent column-out signal path 16d-16f is routed to the output 24. For example, if the second enable signal E2 and the fifth control signal S[5] are set high, the second adjacent column-out signal path 16e (corresponding to the second column-out signal path 16b of an adjacent column) is routed to the output 24. It will be appreciated that any of the adjacent column-out signal paths 16d-16f can be routed to the output during a (V:½, H:½) down-sampling read operation.

Figure 18A:
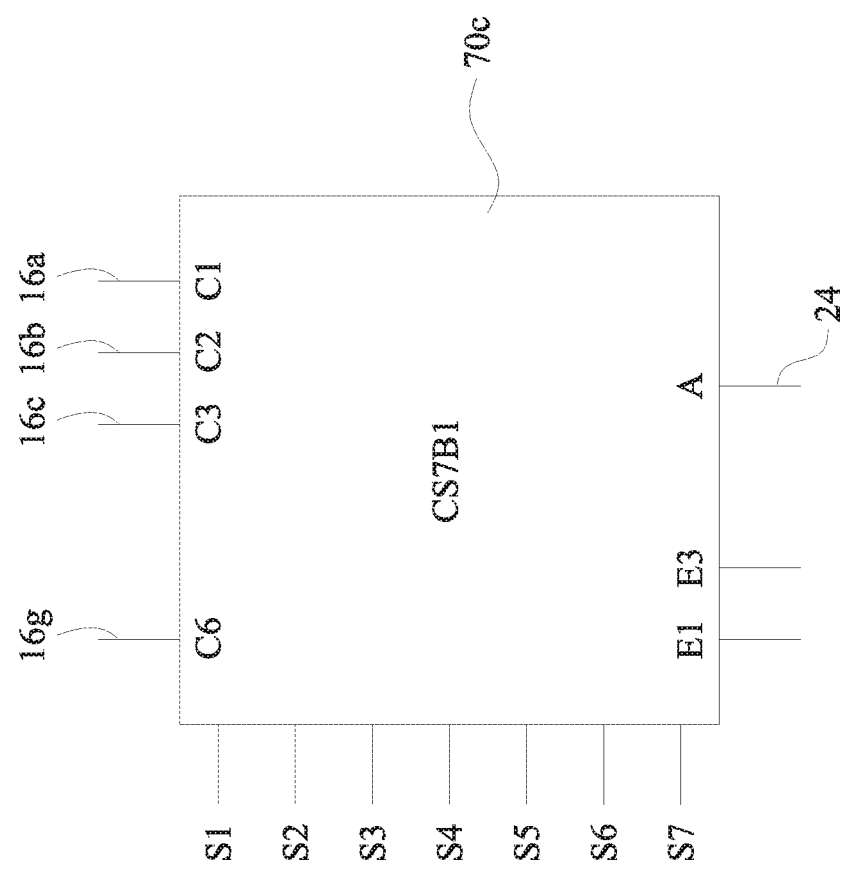
FIG. 18A illustrates a third column routing circuit of the CIS of FIG. 15A, in accordance with some embodiments.

FIG. 18A illustrates one embodiment of a third column routing circuit 70c. The third column routing circuit 70c is configured to receive a sub-set of the plurality of control signals S[1:7], a plurality of enable signals E1, E3, a plurality of associated column-out signals 16a-16c, and a non-adjacent column-out signal 16g. The third column routing circuit 70c is configured to route at least one of the column-out signal paths 16a-c, 16g to an output 24. The output 24 is coupled to a column ADC associated with the same column as the third column routing circuit 70c. The third column routing circuit 70c routes one or more of the column-out signals 16a-16c, 16g to the output 24 based on the read operation being performed by the CIS 2c. In some embodiments, the enable signals E1, E3 are configured to control activation of the third column routing circuit 70c.

Figure 18B:
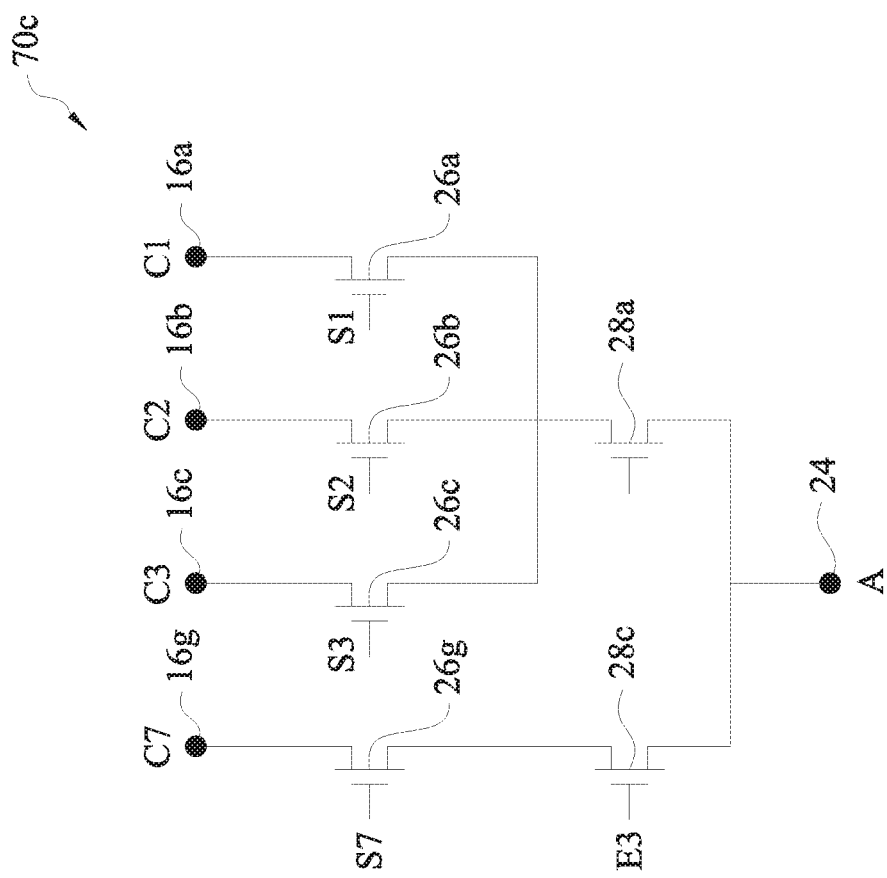
FIG. 18B illustrates a schematic of the third column routing circuit of FIG. 18A, in accordance with some embodiments.

FIG. 18B illustrates a circuit schematic of one embodiment of the third column routing circuit 70c. In some embodiments, the third column routing circuit 70c includes a plurality of routing transistors 26a-26c, 26g coupled to the plurality of column-out signal paths 16a-16c, 16g and the output 24. Each of the plurality of routing transistors 26a-26c, 26g includes a gate coupled to a corresponding control signal S[1:3,7]. For example, a first routing transistor 26a can be coupled to the first column-out signal 16a at a drain and a first enable transistor 28a at a source. When the first control signal S1 is high, the first routing transistor 26a routes a signal on the first column-out signal path 16a to the output 24 through the first enable transistor 28a. Similarly, a second routing transistor 26b can be coupled to the second column-out signal path 16b at a drain and the first enable transistor 28a at a source, and a third routing transistor 26c can be coupled to the third column-out signal path 16c at a drain and the first enable transistor 28a at a source. When the second or the third control signals S[2:3] are high (and the first enable signal E1 is high), the respective column routing transistor 26b, 26c are turned on to route signals on the respective column-out signal path 16b, 16c to the output 24. The associated column-out signal paths 16a-16c are each coupled to the first enable transistor 28a.

A non-adjacent column-out signal path 16g is coupled to a third enable transistor 28c. For example, a seventh routing transistor 26g can be coupled to the non-adjacent column-out signal path 16g at a drain and the third enable transistor 28c at a source. When the seventh control signal S[7] is high (and the third enable signal E3 is high), the seventh routing transistor 26g routes a signal on the non-adjacent column-out signal path 16g to the output 24 through the third enable transistor 28c.

The control signals S[1:3,7] and the enable signals E1, E3 define the read operation performed on the array 4c of the CIS 2c. For example, during an all-pixel read operation, each of the associated column-out signal paths 16a-16c are coupled to the output 24 of the third column routing circuit 70c to sequentially output all of the pixel elements 50 in a column to a single column ADC. The first control signal S[1], the second control signal S[2], and fifth control signal S[3] are simultaneously set high to connect each of the column-out signal paths 16a-16c to the first enable transistor 28a. The first enable signal E1 is also set high to connect the associated column-out signal paths 16a-16c to the output 24. Each of the pixel elements 50 in the column 52a associated with the third column routing circuit 70c are sequentially activated by the row driver circuit 12 and provided to the column ADC, which is coupled to the output 24. The remaining control signal S[7] and/or the enable signal E3 are low to prevent routing of the non-adjacent column-out signal path 16g to the output 24.

In some embodiments, during a (V:½, H:½) down-sampling read operation, one of the associated column-out signal paths 16a-16c is routed to the output 24 of the third column routing circuit 70c. For example, in some embodiments, the first enable signal E1 is set high and the third enable signal E3 is set low. If any one of the control signals S[1:3] corresponding to the associated column-out signal paths 16a-16c is set high, the corresponding column-out signal path 16a-16c is routed to the output 24. For example, if the first enable signal E1 and the second control signal S[2] are set high, the second associated column-out signal path 16b is routed to the output 24. It will be appreciated that any of the column-out signal paths 16a-16c can be routed to the output during a (V:½, H:½) down-sampling read operation.

In some embodiments, during a (V:⅓, H:⅓) down-sampling read operation, the non-adjacent column-out signal path 16g is routed to the output 24 of the third column routing circuit 70c. For example, in some embodiments, the third enable signal E3 is set high and the first enable signal E1 is set low. If the control signal S[7] corresponding to the non-adjacent column-out signal path 16g is set high, the non-adjacent column-out signal path 16g is routed to the output 24. It will be appreciated that in some embodiments, one or more of the third column routing circuit 70c may not be used during a (V:½, H:½) down-sampling read operation and/or a (V:⅓, H:⅓) down-sampling read operation.

Figure 19A:
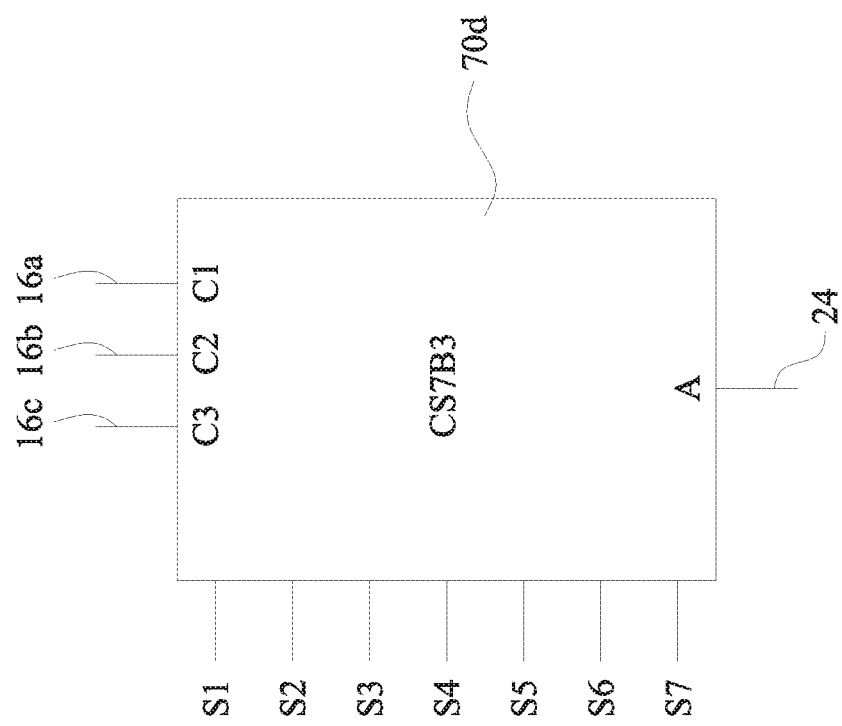
FIG. 19A illustrates a fourth column routing circuit of the CIS of FIG. 15A, in accordance with some embodiments.

FIG. 19A illustrates one embodiment of a fourth column routing circuit 70d. The fourth column routing circuit 70d is configured to receive a sub-set of the plurality of control signals S[1:7], a plurality of enable signals E1, E3, and a plurality of associated column-out signals 16a-16c. The fourth column routing circuit 70d is configured to route at least one of the column-out signal paths 16a-c to an output 24. The output 24 is coupled to a column ADC associated with the same column as the fourth column routing circuit 70d. The fourth column routing circuit 70d routes one or more of the column-out signals 16a-16c to the output 24 based on the read operation being performed by the CIS 2c. In some embodiments, an enable transistor 28a is coupled to an always-on power source VDD.

Figure 19B:
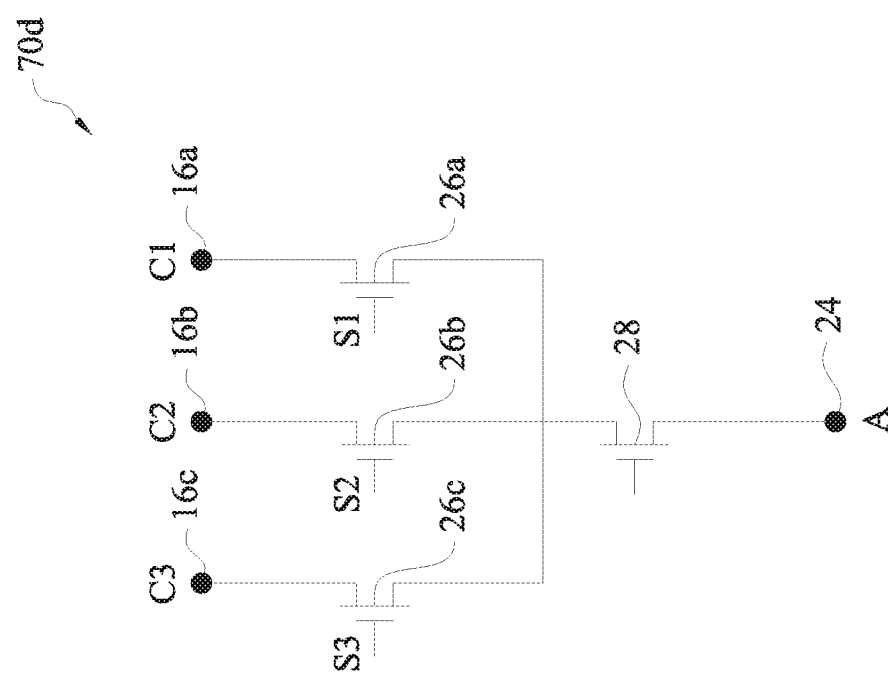
FIG. 19B illustrates a schematic of the fourth column routing circuit of FIG. 19A, in accordance with some embodiments.

FIG. 19B illustrates a circuit schematic of one embodiment of the fourth column routing circuit 70d. In some embodiments, the fourth column routing circuit 70d includes a plurality of routing transistors 26a-26c coupled to the plurality of column-out signal paths 16a-16c and the output 24. Each of the plurality of routing transistors 26a-26c includes a gate coupled to a corresponding control signal S[1:3]. For example, a first routing transistor 26a can be coupled to the first column-out signal 16a at a drain and the enable transistor 28a at a source. When the first control signal S1 is high, the first routing transistor 26a routes a signal on the first column-out signal path 16a to the output 24 through the enable transistor 28a. Similarly, a second routing transistor 26b can be coupled to the second column-out signal path 16b at a drain and the enable transistor 28a at a source, and a third routing transistor 26c can be coupled to the third column-out signal path 16c at a drain and the enable transistor 28a at a source. When the second or the third control signals S[2:3] are high, the respective column routing transistors 26b, 26c are turned on to route signals on the respective column-out signal path 16b, 16c to the output 24. The associated column-out signal paths 16a-16c are each coupled to the enable transistor 28a.

The control signals S[1:3] define the read operation performed on the array 4c of the CIS 2c. For example, during an all-pixel read operation, each of the associated column-out signal paths 16a-16c are coupled to the output 24 of the fourth column routing circuit 70d to sequentially output all of the pixel elements 50 in a column to a single column ADC. The first control signal S[1], the second control signal S[2], and the third control signal S[3] are simultaneously set high to connect each of the column-out signal paths 16a-16c to the enable transistor 28a. Each of the pixel elements 50 in the column 52a associated with the fourth column routing circuit 70d are sequentially activated by the row driver circuit 12 and provided to the column ADC, which is coupled to the output 24.

In some embodiments, during a (V:½, H:½) down-sampling read operation and/or a (V:⅓, H:⅓) down-sampling read operation, one of the associated column-out signal paths 16a-16c is routed to the output 24 of the fourth column routing circuit 70d. For example, in some embodiments, if the second control signal S[2] is set high, the second associated column-out signal path 16b is routed to the output 24. It will be appreciated that any of the column-out signal paths 16a-16c can be routed to the output during a (V:½, H:½) down-sampling read operation and/or a (V:⅓, H:⅓) down-sampling read operation.

Figure 20A:
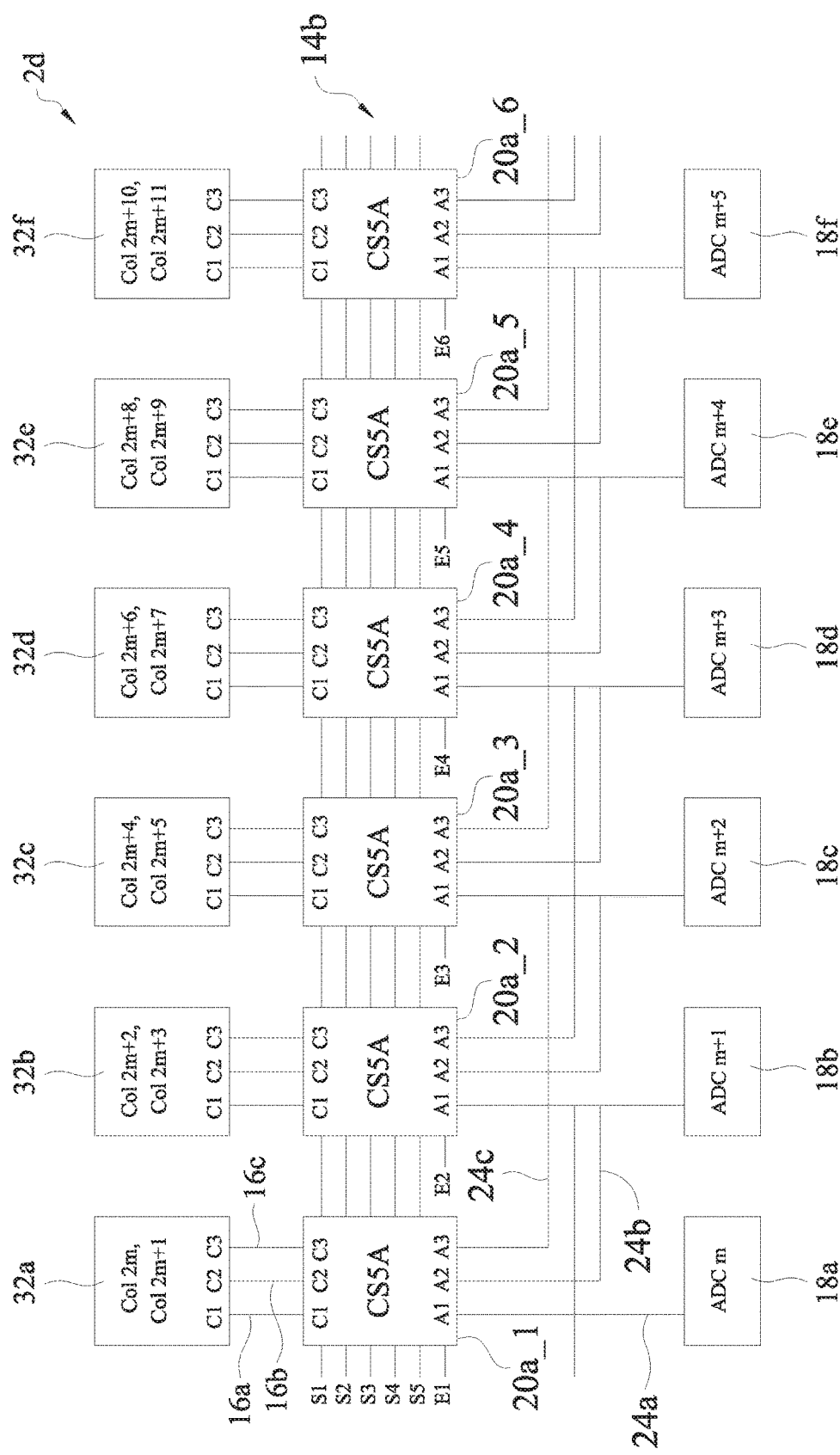
FIG. 20A illustrates the third column routing matrix configured to provide selective pixel output for the CIS illustrated in FIG. 7A, in accordance with some embodiments.

FIG. 20A illustrates one embodiment of a CIS 2d including plurality of columns 32a-32f of 2×2 shared pixel elements 30. The CIS 2d is similar to the CIS 2b described above and similar description is not repeated herein. In each of the previously discussed embodiments, the sub-sampled rows and columns during a (V:½, H:½) down-sampling read operation and/or a (V:⅓, H:⅓) down-sampling read operation are at least partially fixed. The column routing matrix 14d of the CIS 2d comprises a configurable column routing matrix configured to allow the rows and/or columns of the CIS 2d to be selected for each (V:½, H:½) down-sampling read operation and/or (V:⅓, H:⅓) down-sampling read operation. Although this embodiments uses a 2×2 pixel array similar to the CIS 2b discussed above, it will be appreciated that any of the CIS circuits 2a-2c previously discussed can be modified to include a configurable column routing matrix.

Figure 20B:
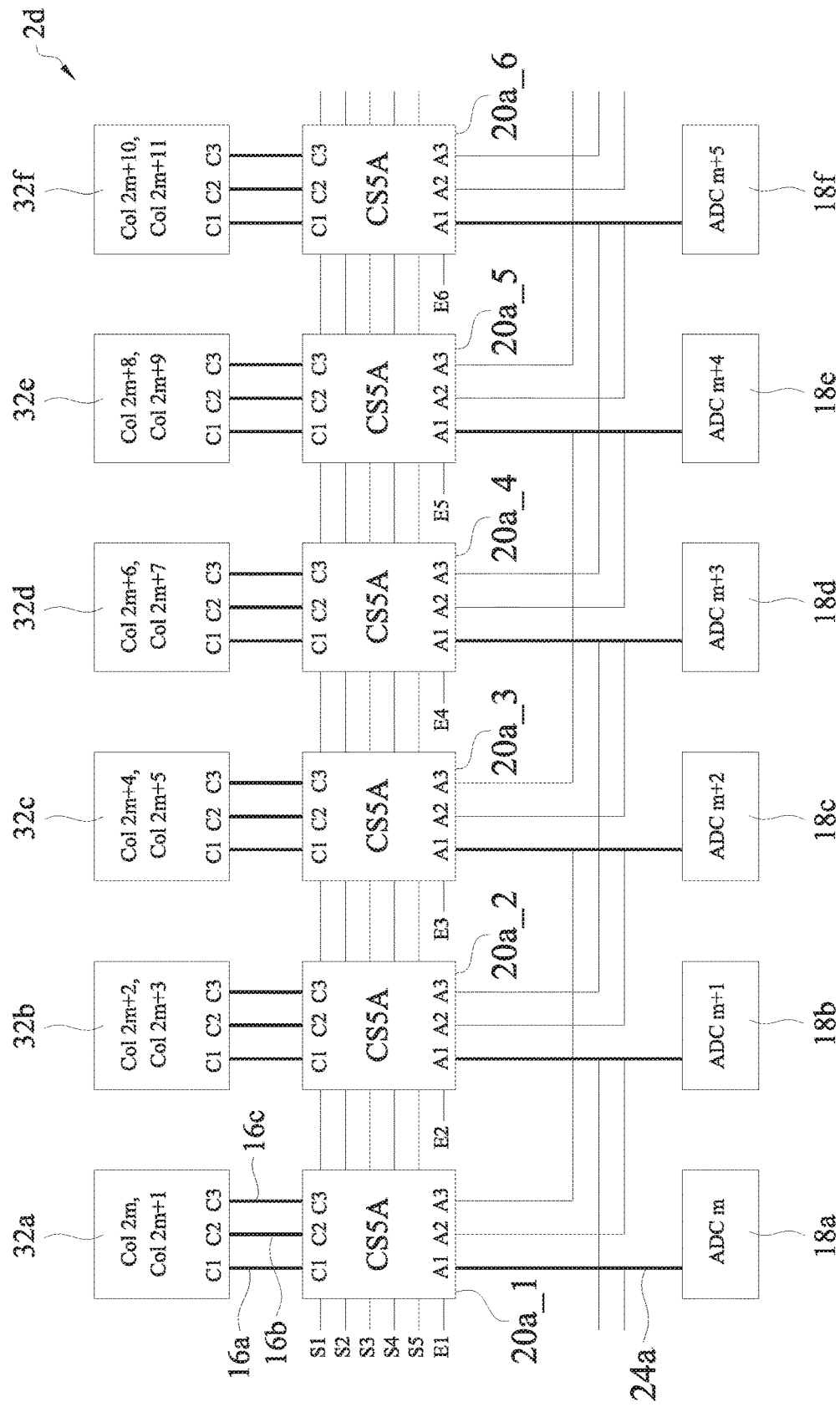
FIG. 20B illustrates the third column routing matrix of FIG. 20A configured for an all-pixel read operation, in accordance with some embodiments.

In some embodiments, the column routing matrix 14d is configured by a plurality of control signals S[1:5] and/or a plurality of enable signals E1-E6. The specific columns read during a V:½, H:½) down-sampling read operation and/or (V:⅓, H:⅓) down-sampling read operation can be selected by combinations of the control signals S[1:5] and the enable signals E1-E6. For example, FIG. 20B illustrates the CIS 2d of FIG. 20A configured for an all-pixel read operation. With reference back to FIGS. 4A-4B (which illustrate one embodiment of the column routing circuit 20a), in an all-pixel read operation, the first, fourth, and fifth control signals S[1,4,5] are set high and the second and third control signals S[2,3] are set low to route each of the column-out signal paths 16a-16c of an associated column 32a-32f to a first output 24a of the column routing circuit 20a. Each of the enable signals E1-E6 are set high to enable each of the column routing circuits 20a_1-20a_6. The row driving circuit 12 sequentially activates each row in the columns 32a-32f which are passed to the column ADC 18a-18f associated with the column 32a-32f.

Figure 20C:
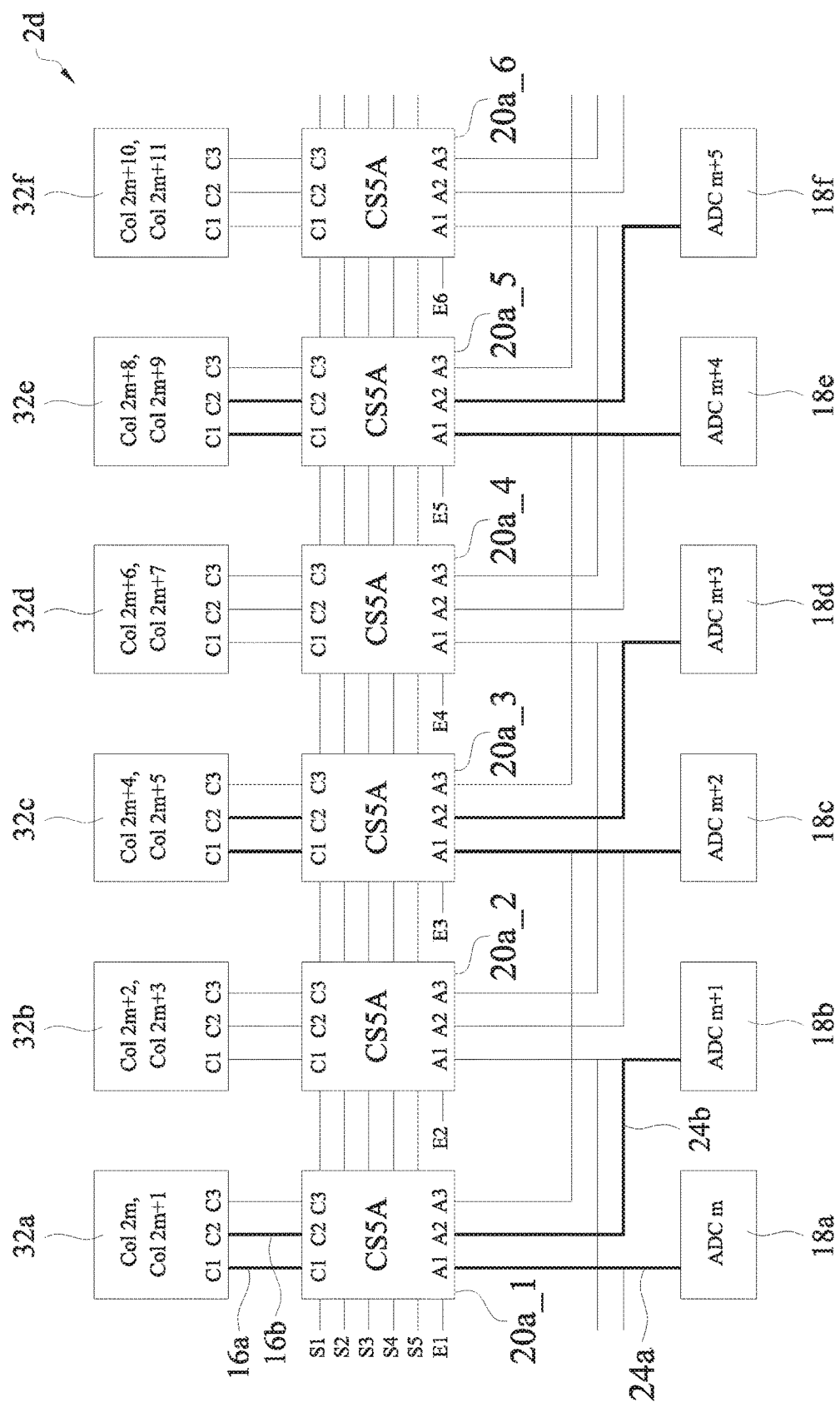
FIG. 20C illustrates the third column routing matrix of FIG. 20A configured for a first (V:½, H:½) down-sampling read operation, in accordance with some embodiments.

FIG. 20C illustrates the CIS 2d of FIG. 20A configured for a first (V:½, H:½) down-sampling read operation, in accordance with some embodiments. In the illustrated embodiment, a first set of pixel elements 30a in a half of the columns 32a, 32c, 32e are routed to an associated column ADC 18a with the first column 32a and a second set of pixel elements 30b are routed to an adjacent column ADC 18b. A set of enable signals E1, E3, E5 corresponding to each of the active columns is set high to enable the column routing circuits 20a_1, 20a_3, 20a_5 corresponding to those columns 32a, 32c, 32e and a set of enable signals E2, E4, E6 corresponding to each of the inactive columns is set low to disable the routing circuits 20a_2, 20a_4, 20a_6 of corresponding to those columns 32b, 32d, 32f.

Figure 20D:
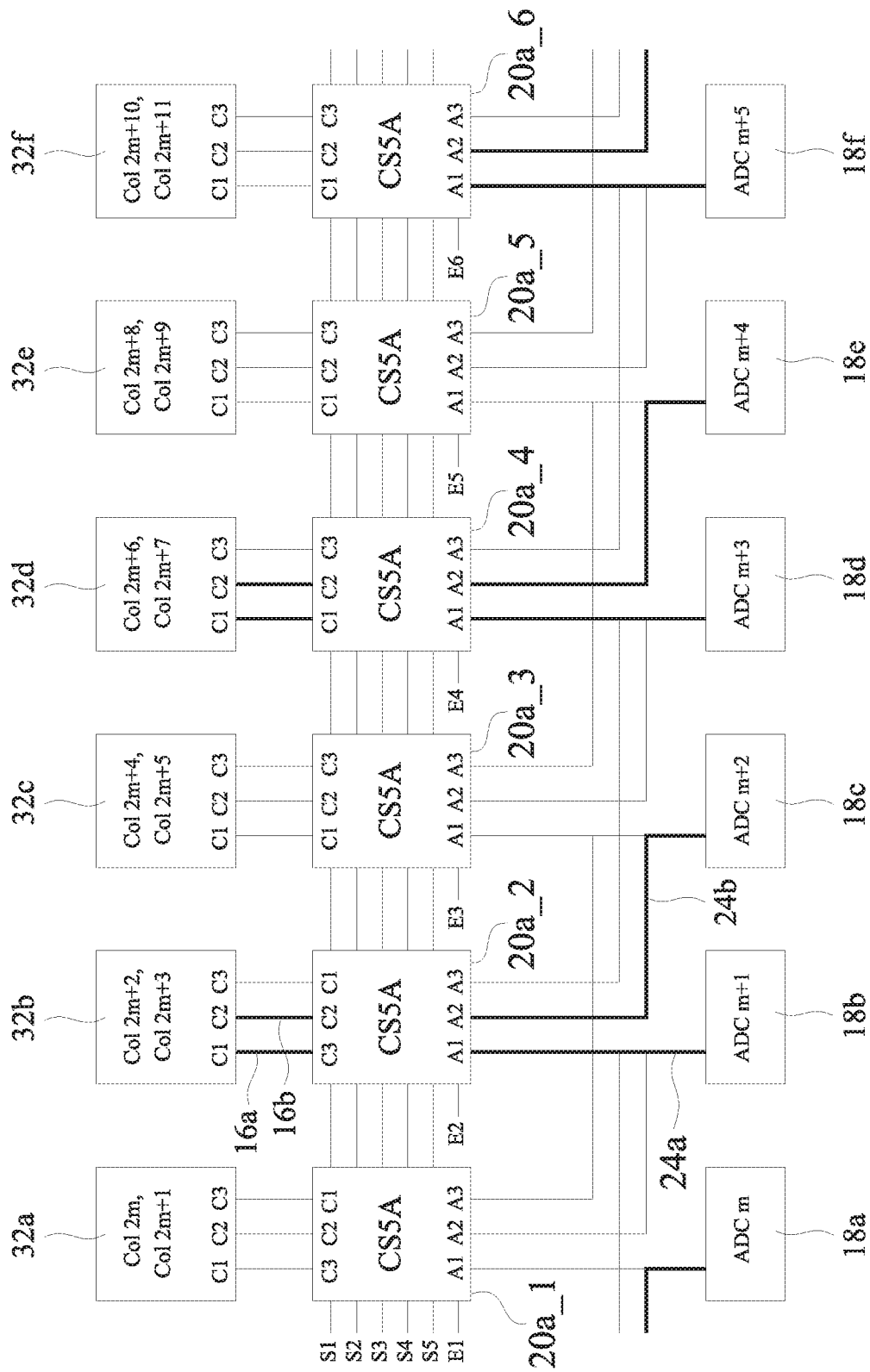
FIG. 20D illustrates the third column routing matrix of FIG. 20A configured for a second (V:½, H:½) down-sampling read operation, in accordance with some embodiments.

FIG. 20D illustrates the CIS 2d of FIG. 20A configured for a second (V:½, H:½) down-sampling read operation, in accordance with some embodiments. FIG. 20D is similar to FIG. 20C, but the selected set of columns has been switched (e.g., inactive columns are now active and active columns are now inactive) A set of enable signals E2, E4, E6 corresponding to each of the active columns is set high to enable the column routing circuits 20a_2, 20a_4, 20a_6 corresponding to those columns 32b, 32f, 32g and a set of enable signals E1, E3, E5 corresponding to each of the inactive columns is set low to disable the routing circuits 20a_1, 20a_3, 20a_5 of corresponding to those columns 32a, 32c, 32e.

Figure 20E:
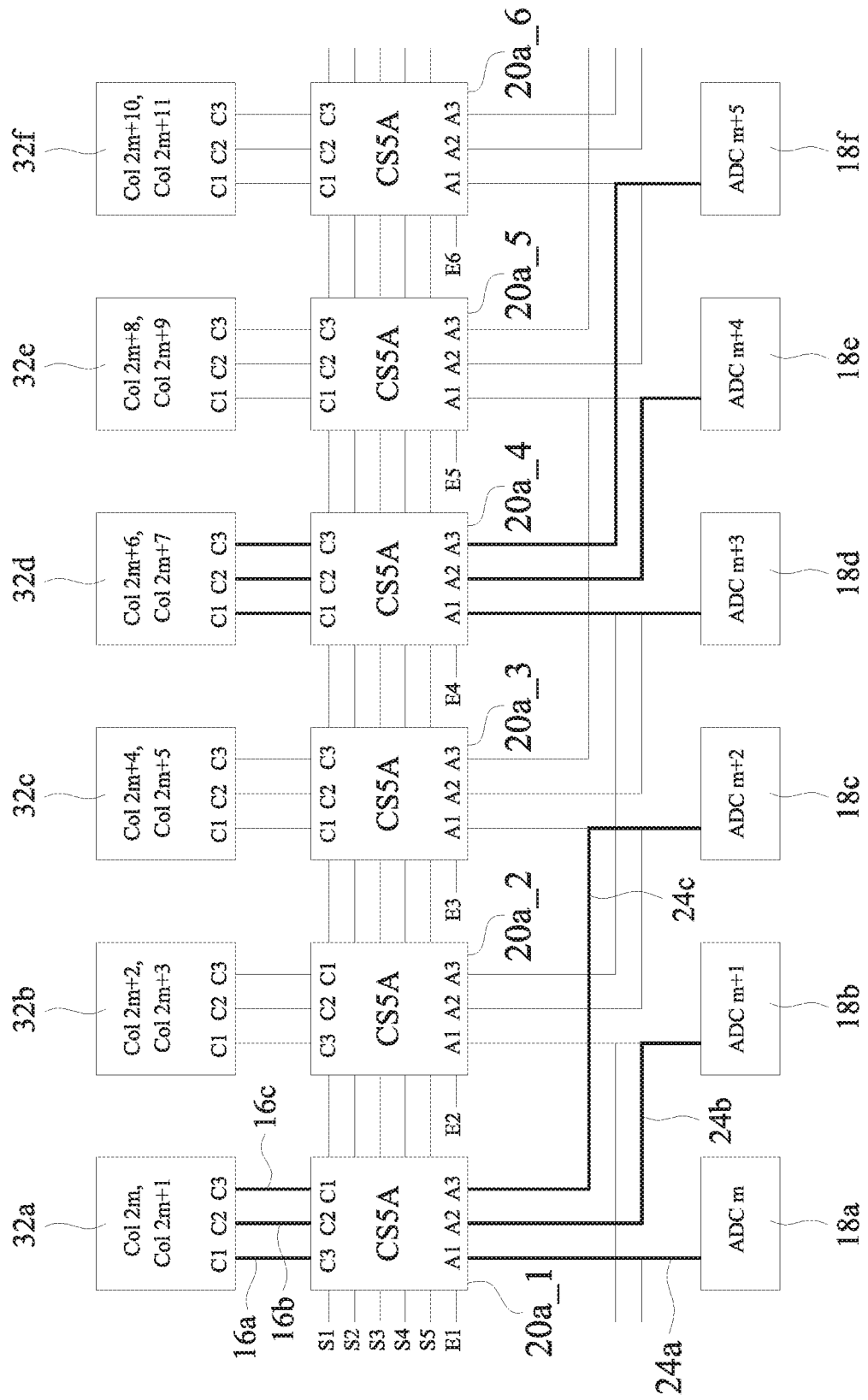
FIG. 20E illustrates the third column routing matrix of FIG. 20A configured for a first (V:⅓, H:⅓) down-sampling read operation, in accordance with some embodiments.
Figure 20F:
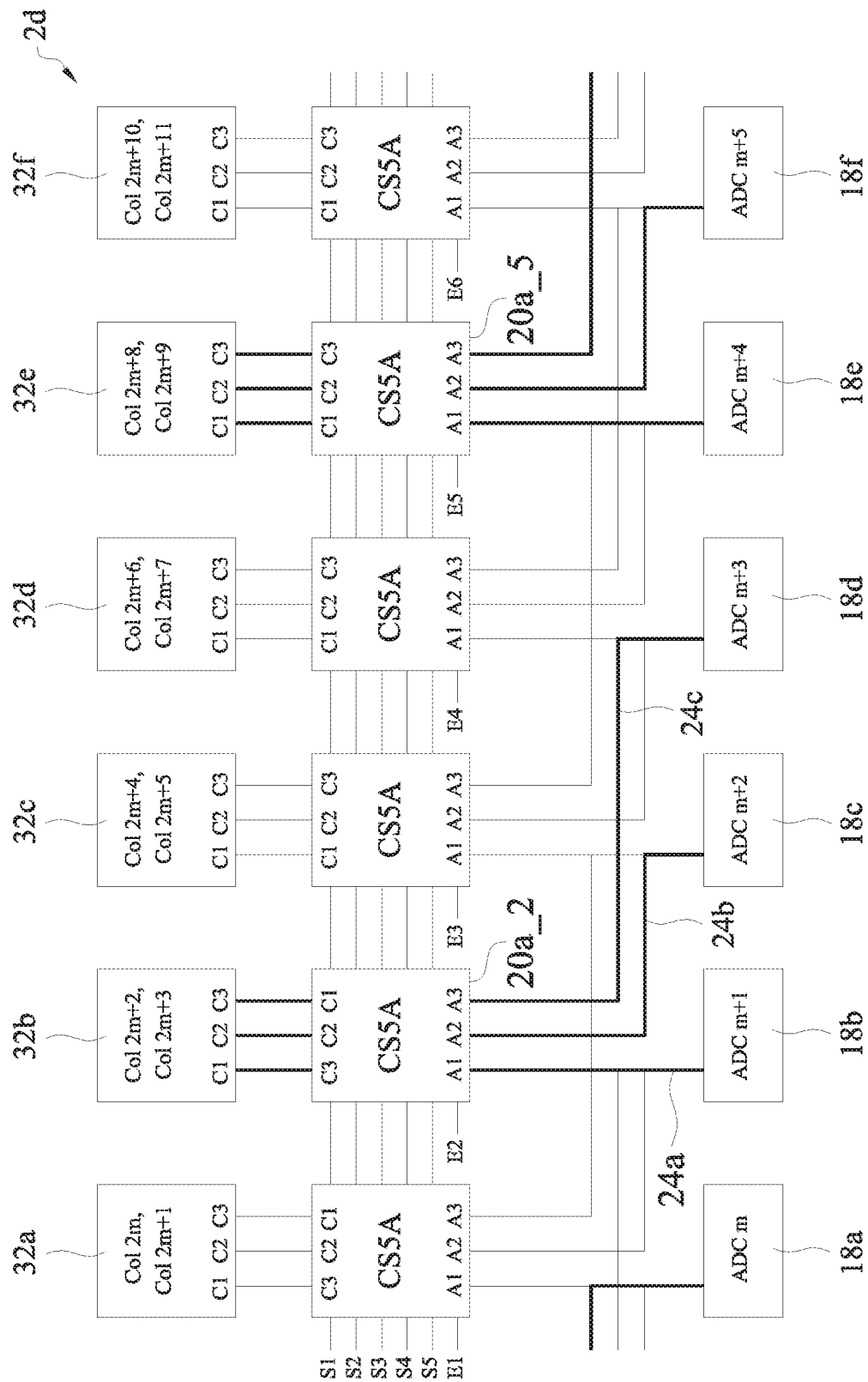
FIG. 20F illustrates the third column routing matrix of FIG. 20A configured for a second (V:⅓, H:⅓) down-sampling read operation, in accordance with some embodiments.
Figure 20G:
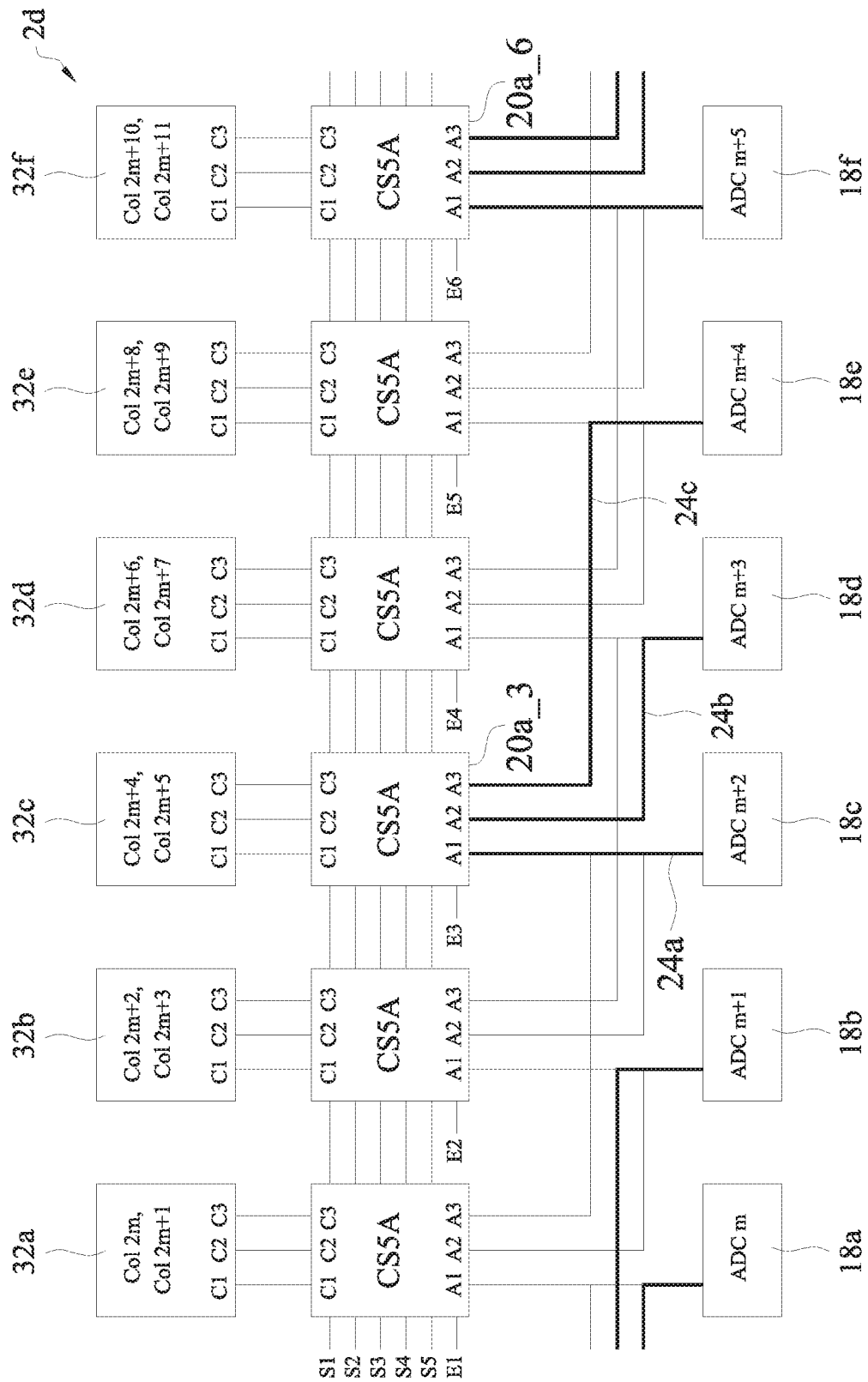
FIG. 20G illustrates the third column routing matrix of FIG. 20A configured for a third (V:⅓, H:⅓) down-sampling read operation, in accordance with some embodiments.

FIG. 20E illustrates the CIS 2d of FIG. 20A configured for a first (V:⅓, H:⅓) down-sampling read operation, in accordance with some embodiments. In the illustrated embodiment, a first set of pixel elements 30a in one-third of the columns 32a, 32d are routed to an associated column ADC 18a with the first column 32a, a second set of pixel elements 30b are routed to an adjacent column ADC 18b, and a third set of pixel elements 30c are routed to a non-adjacent ADC set 18c. A set of enable signals E1, E4 corresponding to each of the active columns is set high to enable the column routing circuits 20a_1, 20a_4 corresponding to those columns 32a, 32d and a set of enable signals E2-E3, E5-E6 corresponding to each of the inactive columns is set low to disable the routing circuits 20a_2-20a_3, 20a_5-20a_6 of corresponding to those columns 32b-32c, 32e-32f FIGS. 20F-20G show alternative routing embodiments for (V:⅓, H:⅓) down-sampling read operations that utilize other combinations of enable signals E1-E6 and columns 32a-32f. Table 17 below illustrates the enable control table for each of the illustrated cases:

TABLE 17

|    | All | H: 1/2 |        | H: 1/3 |        |        |
|----|-----|--------|--------|--------|--------|--------|
|    | m   | 2m     | 2m + 1 | 3m     | 3m + 1 | 3m + 2 |
| E1 | 1   | 1      | 0      | 1      | 0      | 0      |
| E2 | 1   | 0      | 1      | 0      | 1      | 0      |
| E3 | 1   | 1      | 0      | 0      | 0      | 1      |
| E4 | 1   | 0      | 1      | 1      | 0      | 0      |
| E5 | 1   | 1      | 0      | 0      | 1      | 0      |
| E6 | 1   | 0      | 1      | 0      | 0      | 1      |

In various embodiments, a CMOS (complementary metal-oxide semiconductor) image sensors (CIS) including a an array of pixel elements having a plurality of rows and a plurality of columns is disclosed. A plurality of column-out signal paths is coupled to each of the plurality of columns of the array of pixel elements. A column routing matrix is coupled to each plurality of column-out signal paths for each of the plurality of columns. A plurality of analog-to-digital converters (ADCs) are coupled to the column routing matrix. The column routing matrix is configured to route at least one column-out signal path to each of the plurality of ADCs during a down-sampling read operation.

In various embodiments, a method of reading a CMOS (complementary metal-oxide semiconductor) image sensors (CIS) is disclosed. The method includes activating, by a row driver circuit, a plurality of pixel elements in an array. The plurality of pixel elements are arranged a first column. The method further includes routing each of the plurality of pixel elements to at least one column ADC selected from a plurality of column ADCs. Each of the one or more pixel elements is routed by one of a plurality of column-out signal paths. Each of the column-out signal paths is coupled to a portion of the plurality of pixel elements. The at least one column ADC converts each of the plurality of pixel elements to a digital signal.

In various embodiments, a column routing matrix for a CMOS (complementary metal-oxide semiconductor) image sensors (CIS) is disclosed. The column routing matrix includes a first column routing circuit configured to route a first column-out signal path of a first column to a first column ADC and a second column-out signal path of the first column to a second column ADC. A second column routing circuit is configured to route a plurality of column-out signal paths of a second column to a second column ADC. A controller is coupled to each of the first and second column routing circuits. The controller is configured to control an output of each of the first and second column routing circuits.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A CMOS (complementary metal-oxide semiconductor) image sensor (CIS) comprising:
    an array of pixel elements having a plurality of rows and a plurality of columns, each of the plurality of columns comprising a first column-out signal path coupled to a first subset of pixel elements in the column, a second column-out signal path coupled to a second subset of pixel elements in the column, and a third column-out signal path coupled to a third subset of pixel elements in the column;
    a first routing circuit coupled to the first, second, and third column-out signal path of a first column, wherein the first routing circuit is selectively configurable to a first state or a second state, wherein in the first state the first routing circuit routes each of the first, second, and third column-out signal paths to a first column analog-to-digital convertor (ADC), and wherein in the second state the first routing circuit routes the first column-out signal path to the first column ADC, the second column-out signal path to an adjacent column ADC, and the third column-out signal path to a non-adjacent column ADC.

2. The CIS of claim 1, comprising a second routing circuit coupled to the first, second, and third column-out signal paths of a second column, wherein the second routing circuit is selectively configurable to a first state or a second state, wherein in the first state the second routing circuit routes each of the first, second, and third column-out signal paths to a second column ADC, and wherein in the second state the second routing circuit routes first, second, and third column-out signal paths to ground.

3. The CIS of claim 2, wherein the second column ADC is the adjacent column ADC.

4. The CIS of claim 2, comprising a third routing circuit coupled to the first, second, and third column-out signal paths of a third column, wherein the third routing circuit is selectively configurable to a first state or a second state, wherein in the first state the third routing circuit routes each of the first, second, and third column-out signal paths to a third column ADC, and wherein in the second state the third routing circuit routes first, second, and third column-out signal paths to ground.

5. The CIS of claim 4, wherein the third column ADC is the non-adjacent column ADC.

6. The CIS of claim 1, wherein the first routing circuit comprises a plurality of control transistors, a plurality of column enable transistors, and a plurality of cross-column enable transistors.

7. The CIS of claim 1, wherein a sub-set of the plurality of columns read during a down-sampling read operation is selected by a column routing matrix.

8. The CIS of claim 1, wherein a read operation time for reading all pixel elements in the array is equal to time X, the read operation time for a (V:½, H:½) down-sampling read operation is equal to X/4, and the read operation time for a (V:⅓, H:⅓) down-sampling read operation is equal to X/9.

9. The CIS of claim 1, wherein each of the plurality of columns in the array of pixel elements has an associated ADC in the plurality of ADCs.

10. A method of reading a CMOS (complementary metal-oxide semiconductor) image sensors (CIS), comprising:
    configuring a first routing circuit to one of a first state or a second state;
    activating, by a row driver circuit, a plurality of pixel elements in an array, wherein the plurality of pixel elements are arranged in a plurality of columns;
    routing a first column of the plurality of pixel elements by the first routing circuit, wherein when the first routing circuit is in the first state the first routing circuit routes each of a first, second, and third column-out signal path to a first column analog-to-digital convertor (ADC), and wherein when the first routing circuit is in the second state the first routing circuit routes the first column-out signal path to the first column ADC, the second column-out signal path to an adjacent column ADC, and the third column-out signal path to a non-adjacent column ADC, wherein each of the column-out signal paths is coupled to a sub-set of pixel elements in the first column; and
    converting, by the first column ADC, adjacent column ADC, and non-adjacent column ADC, each of the sub-set of the plurality of pixel elements received from the first routing circuit to generate a digital signal.

11. The method of claim 10, comprising:
    configuring a second routing circuit to one of a first state or a second state; and
    routing a second column of the plurality of pixel elements by the second routing circuit, wherein when the second routing circuit is in the first state, the second routing circuit routes each of a first, second, and third column-out signal path of the second column to a second column ADC, and wherein when the second routing circuit is in the second state, the second routing circuit routes first, second, and third column-out signal paths of the second column to ground.

12. The method of claim 11, wherein the second column ADC is the adjacent column ADC.

13. The method of claim 11, comprising:
    configuring a third routing circuit to one of a first state or a second state; and
    routing a third column of the plurality of pixel elements by the third routing circuit, wherein when the third routing circuit is in the first state, the third routing circuit routes each of a first, second, and third column-out signal path of the third column to a third column ADC, and wherein when the third routing circuit is in the second state, the third routing circuit routes first, second, and third column-out signal paths of the third column to ground.

14. The method of claim 13, wherein the third column ADC is the non-adjacent column ADC.

15. The method of claim 10, wherein the plurality of pixel elements comprises half of a total number of pixel elements in the first column.

16. The method of claim 10, wherein the plurality of pixel elements comprises one-third of a total number of pixel elements in the first column.

17. A column routing matrix for a CMOS (complementary metal-oxide semiconductor) image sensors (CIS), comprising:
 a first routing circuit selectively configurable to a first state or a second state, wherein when the first routing circuit is in the first state the first routing circuit is configured to route each of a first, second, and third column-out signal path of a first column to a first column analog-to-digital convertor (ADC), and wherein when the first routing circuit is in the second state the first routing circuit is configured to route the first column-out signal path to the first column ADC, the second column-out signal path to an adjacent column ADC, and the third column-out signal path to a non-adjacent column ADC;
 a second routing circuit selectively configurable to a first state or a second state, wherein when the second routing circuit is in the first state the second routing circuit is configured to route each of a first, second, and third column-out signal path of a second column to a second column ADC, and wherein when second routing circuit is in the second state the second routing circuit is configured to route the first, second, and third column-out signal paths of the second column to ground; and
 a controller coupled to each of the first and second column routing circuits, and wherein the controller is configured to select one of the first state or the second state for each of the first and second routing circuits.

18. The column routing matrix of claim 17, wherein the second column ADC is the adjacent-column ADC.

19. The column routing matrix of claim 17, comprising:
 a third routing circuit selectively configurable to a first state or a second state, wherein when the third routing circuit is in the first state the third routing circuit is configured to route each of a first, second, and third column-out signal path of a third column to a third column ADC, and wherein when third routing circuit is in the second state the third routing circuit is configured to route the first, second, and third column-out signal paths of the third column to ground.

20. The column routing matrix of claim 19, wherein the third column ADC is the non-adjacent column ADC.

* * * * *